(12) United States Patent
Asano

(10) Patent No.: US 7,840,029 B2
(45) Date of Patent: Nov. 23, 2010

(54) INFORMATION EMBEDDING APPARATUS AND INFORMATION EMBEDDING METHOD FOR ADDING INFORMATION TO DOCUMENT IMAGE BY EMBEDDING INFORMATION THEREIN, INFORMATION DETECTING APPARATUS AND INFORMATION DETECTING METHOD

(75) Inventor: Motohiro Asano, Osaka (JP)

(73) Assignee: Konica Minolta Technologies, Inc., Tokyo (JP)

( * ) Notice: Subject to any disclaimer, the term of this patent is extended or adjusted under 35 U.S.C. 154(b) by 0 days.

(21) Appl. No.: 12/764,643

(22) Filed: Apr. 21, 2010

(65) Prior Publication Data

US 2010/0202692 A1    Aug. 12, 2010

Related U.S. Application Data

(62) Division of application No. 11/435,097, filed on May 16, 2006.

(30) Foreign Application Priority Data

May 18, 2005    (JP) .............................. 2005-145806

(51) Int. Cl.
*G06K 9/00*    (2006.01)
(52) U.S. Cl. .................................................... 382/100
(58) Field of Classification Search ................. 382/100, 382/232–253; 380/200–242; 358/426.01–426.16; 354/555; 345/384.1–440.1; 375/122, 240.01–240.29
See application file for complete search history.

(56) References Cited

U.S. PATENT DOCUMENTS 6,760,464 B2    7/2004    Brunk ........................ 382/100

FOREIGN PATENT DOCUMENTS

| JP | 2003-101762 A | 4/2003 |
|---|---|---|
| JP | 2004-112356 A | 4/2004 |
| JP | 2004-128845 A | 4/2004 |

OTHER PUBLICATIONS

Japanese "Notice of Grounds of Rejection," dated Feb. 23, 2010 for counterpart Japanese Application No. 2005-145806, together with an English-language translation thereof.

*Primary Examiner*—Samir A. Ahmed
*Assistant Examiner*—Atiba O Fitzpatrick
(74) *Attorney, Agent, or Firm*—Sidley Austin LLP

(57) ABSTRACT

In an information embedding apparatus, an image compositing portion selectively reads an embedding pattern from a plurality of types of the embedding patterns in accordance with an embedding information for a background of a document image. The image compositing portion further composites the read embedding pattern into the background of the document image in a document image data generated based on a document data and outputs the composite document image data. The embedding pattern includes a data dot placed at a position in accordance with the embedding information, a position dot placed at a position for instructing a reference position used for identifying the position of the data dot, and an assisting dot placed at a position for assisting the instruction of the reference position by the position dot.

7 Claims, 49 Drawing Sheets

FIG. 4A
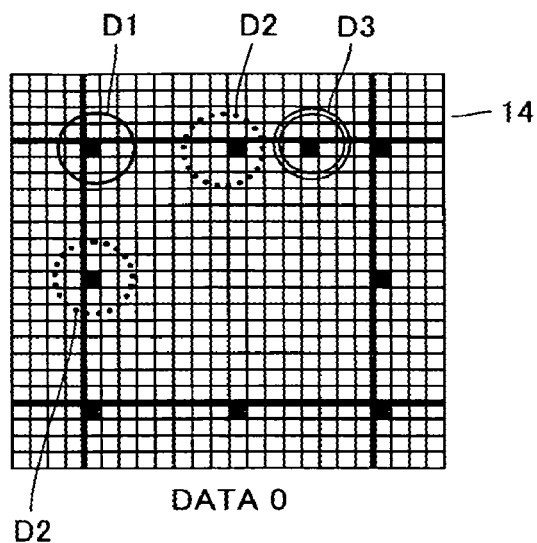
DATA 0
FIG. 4B
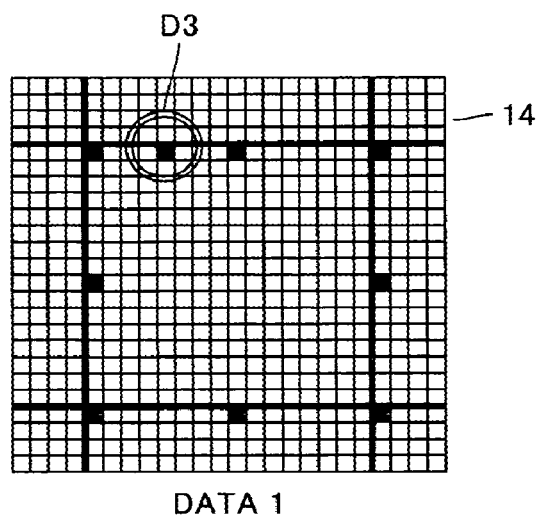
DATA 1
FIG. 5
| DATA 0 (i=1) | DATA 1 (i=2) |
|---|---|
| DATA 1 (i=3) | DATA 0 (i=4) |
—24

DENSITY 0   DENSITY 1   DENSITY 2   DENSITY 3

EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE
EXAMPLE OF DOCUMENT IMAGE

DENSITY 0

DENSITY 1

DENSITY 2

DENSITY 3

| DENSITY 3 (i=1) | DENSITY 0 (i=2) |
|---|---|
| DENSITY 2 (i=3) | DENSITY 1 (i=4) |

DENSITY 0

DENSITY 1

DENSITY 2

DENSITY 3

DENSITY 4

DENSITY 5

DATA 0

DATA 1

DATA 0

DATA 1

DATA 2

DATA 3

DATA 0

DATA 1

DATA 0

DATA 1

DATA 0 HAVING DENSITY 0

DATA 1 HAVING DENSITY 0

DATA 0 HAVING DENSITY 1

DATA 1 HAVING DENSITY 1

DATA 0 HAVING DENSITY 2

DATA 1 HAVING DENSITY 2

DATA 0 HAVING DENSITY 3

DATA 1 HAVING DENSITY 3

| DATA 0<br>DENSITY 3<br>(i=1) | DATA 1<br>DENSITY 0<br>(i=2) |
|---|---|
| DATA 1<br>DENSITY 2<br>(i=3) | DATA 0<br>DENSITY 1<br>(i=4) |

FILTER FOR DATA 0

FILTER FOR DATA 1

| DATA 0 | DATA 1 |
|---|---|
| DATA 1 | DATA 0 |

FILTER FOR DATA 0

FILTER FOR DATA 1

EXTRACT DATA 0

EXTRACT DATA 1

WRONG DOT

EXTRACT DATA 0

EXTRACT DATA 1

INFORMATION EMBEDDING APPARATUS AND INFORMATION EMBEDDING METHOD FOR ADDING INFORMATION TO DOCUMENT IMAGE BY EMBEDDING INFORMATION THEREIN, INFORMATION DETECTING APPARATUS AND INFORMATION DETECTING METHOD

This application is a divisional application of application Ser. No. 11/435,097, filed May 16, 2006, which is based on Japanese Patent Application No. 2005-145806 filed with the Japan Patent Office on May 18, 2005, the entire content of which is hereby incorporated by reference.

BACKGROUND OF THE INVENTION

1. Field of the Invention

The present invention relates to an information embedding apparatus, an information embedding method, an information detecting apparatus and an information detecting method, more particularly to an information embedding apparatus and an information embedding method for adding an information to a document image by embedding the information therein, and an information detecting apparatus and an information detecting method for detecting the information embedded in and added to the document image from the printed document image.

2. Description of the Related Art

An electronic watermarking technology in which dots are printed in a documented image so that data is embedded therein has been proposed. For example, as recited in Japanese Laid-Open Patent Publication No. 2004-128845, the dots to be embedded in the document image as the electronic watermark are embedded in accordance with three different arrangement methods so that each of the embedding arrangement methods (types) has a meaning. Further, as recited in Japanese Laid-Open Patent Publication No. 2003-101762, the data is embedded in the document image depending on in which direction the dot is darker or lighter.

The technology of "electronic watermarking for document" for embedding data in a background of the document image as a ground pattern can also be applied to MFP (Multi Function Peripherals)/LBP (Laser Beam Printer). A method for embedding and detecting the data in such a manner that a resistance against a noise factor (any unnecessary dot unintentionally printed, dot resulting from a screening process and the like) can be assured was necessary in scanning the printed document in which the data is embedded as the ground pattern by a scanner so that the data is detected. Further, it was necessary that simplified processing steps which can be realized in terms of hardware constitute the detecting function in order to install the detecting function in the MFP.

However, the method recited in Japanese Laid-Open Patent Publication No. 2004-128845 is not practical in use because it fails to attain an expected resistance against the noise factor. Further, it is not possible to add such a dot that can constitute the background image of the document image because each of the different dot arrangements includes the meaning of the data.

In the method recited in Japanese Laid-Open Patent Publication No. 2003-101762, the data is embedded depending on in which direction the dot is darker or lighter in the document image, which demands a complicated processing when the embedded data is detected. Therefore, it is difficult to make the method into hardware. Further, the method fails to achieve a high-speed processing as software either since a detecting apparatus undergoes too large a load.

SUMMARY OF THE INVENTION

Therefore, a main object of the present invention is to provide an information embedding apparatus, an information embedding method, an information detecting apparatus and an information detecting method capable of assuring a resistance against a noise factor.

Another main object of the present invention is to provide an information embedding apparatus, an information embedding method, an information detecting apparatus and an information detecting method capable of realizing processing steps which can be realized hardware-wise.

In order to achieve the foregoing objects, an information embedding apparatus according to an aspect of the present invention includes an embedding pattern storing portion for storing a plurality of types of embedding dot patterns, an embedding pattern reading portion for reading the embedding dot pattern indicating an information to be embedded in a background of a document image from the embedding pattern storing portion, and an embedding compositing portion. The embedding compositing portion composites the embedding dot pattern read by the embedding pattern reading portion with the background of the document image in a document image data generated based on a document data, and outputs the document image data composited with the embedding dot pattern. The embedding dot pattern includes a data dot placed at a position in accordance with the information to be embedded, a position dot placed at a position for instructing a reference position used for identifying the position of the data dot, and an assisting dot placed at a position for assisting the instruction of the reference position by the position dot.

According to the present invention, the embedding dot pattern includes such a plurality of dots as the position dot placed at the position for instructing the reference position used for identifying the position of the data dot and the assisting dot placed at the position for assisting the instruction of the reference position by the position dot in addition to the data dot placed at the position in accordance with the information to be embedded. Therefore, the position dot and the assisting dot can be used to detect the data dot. Accordingly, the data dot can be easily identified from a positional relationship between the plurality of dots even if the background of the document image includes such a noise factor as any unnecessary dot unintentionally printed or dot resulting from a screening process. Further, a plurality of types of the embedding dot patterns are stored in the embedding pattern storing portion. According to the present invention, the embedding dot pattern indicating the information to be embedded is read from the embedding pattern storing portion, and the read embedding dot pattern is simply composited with the background of the document image. Therefore, any complicated processing is unnecessary, and it is easy to constitute a function relating to the compositing process and an apparatus having the function as hardware.

The information embedding apparatus according to the present invention preferably further includes an additional pattern storing portion for storing a plurality of types of additional dot patterns indicating dot patterns different from the embedding dot patterns, an additional pattern reading portion for reading the additional dot pattern indicating the information to be added to the background of the document image from the additional pattern storing portion, and an addition compositing portion. The addition compositing portion composites the additional dot pattern read by the additional pattern reading portion with the background of the document image in the document image data generated based on the document data. The addition compositing portion thereafter outputs the document image data composited with the additional dot pattern.

Therefore, the embedding dot pattern indicating the information to be embedded and the additional dot pattern indicating the additional information are composited into the background, however, these two dot patterns are different from each other. Therefore, even after the background, the embedding dot pattern and the additional dot pattern are composited with one another, the embedding dot pattern can be detected from the composite document image data.

The different embedding dot patterns corresponding to a respective plurality of different values are preferably stored in the embedding pattern storing portion. The embedding pattern reading portion includes an embedding data forming portion for converting the information to be embedded into a bit sequence indicating the information. The embedding pattern reading portion reads the embedding dot pattern corresponding to a value of each bit in the bit sequence converted by the embedding data forming portion from the embedding pattern storing portion.

Therefore, the compositing process in which the plurality of different types of the embedding dot patterns are selected and used depending on the contents instructed by the information to be embedded, that is the arrangements of the values of the bit sequence, can be realized.

As a preferable mode of the foregoing constitution, the different additional patterns corresponding to the plurality of different values are stored in the additional pattern storing portion. The additional pattern reading portion reads the information to be added as an element value and reads the additional dot pattern corresponding to the read element value from the additional pattern storing portion.

Therefore, the plurality of additional dot patterns can be selected and composited in accordance with the contents instructed by the information to be added.

As a preferable mode of the foregoing constitution, a dot density is different in each of a plurality of types of the additional dot patterns. Therefore, the background into which the additional dot pattern is composited can present a gradation of the pattern.

As a preferable mode of the foregoing constitution, the additional dot pattern includes an independent dot. Assuming that the document image data into which the additional dot pattern is composited is printed, and the printed document is copied by a copying machine, the independent dot is erased on the image constituting the copying result because the copying machine has such a function that presents the background as a white background. Therefore, whether or not the document image was copied or not (including illegal copy) can be determined in one glance because the additional dot pattern cannot maintain its original pattern in the background of the copied document image.

The independent dot is erased, and the additional dot pattern in the background thereby changes into an insignificant rough pattern, as a result of which it becomes more difficult to discriminate the embedding dot pattern in the background of the copied document image. Therefore, the information to be embedded can effectively remain confidential in the background.

As a preferable mode of the foregoing constitution, an addition compositing portion is further provided. The addition compositing portion composites the additional dot pattern indicating the dot pattern different from the embedding dot pattern with the background of the document image in the document image data generated based on the document data, and outputs the document image data composited with the additional dot pattern. The addition compositing portion compares a threshold value previously set in each element in a threshold pattern presented by a two-dimensional element matrix having a same size as that of the background of the document image to a corresponding element value in the background. Then, the addition compositing portion outputs the corresponding element value to the composite document image data in accordance with a result of the comparison.

Therefore, the preparation of one threshold pattern allows the compositing process in which the plurality of additional dot patterns are used. As a result, a memory capacity relating to the addition storing portion for storing the plurality of additional dot patterns can be saved.

An information detecting apparatus for detecting a predetermined information in accordance with a predetermined dot pattern printed on a predetermined region of a sheet of paper according to another aspect of the present invention includes a particular element dot detecting portion and an information detecting portion. The particular element dot detecting portion scans the predetermined region using an element matrix for detecting an element corresponding to an identifying dot used for identifying the predetermined information of the predetermined dot pattern and detects a dot of an element in the predetermined region relevant to the particular element corresponding to the identifying dot of the element matrix. The information detecting portion detects the predetermined information based on a result of the detection by the particular element dot detecting portion and the predetermined dot pattern.

Thus, the predetermined region is scanned by means of the element matrix so that the predetermined information is detected. In the scan, the dots relevant to all of the elements of the element matrix are not detected, but the dot is limitedly detected for a part of the elements in the predetermined region relevant to the particular element corresponding to the identifying dot. Therefore, the scan using the element matrix, which is not a complicated processing, can be easily realized in terms of hardware. Further, when the process is realized in terms of software in order to detect the dot of the limited partial element, the information can be speedily detected.

Further, even if any dot which does not follow the dot pattern, for example, an additional dot (including smear generated when printed and noise component) is printed on the paper, the detection can avoid any error resulting from the additional dot because the dot of the element is detected in accordance with the dot arrangement of the dot pattern.

As a preferable mode of the foregoing constitution, the dot pattern includes a data dot placed at a position in accordance with information to be embedded, a position dot placed at a position for instructing a reference position used for identifying the position of the data dot, and an assisting dot placed at a position for assisting the instruction of the reference position by the position dot. The identifying dot is a dot for detecting the position of the data dot.

Therefore, even if such a noise factor as any unnecessary dot unintentionally printed or dot printed in the screening process is present in the predetermined region, a relative positional relationship indicated by the plurality of dots, which are the data dot, position dot and assisting dot, allows the data dot placed at the position in accordance with the predetermined information to be easily identified.

The identifying dot preferably denotes the data dot. The identifying dot preferably denotes the position dot.

The particular element dot detecting portion preferably detects the dot of the element in the predetermined region corresponding to the element of the element matrix relevant to a position where the dot is not placed in the predetermined dot pattern. Then, the particular element dot detecting portion detects the dot of the element in the predetermined region corresponding to the particular element of the identifying dot in the element matrix based on a result of the detection. A part of the elements includes the element of the element matrix relevant to the position where the dot is not placed in the dot pattern.

Therefore, the element of the element matrix relevant to the position where the dot is not placed in the predetermined dot pattern is also referenced for the detection, the dot pattern whose conditions include the absence of the dot can be applied. As a result, the noise (dot unintentionally printed) can be effectively eliminated in the detection.

According to the aspect of the present invention, even if the noise such as the unnecessary dot unintentionally printed or the dot resulting from the screening process is included in the background of the document image, the positional relationship between the plurality of dots allows the data dot to be easily identified.

Further, according to the present invention, a plurality of types of the embedding dot patterns are previously stored in the embedding pattern storing portion, and the embedding dot pattern indicating the information to be embedded is read from the embedding pattern storing portion, and the read embedding dot pattern is composited with the background of the document image. This processing is not complicated and can be easily realized hardware-wise.

According to the another aspect of the present invention, the scan using the element matrix is executed in order to detect the predetermined information. In the scan, the dots relevant to all of the elements in the element matrix are not detected, but the dot is limitedly detected for the partial element in the predetermined region relevant to the particular element corresponding to the identifying dot. The processing relating to the scanning, which is not complicated, can be easily made into hardware. Further, the speedy information detection can be obtained because the dot of the partial element is limitedly detected.

Further, even if any dot which does not follow the dot pattern, for example, the additional dot (including smear generated when printed and noise component) is present, the detection can avoid any error resulting from the other additional dot because the dot of the element is detected in accordance with the dot arrangement of the dot pattern.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B each shows an example of an embedding pattern.

FIG. 5 shows an exemplified arrangement of data cells with respect to an image of a document image data.

FIG. 13 shows an example of a printed document in which the additional information has been embedded.

DESCRIPTION OF THE PREFERRED EMBODIMENTS

Figure 1:
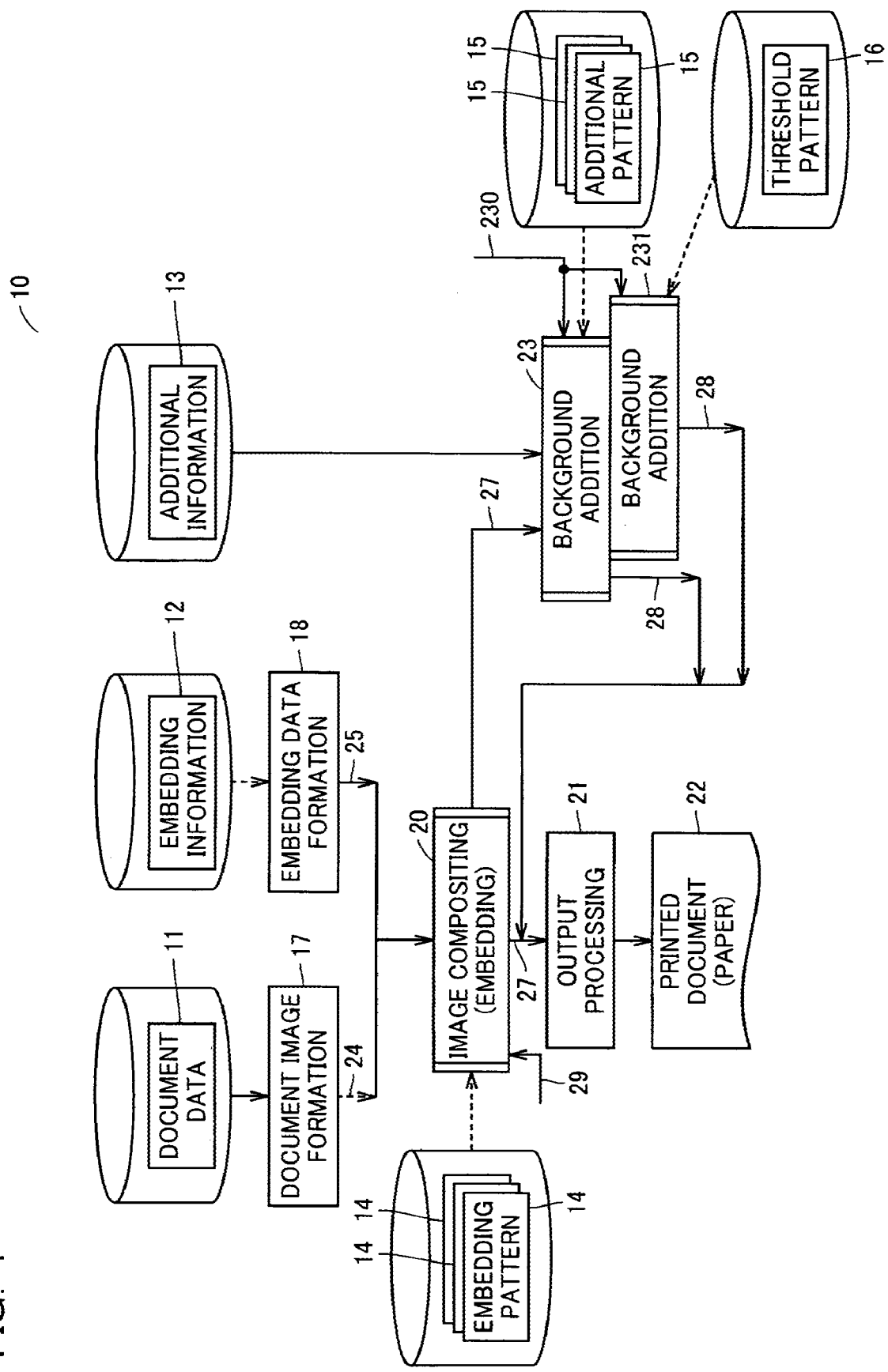
FIG. 1 shows an example of functional components of an information embedding apparatus.

Hereinafter, preferred embodiments of the present invention are described referring to the drawings. In this specification, an information embedding apparatus for embedding (compositing) a confidential information and the like in a background of an image as a so-called electronic watermark is described in preferred embodiments 1-6, and an information detecting apparatus for detecting the information for the electronic watermark thus embedded is described in preferred embodiments 7-11.

An example of functional components of the information embedding apparatus is shown in FIG. 1. A configuration of a computer in which the information embedding apparatuses and the information detecting apparatuses according to the preferred embodiments are installed is shown in FIG. 2.

Figure 2:
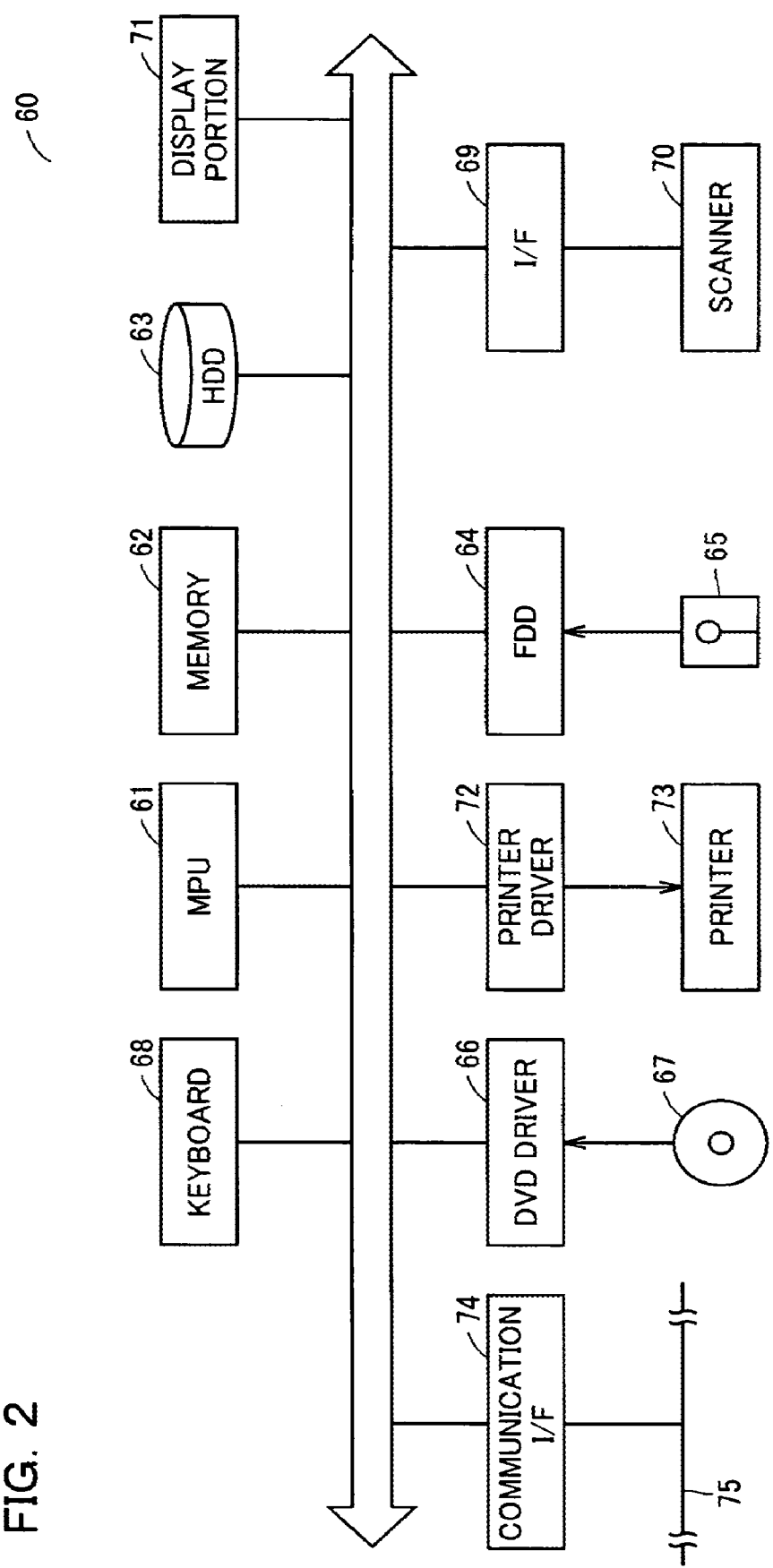
FIG. 2 shows a configuration of a computer in which information embedding apparatuses and an information detecting apparatuses according to respective preferred embodiments of the present invention are installed.

Referring to FIG. 2, a computer 60 in which the information embedding apparatus and the information detecting apparatus are installed includes a MPU (Micro Processing Unit) 61 for intensively controlling the computer itself, a memory 62 in which various informations, programs or the like are stored, a HDD (Hard Disk Drive) 63, an FDD (FD Driver) 64 to which an FD (Flexible Disk) 65 is detachably attached for accessing attached FD 65, and a DVD driver 66 to which a DVD (Digital Versatile Disc) 67 is detachably attached for accessing attached DVD 67. Computer 60 further includes a keyboard 68 for inputting the various informations from outside, and a scanner 70 connected via an I/F (abbreviation for interface) 69. To computer 60 are connected a display portion 71 for outputting the various informations and a printer 73 controlled by a printer driver 72. Computer 60 further includes external various communication lines (including Internet) 75 and a communication I/F 74 for transmitting and receiving the informations with respect to computer 60.

Processing steps for embedding the information and processing steps for detecting the information according to the respective preferred embodiments, which will be described later, are previously stored in memory 62, HDD 63, FD 65, DVD 67 and the like as programs. MPU 61 reads the programs from these recording media and executes the read programs so that the processing steps for embedding the information and the processing steps for detecting the information are implemented. Computer 60 shown in FIG. 2 can communicate with outside via communication lines 75. Therefore, the programs may be downloaded into the recording media from outside via communication lines 75.

FIG. 1 shows functional components of an information embedding apparatus 10. In information embedding apparatus 10, a document data 11 of a document image in which the information is embedded, an embedding information 12 corresponding to the confidential information for the electronic watermark to be embedded in the background of the document image, an additional information 13 to be added to the background of the document image, a plurality of embedding patterns 14 to be embedded in the document image, and a plurality of additional patterns 15 and threshold pattern 16 to be added to the background of the document image are stored in predetermined memory regions such as memory 62, HDD 63, DVD 67, FD 65 and the like. Information embedding apparatus 10 includes a document image forming portion 17, an embedding data forming portion 18, an image compositing portion 20, an output processing portion 21 and a background adding portion 23 (or a background adding portion 231). These portions are previously stored as programs in the predetermined memory regions such as memory 62, HDD 63, DVD 67, FD 65 and the like. These programs are read from the predetermined memory regions by MPU 61 and executed, so that the functions of the respective portions are realized. Background adding portions 23 and 231 are not simultaneously activated, and one of them is selectively activated.

In an operation, document image forming portion 17 reads document 11 and generates an image data 24 showing an image in a state document data 11 is printed on a sheet of paper per page based on read document data 11. Document image data 24 is a black and white two-value image. On the image, white elements (elements whose values are 0) constitute the background, while black elements (elements whose values are 1) constitute a character region (region where ink is printed). Therefore, the image and the background are discriminated from each other based on the criteria.

Document image forming portion 17 outputs document image data 24. Embedding data forming portion 18 reads embedding information 12, and forms and outputs an embedding data 25 based on read embedding information 12. In the processing of embedding data forming portion 18, first, embedding information 12 is converted into an N-value code, and converted embedding information 12 is outputted as embedding data 25. N is an arbitrary value, and N=2 in this specification. Therefore, the generated code of embedding data 25 is a two-value code and expressed in a bit sequence of 0 and 1.

Image compositing portion 20 inputs document image data 24 supplied from document image forming portion 17 and embedding data 25 supplied from embedding data forming portion 18, and embeds the information in document image data 24 in accordance with embedding data 25. Image compositing portion 20 selectively supplies a composite image data 27 obtained as a result of the information embedding to one of output processing portion 21 and background adding portion 23 based on a supplied selection instruction 29. More specifically, composite image data 27 is outputted to background adding portion 23 in the case of embedding the information such as image in the background of the composite image, while being outputted to output processing portion 21 otherwise. It is assumed that selection instruction 29 is supplied from outside when a user operates keyboard 68.

Output processing portion 21 inputs composite image data 27 supplied from image compositing portion 20 or a composite image data 28 including the background supplied from background adding portion 23, and prints out an image in accordance with the inputted image data. As a result, a printed document (paper) 22 is obtained.

Background adding portion 23 (or background adding portion 231) reads an additional information 13 when composite image data 27 is supplied thereto, and reads an additional pattern 15 indicated by read additional information 13. Additional information 13 shows a type of an image data. Background adding portion 23 reads additional pattern 15 in accordance with a value of each element in the image data shown by additional information 13.

Background adding portion 23 (or background adding portion 231) inputs composite image data 27 outputted from image compositing portion 20 and adds additional pattern 15 based on additional information 13 to the background of inputted composite image data 27. As a result, composite image data 28 including the background is thereby outputted to output processing portion 21. Therefore, the document image resulting from composite image data 28 including the background is obtained as printed document (paper) 22 via output processing portion 21.

Background adding portions 23 and 231 do not simultaneously function. One of the portions starts its operation in response to selection instruction 230, while the other is remains non-operable. Selection instruction 230 is supplied from outside by the user via keyboard 68.

Preferred Embodiment 1

Figure 3:
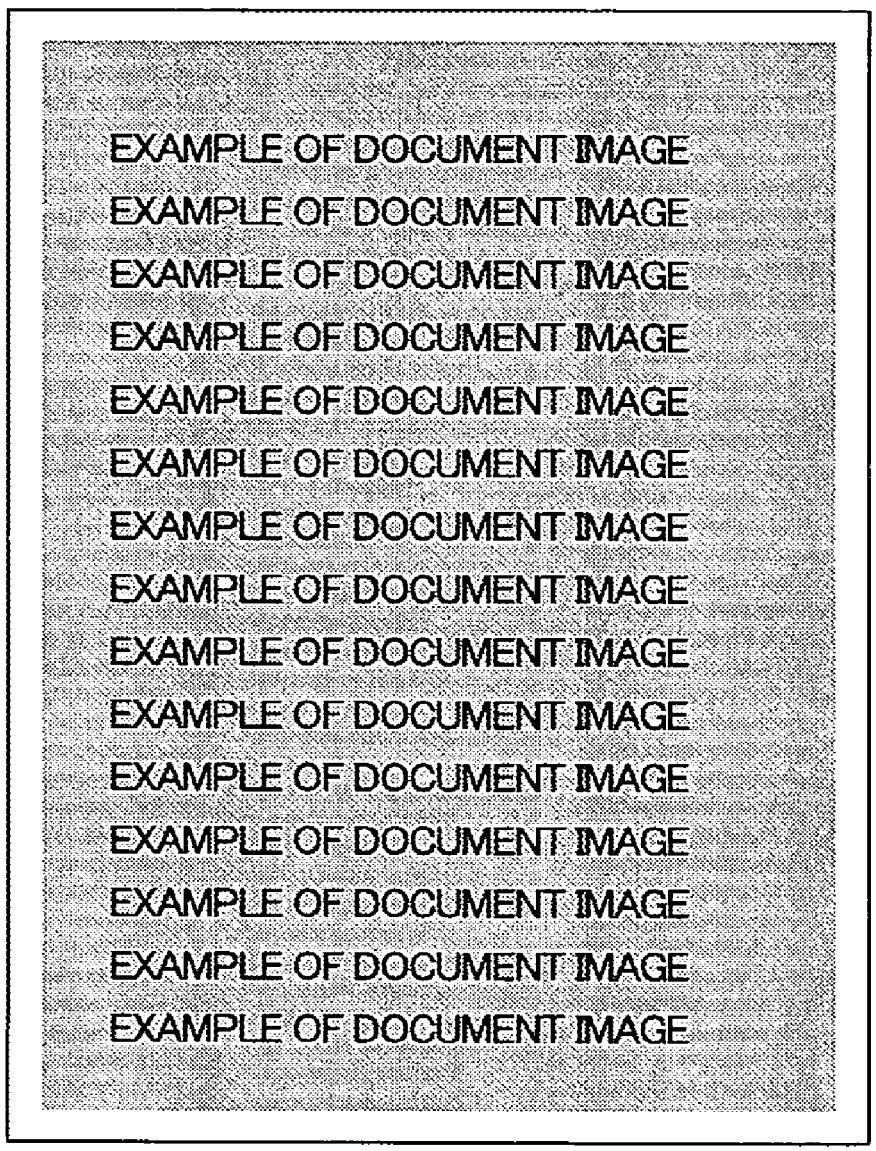
FIG. 3 shows an example of a printed document.

In a preferred embodiment 1 of the present invention, information characterized in having a dot for representing a position, a dot assisting the representation of the position and a dot for representing the embedding data is embedded by image compositing portion 20. Referring to FIG. 1, image compositing portion 20 embeds data of embedding information 12 as a dot pattern in the background of the image of inputted document image data 24. An example of printed document 22 resulting from the embedding is shown in FIG. 3. In FIG. 3, the data of embedding information 12 is embedded in the document image so that the data cannot be easily visually recognized.

In FIG. 1, a plurality of different embedding patterns 14 are stored in the memory in association with each possible value of each bit in the bit sequence of embedding data 25 for each of the values. In a similar manner, plurality of different additional patterns 15 are stored in the memory in association with each possible value of each element of the image data shown by additional information 13 for each of the values.

Image compositing portion 20 selectively reads embedding pattern 14 shown in FIG. 4A when the value is 0 (referred to as data 0) and selectively reads embedding pattern 14 shown in FIG. 4B when the value is 1 (referred to as data 1) for each bit of the bit sequence of embedding data 25. Then, image compositing portion 20 composites the background image and read embedding pattern 14 into each other in such a manner that read embedding pattern 14 is embedded in the background of the image of document image data 24.

Embedding patterns 14 shown in FIGS. 4A and 4B each shows a binarized pattern of 16×16 elements two-dimensionally arranged (hereinafter, referred to as data cell). In embedding pattern 14 according to the present preferred embodiment, an element, which is a position representing dot D1 showing a reference position, is placed at an upper-left end in a two-dimensional space (plane). The reference position is a position used as the reference for judging a position of a data representing dot D3, which will be described later, in the same two-dimensional space. A plurality of data cells as unit patterns are embedded adjacent to one another in the image of document image data 24, so that position representing dots D1 are placed for every 16 elements in two directions, which are an upper-lower direction (vertical direction) and a right-left direction (horizontal direction), in the image of composite image data 27. Position representation assisting dots D2 are placed at positions distant from position representing dots D1 by eight elements to right and left in the same two-dimensional space. As described earlier, the same data cells are repeatedly placed adjacent to one another on the same plane (two-dimensional space), so that position representation assisting dots D2 are placed at positions distant from position representing dots D1 by eight elements in the upper-lower direction (vertical direction) and the right-left direction (horizontal direction). Further, data representing dot D3 is placed at different positions in data 0 (see FIG. 4A) and data 1 (see FIG. 4B) in order to embed the information. Assuming that the information is embedded at the resolution of 600 dpi, the data cell has a side having the length of $16/600$ inch (0.068 cm), which is very small, and a print-out result is apparently grey as shown in FIG. 3.

Figure 6:
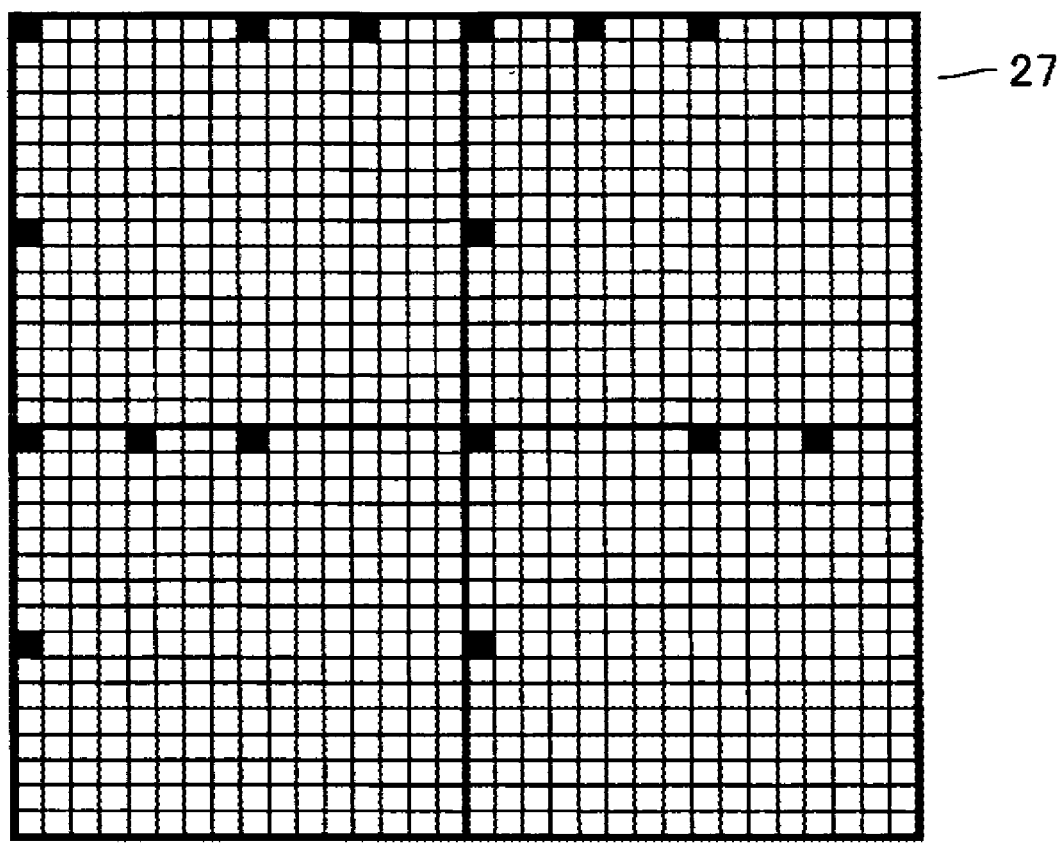
FIG. 6 shows a state where dots are embedded in accordance with the arrangement shown in FIG. 5.

An example of the arrangement of the data cells with respect to the image of document image data 24 is shown in FIG. 5. FIG. 5 shows an example of the arrangement of embedding patterns 14 (data cells) in the case where embedding data 25 of four bits is embedded in four partial image regions (i=1, 2, 3, 4) of document image data 24 having 32×32 elements (all white elements). FIG. 6 shows a state where the dots are embedded in accordance with the arrangement shown in FIG. 5. In the drawing, the image of document image data 24 has a rectangular shape and divided into a plurality of rectangular partial regions each having the same size as that of the data cell shown in FIG. 5. Image compositing portion 20 adjacently embeds embedding patterns 14 each corresponding to the bit value (0 or 1) of the bit sequence of embedding data 25, starting with a leading position thereof, in accordance with a predetermined order (order from upper-left end to lower-right end of the rectangular region of the image shown in FIG. 5) in the respective partial regions. It is assumed that the predetermined order follows a numerical order shown by a variable i in FIG. 5, and is previously set in processing steps (in the program) of image compositing portion 20. The predetermined order may follow other order.

The embedding recited in this specification refers to replacement of the value of each element in the partial regions of the background with the corresponding element value of embedding pattern 14. Therefore, the element value is updated to 1 in the case where the corresponding element of embedding pattern 14 is black (1: dot is present), while the element value is not updated in the case where the corresponding element is white (0: no dot).

Figure 7:
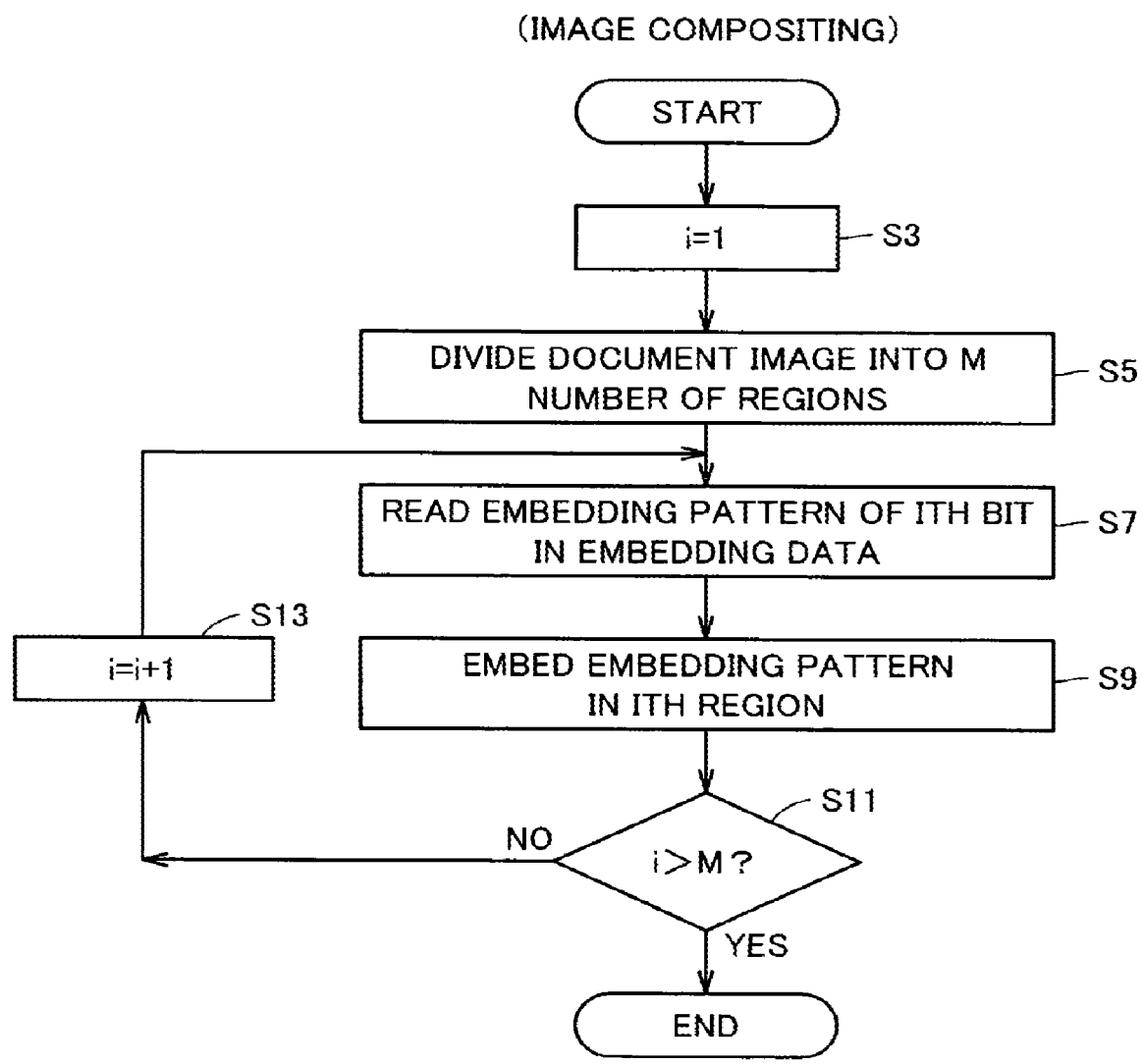
FIG. 7 is a flow chart of an example of processing steps by an image compositing portion.

Referring to FIG. 7, the processing steps of image compositing portion 20 according to the present preferred embodiment is described.

In image compositing portion 20, first, temporary variable i for the control operation is initialized to 1 (Step S3 (hereinafter, simply abbreviated to S)). Next, the background image of document image data 24 is divided in a predetermined M number of partial image regions (S5).

Next, embedding pattern 14 corresponding to a value of ith bit (data 0 or data 1) of embedding data 25 (bit sequence of coded data) is read (S7), and read embedding pattern 14 is embedded in the background image of the ith partial region (S9). Thereafter, it is determined whether or not a value of variable i exceeds a value of a variable M (S11). When the value of variable i exceeds the value of variable M, the processing is terminated (YES in S11). When the value of variable i does not exceed the value of variable M (NO in S11), the value of variable i is incremented by 1 (S13), and the processing returns to S7. Thereafter, S7 and S9 are repeated until the value of variable i exceeds the value of variable M, in other words, until embedding pattern 14 of the data value of the corresponding bit of the embedding data 25 is embedded in accordance with the predetermine order in all of the images of the M number of partial regions in the background image of document image data 24.

Position representation assisting dot D2 serves to assist the display of the reference position by position representing dot D1. The role of position representation assisting dot D2 is more specifically described in comparison to an example of the embedding pattern where position representation assisting dot D2 is not included.

Figure 8:
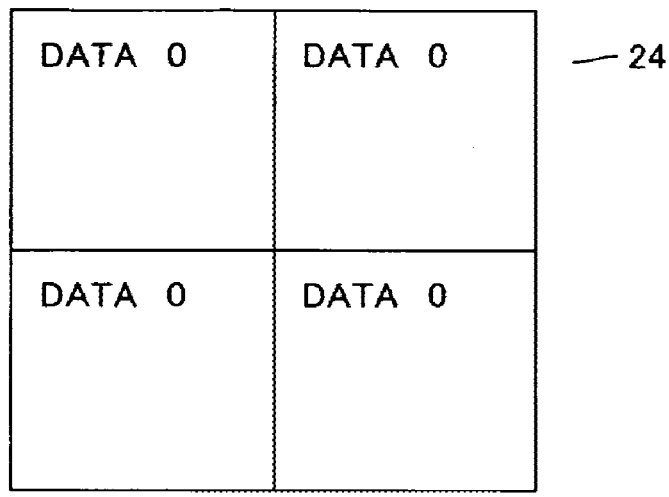
FIG. 8 shows another exemplified arrangement of data cells with respect to the image of the document image data.
Figure 9:
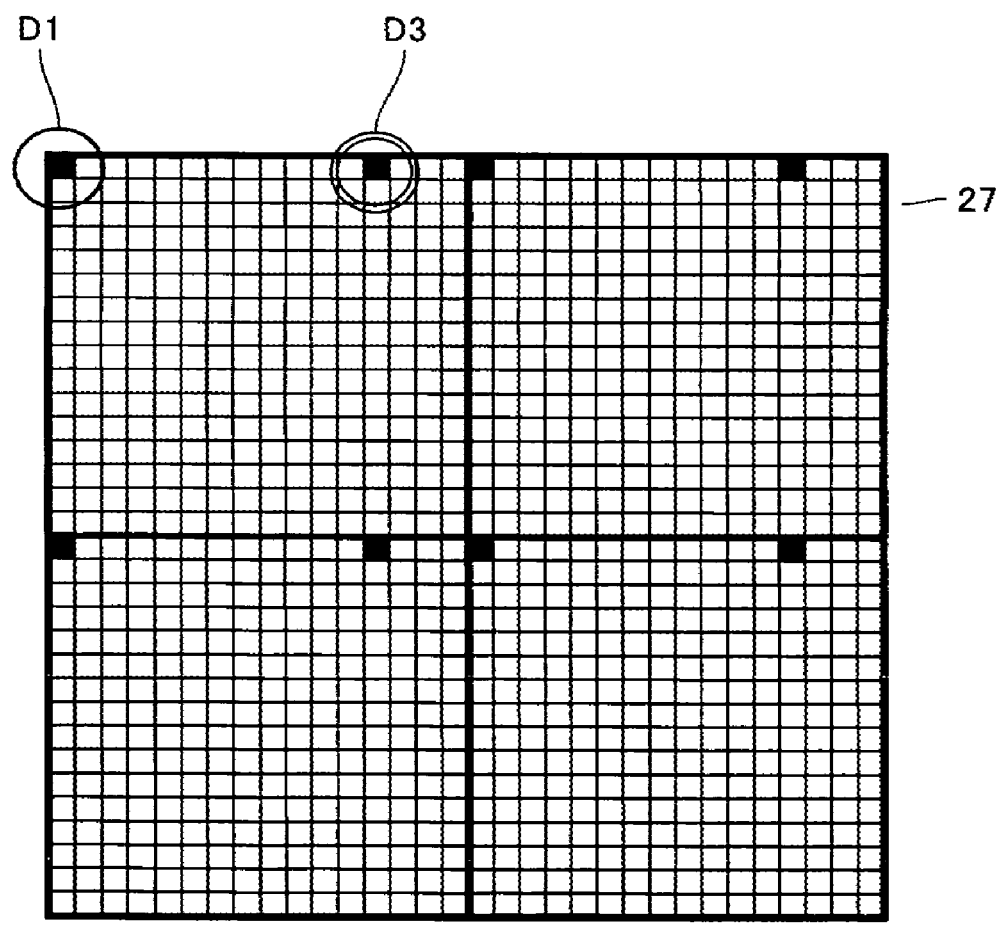
FIG. 9 is a descriptive view of a role of a position representation assisting dot.

In contrast to FIG. 5, when the data cell of data 0 (position representation assisting dot D2 not included) is embedded in all of the partial regions as shown in FIG. 8, the dots are embedded as shown in FIG. 9. Observing the embedded dots in printed document 22 obtained by printing FIG. 9, position representing dots D1 and data representing dots D3 are both placed distant by 16 elements in both of the upper-lower (vertical) direction and right-left (horizontal) direction likewise, which makes it not possible to distinguish position representing dot D1 and data representing dot D3 from each other.

Figure 10:
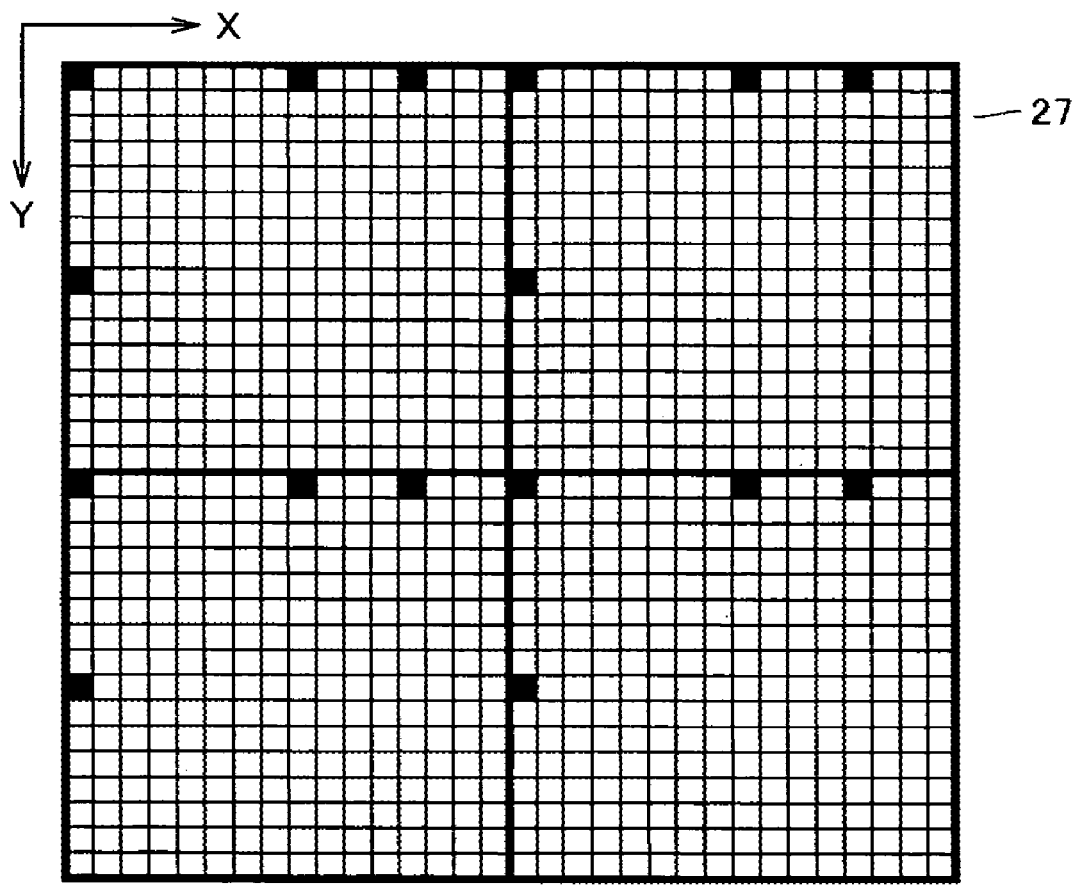
FIG. 10 is a descriptive view of the role of the position representation assisting dot.
Figure 11:
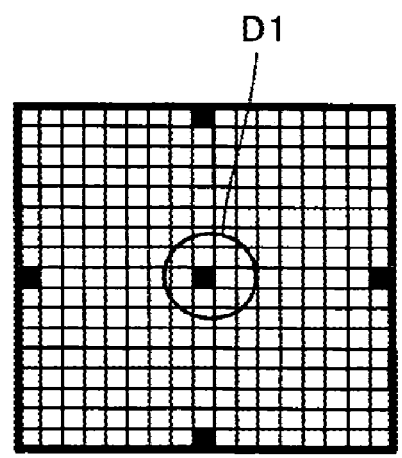
FIG. 11 is a descriptive view of the role of the position representation assisting dot.

In contrast to that, when the data cell including position representation assisting dot D2 is embedded, the dots are placed in the image of printed document 22 (image of composite image data 27) as shown in FIG. 10 even though the data cell of data 0 is embedded in all of the partial regions as shown in FIG. 8. Therefore, in FIG. 10, an arrangement pattern of the dots shown in FIG. 11 can be detected, and a central dot of the detected pattern can be detected as position representing dot D1. As a result, it can be determined that data 0 is embedded in the presence of the black element (dot) at the position of data representing dot D3 of data 0, and data 1 is embedded in the presence of the black element (dot) at the position of data representing dot D3 of data 1 based on the detected position representing dot D1 as the reference.

Thus, embedding pattern 14 includes, not only position representing dot D1 for representing the reference position for determining the position of data representing dot D3 which represents the data to be embedded, but also position representation assisting dot D2 for assisting the position representation thereof. Therefore, the position of data representing dot D3 can be accurately detected.

Preferred Embodiment 2

In the preferred embodiment 1, only embedding information 12 is embedded in the background of the image of document image data 24. In a preferred embodiment 2 of the present invention, additional information 13 irrelevant to embedding information 12 is appended in addition to embedding information 12 as additional pattern 15 which is the corresponding dot pattern. As a result, a gradation based on a dot density (aggregate state) of the dot pattern such as pattern or design can be presented. However, the dot pattern of additional pattern 15 and the dot pattern of embedding pattern 14 are different from each other.

Referring to FIG. 1, background adding portion 23 inputs additional information 13 to inputted composite image data 27 (see FIG. 3) as the information to be added to the background of the document image thereof, that is the information to be composited into the background. Then, when the dot pattern (additional pattern 15) corresponding to the value of each element of the image data shown by inputted additional information 13 is added to the background of the image of composite image data 27, composite image data 28 including the background is formed. When composite image data 28 including the background is printed by output processing portion 21, printed document 22 as shown in FIG. 13 is outputted. FIG. 13 shows an example where additional information 13 shown in FIG. 12 such as pattern is added to the background of the image.

Figure 12:
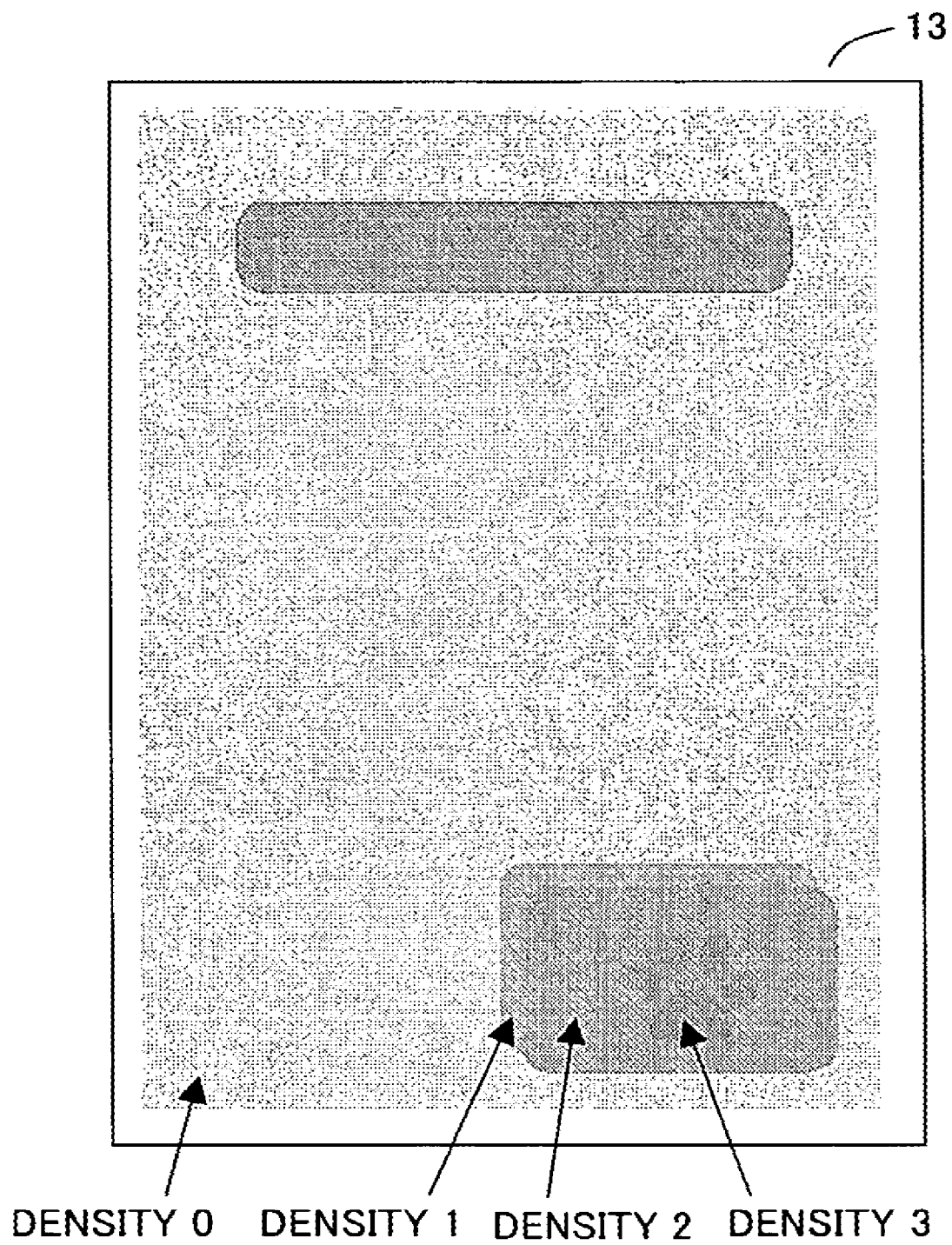
FIG. 12 shows an example of an additional information.
Figure 14A:
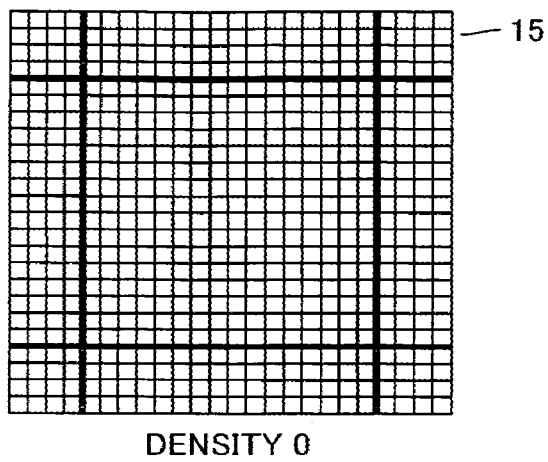
FIGS. 14A-14D each shows an example of an additional pattern.
Figure 14B:
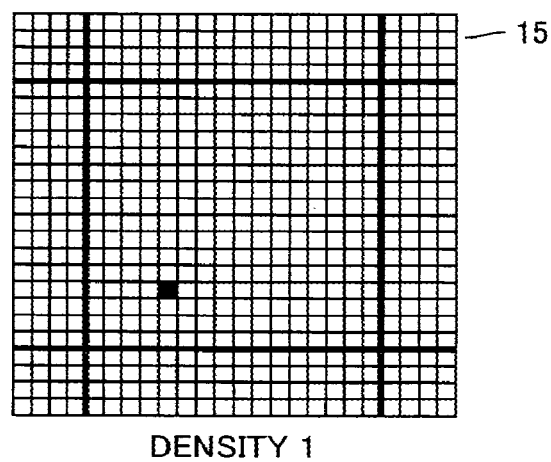
Figure 14C:
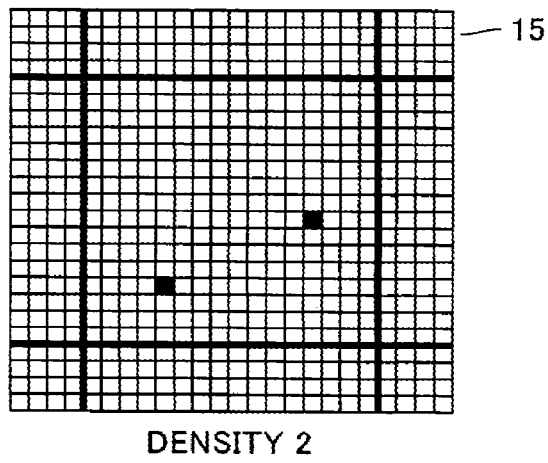
Figure 14D:
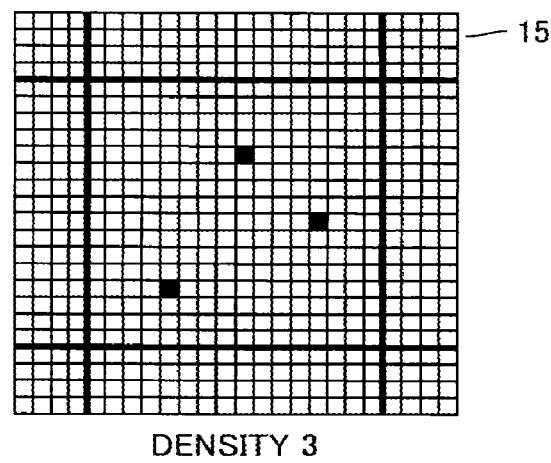

In the process implemented by background adding portion 23, additional patterns 15 (dot patterns) having different density values 0, 1, 2 and 3 are used as additional pattern 15 as shown in FIG. 12. Additional pattern 15 denotes information for making the background appear to be, not the grey background, but a pattern, an image or the like and is irrelevant to embedding pattern 14 used in the processing steps of image compositing portion 20 according to the preferred embodiment 1. It is assumed that additional patterns 15 as the dot patterns having the densities corresponding to the density values are previously determined, for example, as shown in FIGS. 14A-14D. When these additional patterns 15 are embedded, the different densities can be presented in the background image because the number of the dots embedded in the background is different depending on the density values. Each element value of the image data shown by additional information 13 is any of 0, 1, 2 and 3.

Figures 15, 16:
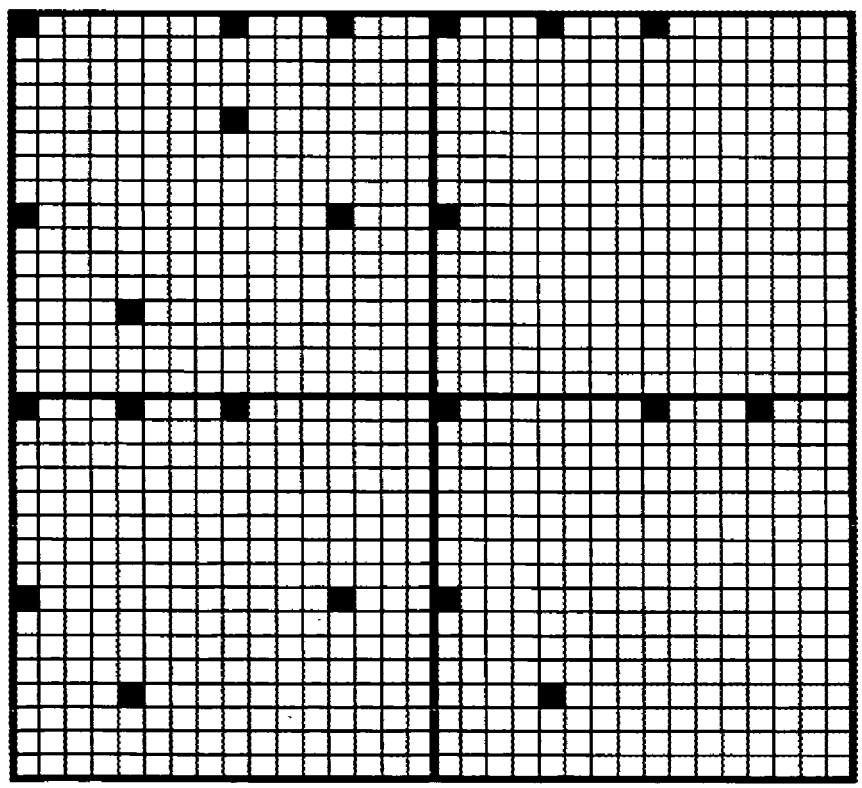
FIG. 15 shows an exemplified arrangement of the additional information with respect to the image of the document image data.
FIG. 16 shows an example of a composite image data in which the additional information has been embedded.

FIG. 15 shows an example of the arrangement of additional patterns 15 (dot patterns) with respect to the image of composite image data 27. FIG. 15 is an enlarged view of a part of FIG. 12, wherein the arrangement example of additional patterns 15 added to four partial image regions (i=1, 2, 3 and 4) in the background of the document image of composite image data 27 having 32×32 elements (all white elements) in accordance with additional information 13 is shown. FIG. 16 shows a state where the dots are embedded in accordance with the arrangement shown in FIG. 15. In the drawing, the image of composite image data 27 is rectangular, and the background of the image is divided into a plurality of rectangular partial regions having the same size as that of the dot pattern (16 elements×16 elements) of additional pattern 15 as shown in FIG. 15. To the respective partial regions, additional pattern 15 corresponding to the element value of the image data shown by additional information 13 is added in accordance with a predetermined order (order from upper left end of the rectangular region of the image toward lower right end thereof in FIG. 15). The predetermined order follows a numeral order denoted by i shown in FIG. 15, and may follow other order.

In the case of adding the density information as shown in FIG. 15 is added to FIG. 6 as the actual arrangement example, the dots are added as shown in FIG. 16. As a result, the background of the image of printed document 22 additionally includes a pattern as shown in FIG. 13, and the background apparently including a design irrelevant to embedded data (embedding information 12) is printed. As a result, the data achieves a high confidentiality, and the user hardly notices that embedding information 12 is embedded when he/she observes printed document 22. Therefore, the data (embedding information 12) can be embedded as a design for a certificate or a ticket, which effectively achieves a high data confidentiality.

Figure 17:
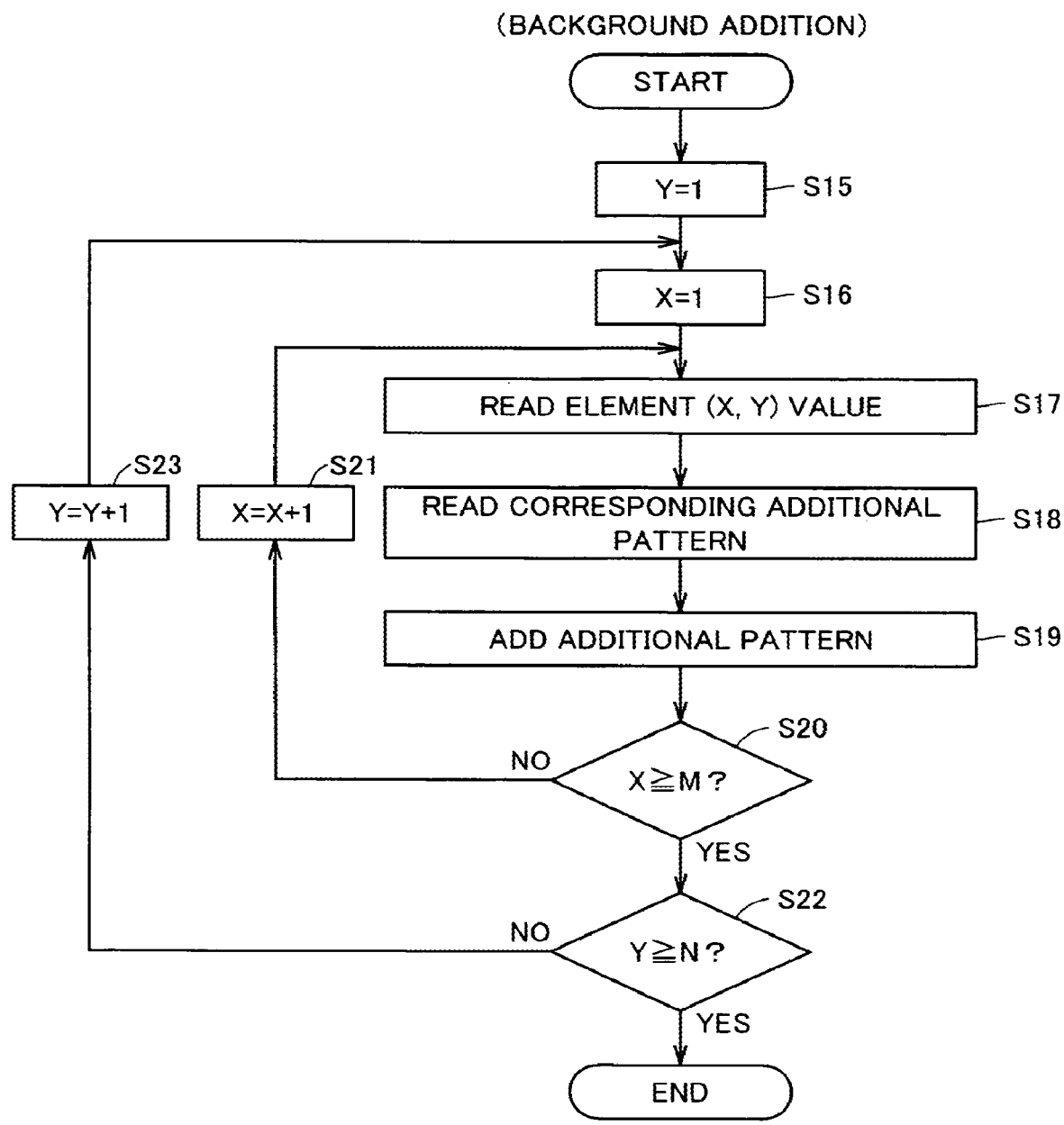
FIG. 17 is a flow chart of an example of processing steps by a background adding portion.

Referring to FIG. 17, processing steps of background adding portion 23 according to the preferred embodiment 2 are described. The image data shown by additional information 13 is a two-dimensional (planar) image data defined by X axis and Y axis orthogonal to each other, and a temporary variable X ($X=1, 2, 3, \ldots, M$) for indicating the element in a direction in parallel with the X axis and a temporary variable Y ($X=1, 2, 3, \ldots, N$) for indicating the element in a direction in parallel with the Y axis are used. Therefore, each element is indicated by variables (X, Y) of coordinates. It is assumed that the image data shown by additional information 13 has M number of elements in the direction in accordance with the X axis and N number of elements in the direction in accordance with the Y axis.

In background adding portion 23, first, temporary variables X and Y for the control operation are initialized (Steps S15 and S16). Next, the value (density value) of the element (X, Y) of the image data shown by additional information 13 is read, and additional pattern 15 corresponding to the read value is read (S17 and S18). Then, read additional pattern 15 is added to the background of composite image data 27 (S19). The additional pattern 15 is added in accordance with the order of 1, 2, 3 and 4 denoted by variable i as shown in FIG. 15. Thereafter, it is determined whether or not the value of variable X exceeds the value of variable M (S20). When the value of variable X does not exceed the value of variable M (NO in S20), the value of variable X is incremented by 1 (S21), and the processing returns to S17 so that steps thereafter are repeated. When the value of variable X exceeds the value of variable M (YES in S20), it is determined whether or not the value of variable Y exceeds the value of a variable N (S22). When the value of variable Y does not exceed the value of variable N (NO in S22), the value of variable Y is incremented by 1 (S23), and the processing returns to S16 so that steps thereafter are repeated. When the value of variable Y exceeds the value of variable N (YES in S22), the processing is terminated.

Thus, additional pattern 15 corresponding to each element value of the image data shown by additional information 13 is added to the background of composite image data 27 in accordance with the order of the values indicated by variable i in FIG. 15 in S17-S19.

Though the four gradation degrees of 0-3 were shown as the density, the background appears as if a photograph can be printed when the number of the gradation degrees is increased to approximately eight or 16 by further adding the dots or the like, in other words, when the types of additional pattern 15 are increased. The number of the applied gradation degrees may be arbitrarily changeable or may be set as a fixed value.

Another Example of Pattern Addition to Background

Figure 18:
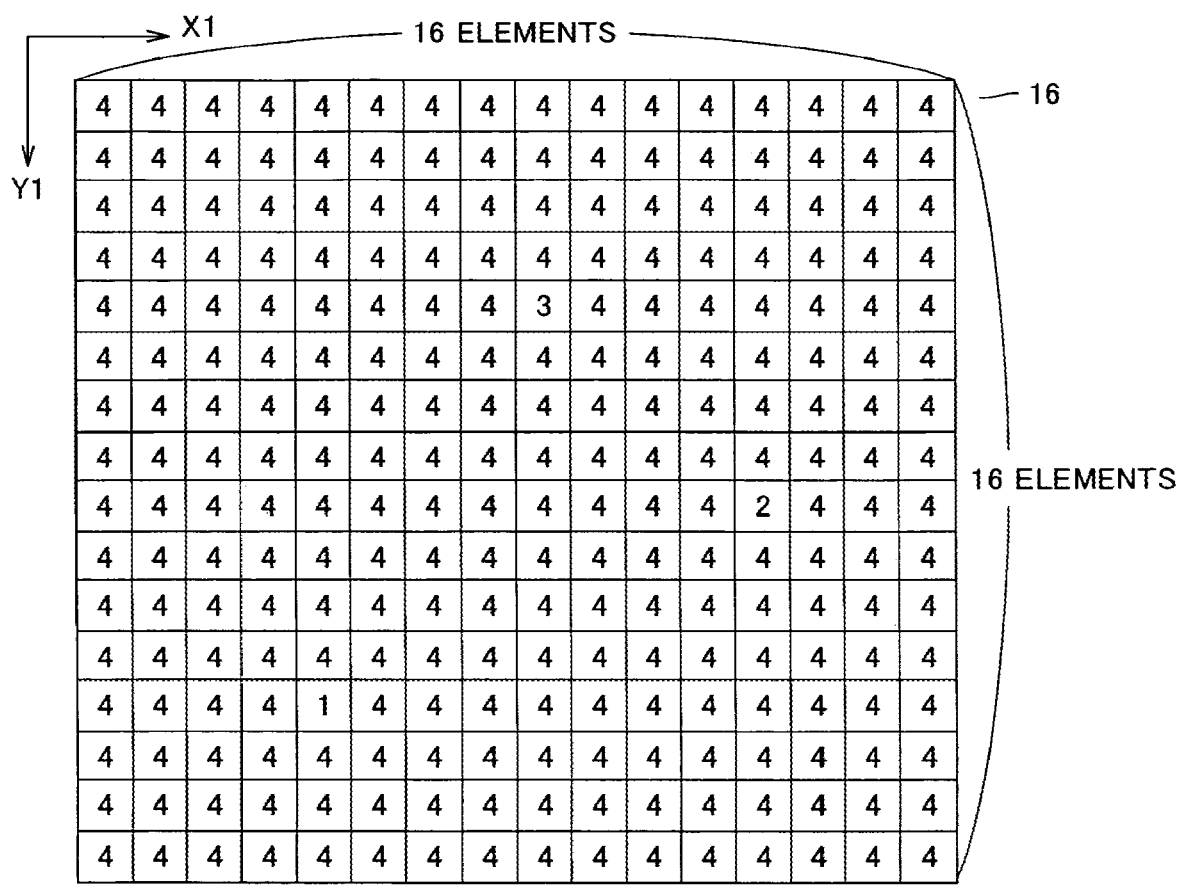
FIG. 18 shows an example of a threshold pattern.

Instead of using the pattern for each density as shown in FIGS. 14A-14D by background adding portion 23, a threshold pattern 16 shown in FIG. 18 by background adding portion 231 may be used. Threshold pattern 16 denotes a threshold information on whether or not the dot is turned on as in the case of a dithering process. In the foregoing manner, such advantages that only one pattern, which is threshold pattern 16, can be used (memory capacity can be small), a method employed in the dithering process can be directly used in order to increase the number of the gradation degrees, and the like, can be enjoyed. When threshold pattern 16 is utilized, the image data shown by additional information 13 is used for indicating the order of the plural partial regions of the background image of composite image data 27 to which the pattern in accordance with threshold pattern 16 is added. The order indicates an order in accordance with FIG. 15.

Threshold pattern 16 shown in FIG. 18 is a two-dimensional element matrix data having the same size as that of the image of each partial region of the background of composite image data 27 (16 elements×16 elements), and the value of each element (threshold value) is previously set to be any of 0, 1, 2 and 3 in accordance with the pattern to be added. Background adding portion 231 executes such a processing that the relevant element value is turned on (set to 1) when the element value is compared to the value of the corresponding element value of threshold pattern 16 per element in each of the partial regions in the background of the image of composite image data 27 and detected to be at least the element value of threshold pattern 16.

Figure 19:
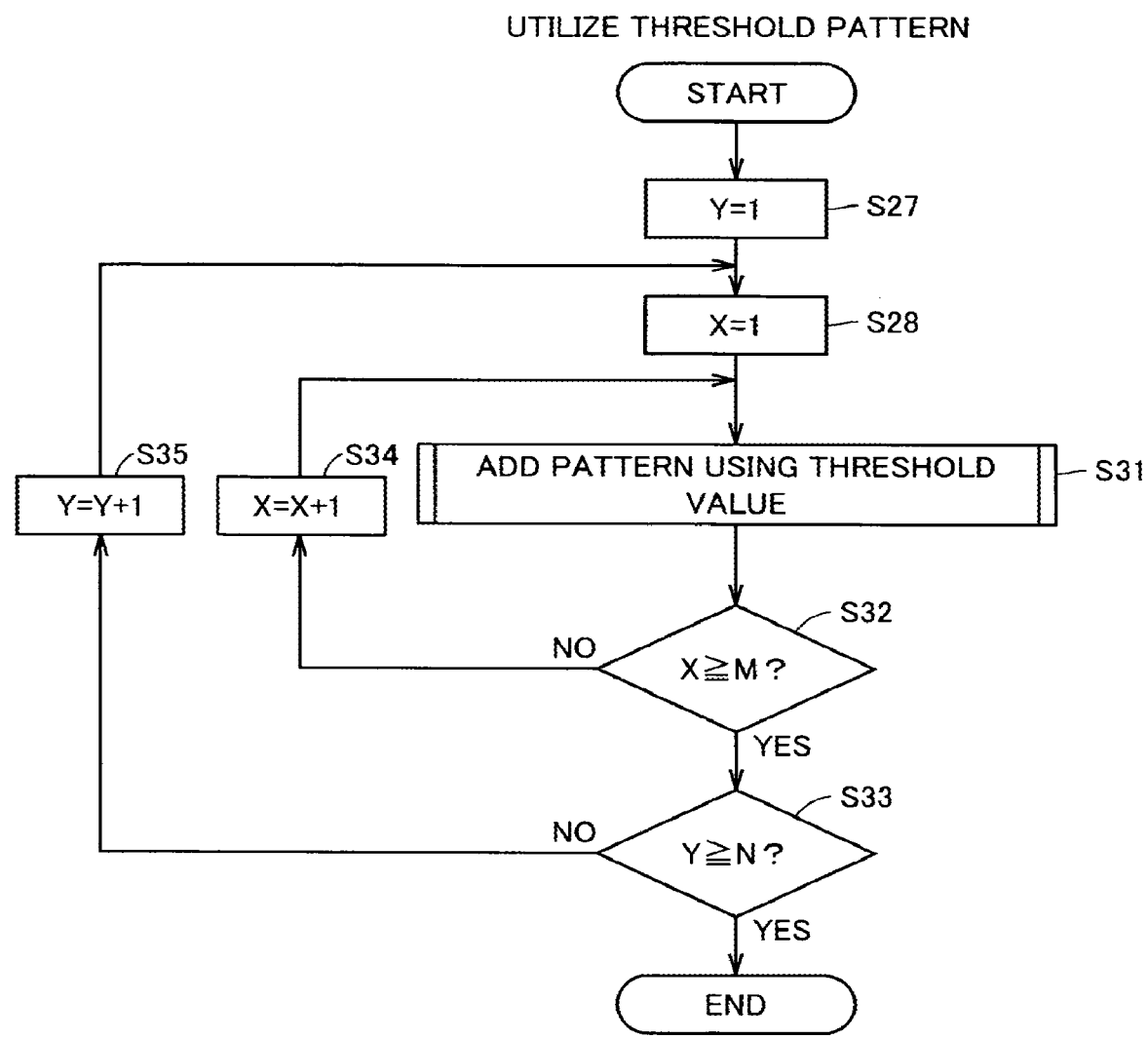
FIG. 19 is a flow chart of another example of the processing steps by the background adding portion.
Figure 20:
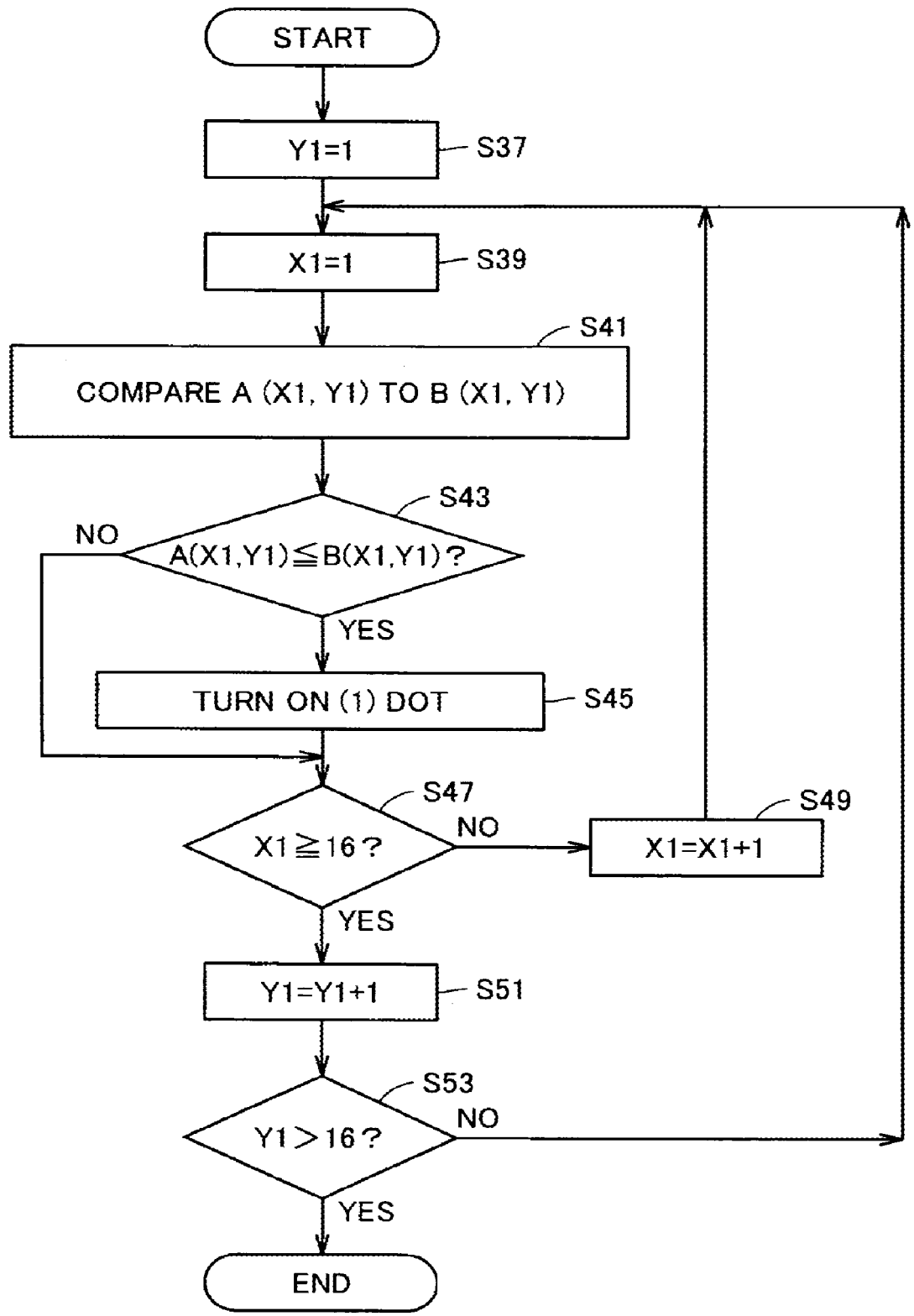
FIG. 20 is a flow chart of still another example of the processing steps by the background adding portion.
Figure 21A:
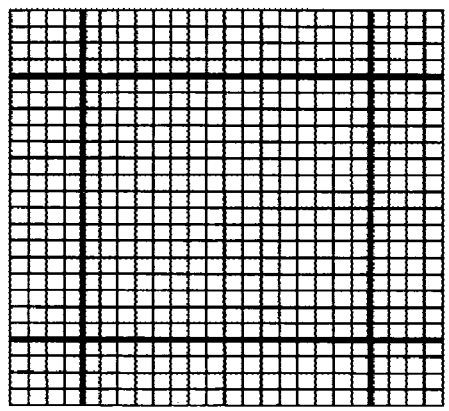
FIGS. 21A-21F each shows another example of the additional pattern.
Figure 21B:
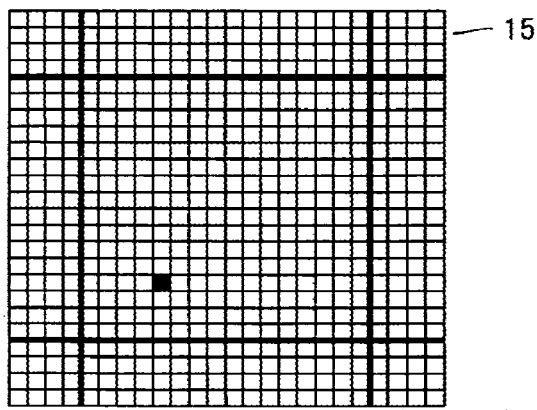
Figure 21C:
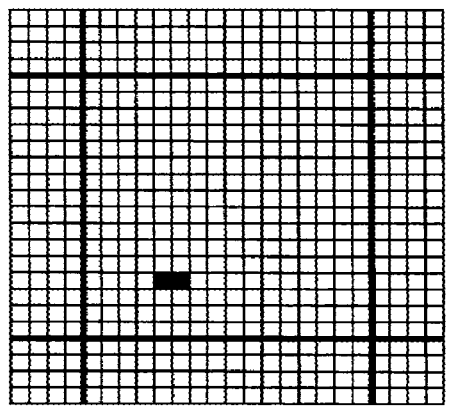
Figure 21D:
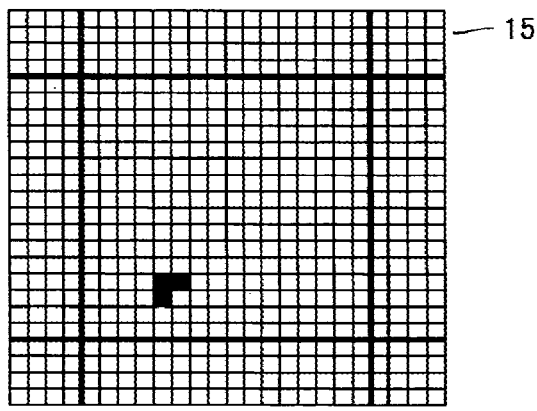
Figure 21E:
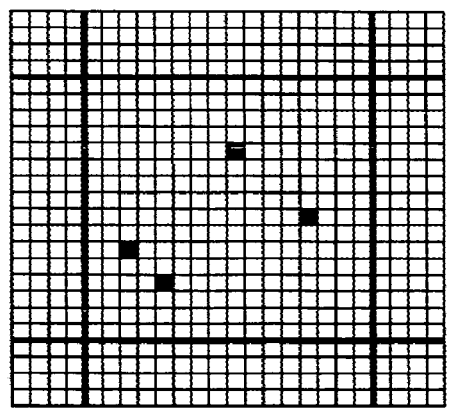
Figure 21F:
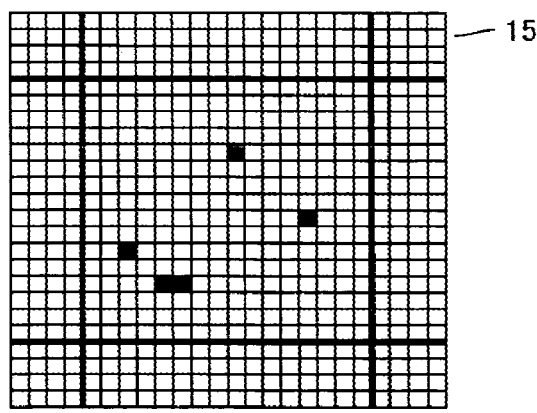

FIGS. 19 and 20 show details of the processing steps. For convenience of the description, it is assumed that threshold pattern 16 shown in FIG. 18 has the size of 16 elements×16 elements and is a two-dimensional region (planar) pattern defined by X1 axis (horizontal axis) and Y1 axis (vertical axis) orthogonal to each other.

Referring to FIG. 19, first, temporary variables X and Y for the control operation are initialized to 1 in background adding portion 231 (Steps S27 and S28). Next, the pattern is added based on threshold pattern 16 to the image of the partial region in the background of composite image data 27 corresponding to the element (X, Y) of the image data shown by additional information 13 (S31). Thereafter, it is determined whether or not the value of variable X exceeds the value of variable M (S32). When it is determined that the value of variable X does not exceed the value of variable M (NO in S32), the value of variable X is incremented by 1 (S34), and the processing returns to S31 so that steps thereafter are repeated. When it is determined that the value of variable X exceeds the value of variable M (YES in S32), it is determined whether or not the value of variable Y exceeds the value of variable N (S33). When it is determined that the value of variable Y does not exceed the value of variable N (NO in S33), the value of variable Y is incremented by 1 (S35), and the processing returns to S28 so that steps thereafter are repeated. When it is determined that the value of variable Y exceeds the value of variable N (YES in S33), the processing is terminated.

Thus, the background adding process in which threshold pattern 16 is used (S31) is repeatedly executed for each of the images of the partial region indicated by each element of the image data shown by additional information 13 in the images of the partial regions in the background of composite image data 27.

Referring to FIG. 20, the process of S31 shown in FIG. 19 is described. For example, a variable X1 for counting the number of the elements of the partial image in the background image of composite image data 27 shown in FIG. 10 and the image of threshold pattern 16 in an X1-axis (horizontal) direction and a variable Y1 for counting the number of the elements in a Y1-axis (vertical) direction are used.

First, the values of variables Y1 and X1 are initialized to 1 (S37 and S39). Then, the element of threshold pattern (hereinafter, referred to as element A) (X1,Y1) and the value of the element of the partial image of composite image date 27 (hereinafter, referred to as element B) (X1,Y1) are compared to each other (S41). When it is determined that A (X1,Y1)≦B (X1,Y1) is established as a result of the comparison (YES in S43), the value of the element B (X1,Y1) is updated to be a value showing a state where the dot is included (for example, 1) (S45). When it is determined that the foregoing equation is not obtained (NO in S43), the value of the element B (X1,Y1) is not updated. Thereafter, it is determined whether or not the value of variable X1 is at least 16 (S47). When it is determined that the value of variable X1 is not at least 16 (NO in S47), the value of variable X1 is incremented by 1 (S49). Then, the processing advances to S39 so that steps after S39 are implemented in a similar manner.

When it is determined that the value of variable X1 is at least 16 (YES in S47), the value of variable Y1 is incremented by 1 (S51). Thereafter, it is determined whether or not the value of variable Y1 exceeds 16, in other words, whether or not the background pattern addition in which threshold value 16 is used has been completed with respect to all of the elements B (X1,Y1) of the image data in the partial regions. When it is determined that the value of variable Y1 exceeds 16 (YES in S53), the successive processing is terminated. When it is determined that the value of variable Y1 does not exceed 16 (NO in S53), the processing returns to S39 so that steps thereafter are implemented in a similar manner.

The embedding process for embedding information 12 by image compositing portion 20 and the process by background adding portion 23 or background adding portion 231 may not be necessarily implemented in the order of FIG. 1. The process by image compositing portion 20 may be implemented after the process by background adding portion 23 (or background adding portion 231).

Preferred Embodiment 3

A preferred embodiment 3 of the present invention recites a function added to the preferred embodiment 2. More specifically, in the case of using additional pattern 15 or threshold value 16 for adding additional information 13 irrelevant to embedding information 12 is added, additional information 13 is added in such a manner that makes it difficult to read a copying result obtained by copying outputted printed document 22 (paper) in a copying machine.

Only the points which differentiate the preferred embodiment 3 from the preferred embodiment 2 are described. It is assumed that each element value of the image data shown by additional information 13 has any of density values 0, 1, 2, 3, 4 and 5. Further, it is assumed that the plural additional patterns 15 show the respective dot patterns corresponding to the six density levels 0-5 as shown in FIGS. 21A-21F.

Observing the background of the image of printed document 22 to which additional patterns 15 are thus added by background adding portion 23, the density appear to gradually increase from the density 0 to the density 5.

However, when printed document 22 (paper) is copied in the copying machine, most of the independent dots printed at the printing resolution of 600 dpi disappear in the copied image because the copying machine generally processes the background of the image to be presented in white under the influence of a resolving power of a scanner and a basic process. Then, any other dot can easily remain in the copied document image as the number of the aggregated dots is increased such as two aggregated dots or three aggregated dots. Therefore, in the copying result of additional patterns 15 having the density 3 in FIG. 21D and the density 4 in FIG. 21E, the densities are reversed. Further, the density 2 in FIG. 21C and the density 5 in FIG. 21F appear to be at the same level of density. Therefore, as the state where the dots are aggregated (state where the dots are arranged) in additional pattern 15 is changed in accordance with the density, the background of the copied image is apparently different from the background of the image of composite image data 28 including the background as original printed document 22. Therefore, in the case of any identification or the like whose illegal copy is desirably prevented, for example, the copied document and the original document can be easily discriminated from each other.

Further, such a dot pattern (additional pattern 15) that makes the image of printed document 22 appear to have the same density but appear to be different in the image of the copied printed document 22 can be used so that the original document and the copied document can be easily discriminated from each other. It becomes difficult to read original document data 11 since the copied document has the dot pattern different from that of printed document 22.

Preferred Embodiment 4

A preferred embodiment 4 of the present invention recites another example of data representing dot D3 in embedding pattern 14 according to the preferred embodiment 1. Below is given a description on differences between the preferred embodiments 1 and 4.

Figure 22A:
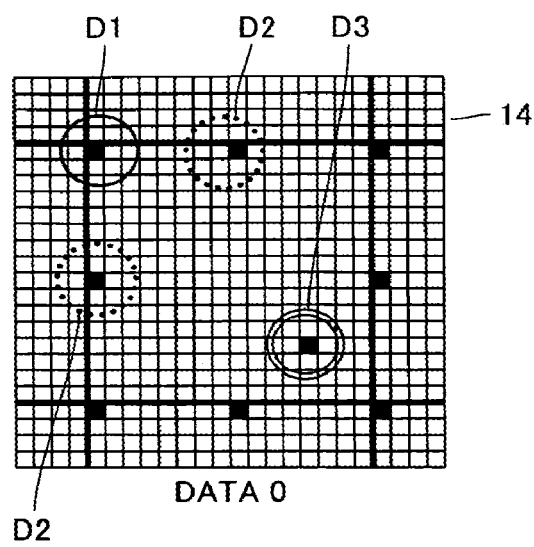
FIGS. 22A and 22B each shows another example of the embedding pattern.
Figure 22B:
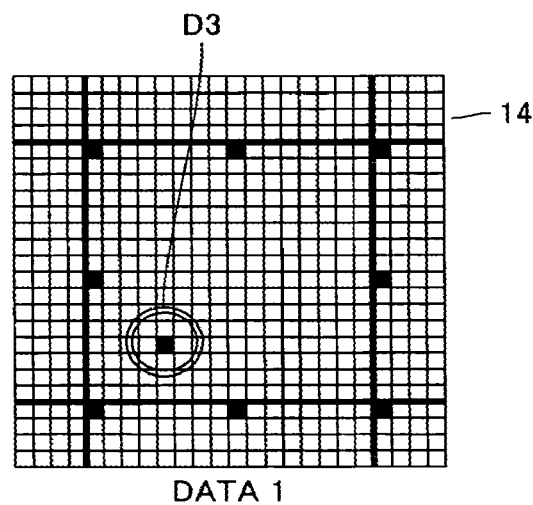

In image compositing portion 20, which embeds embedding pattern 14 of data 0 or data 1 in accordance with the bit sequence of embedding data 25 in the background of the image of document image data 24, different positions shown in FIGS. 22A and 22B may be used as the position of data representing dot D3 of embedding pattern 14 in place of the positions shown in FIGS. 4A and 4B. In this case, data representing dot D3 of data 1 in FIG. 22B is at the same position as the dot used for representing the density in FIG. 14B in the preferred embodiment 2. The data representing dot according to the present invention is not limitedly placed at a specific position.

Figure 23A:
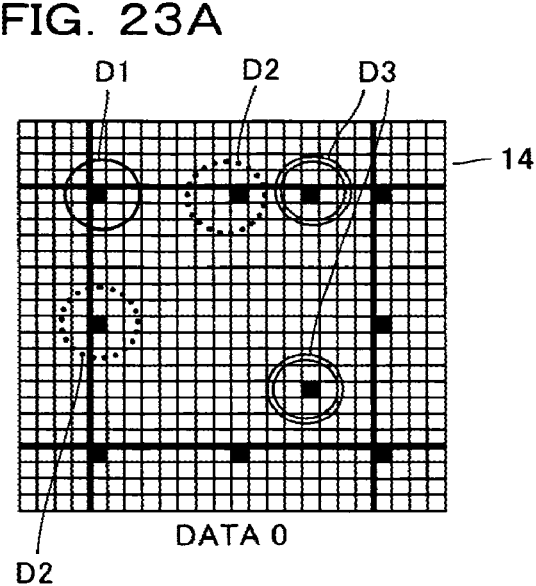
FIGS. 23A-23D each shows still another example of the embedding pattern.
Figure 23B:
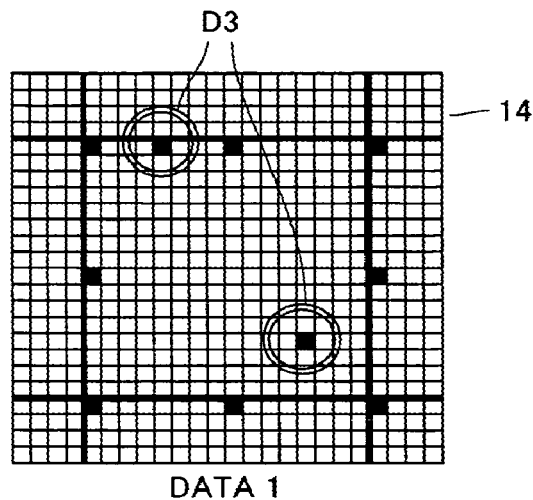
Figure 23C:
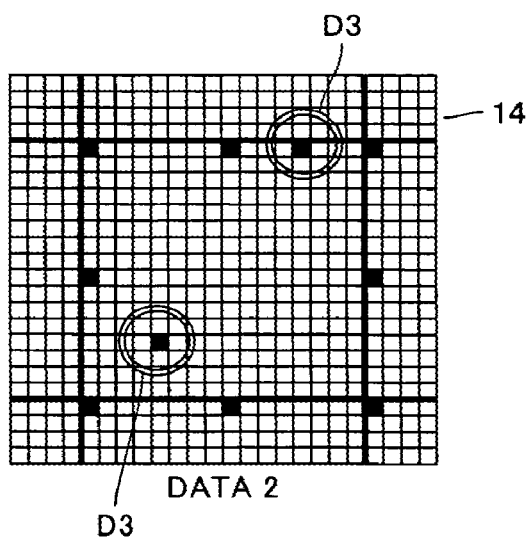
Figure 23D:
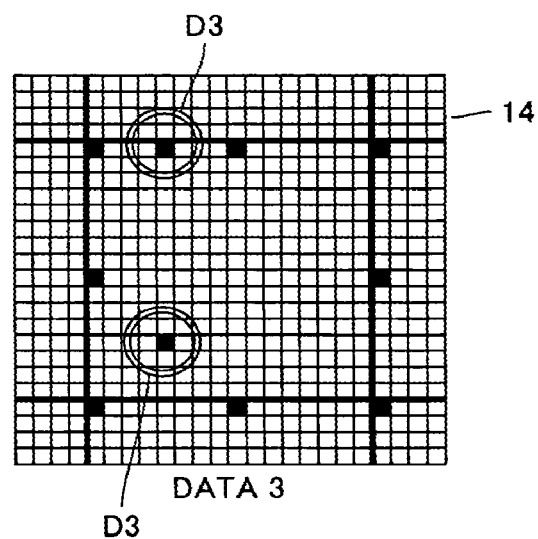

In FIGS. 4A and 4B, or FIGS. 22A and 22B, embedding data 25 is converted into the two-value code which represents data 0 and data 1. As shown in FIGS. 23A-23D, embedding information 12 can be embedded as data converted into a four-value code representing 0, 1, 2 and 3. According to such an embedding method, an amount of embedding information to be embedded 12 can be increased. The positions of position representing dot D1 and position representation assisting dot D2 in FIGS. 23B-23D are the same as those shown in FIG. 23A.

Preferred Embodiment 5

Another example of position representation assisting dot D2 is described. In a preferred embodiment 5 of the present invention, differences with respect to the preferred embodiment 1 are described.

Figure 24A:
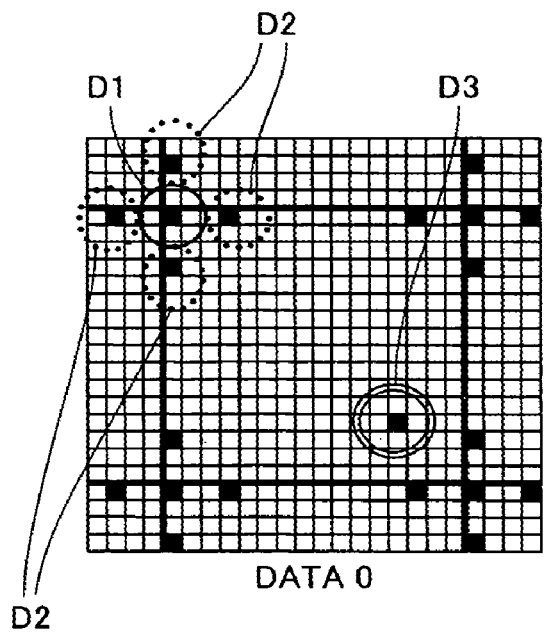
FIGS. 24A and 24B each shows still another example of the embedding pattern.
Figure 24B:
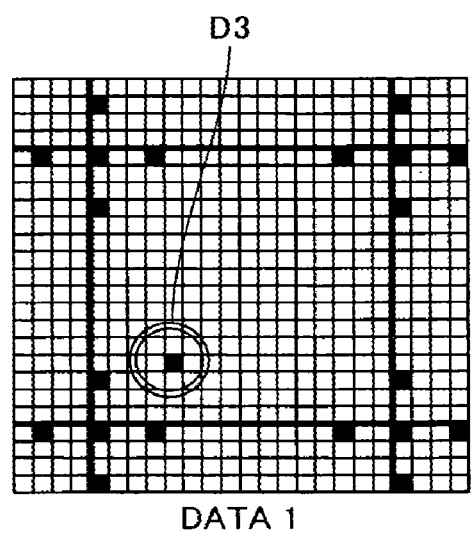
Figure 25:
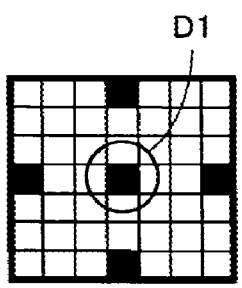
FIG. 25 shows an example of a detecting pattern of a position representing dot.

As the position of position representation assisting dot D2 in embedding pattern 14 used in the process for embedding the data sequence in accordance with the bit sequence of embedding data 25 by image compositing portion 20, positions shown in FIGS. 24A and 24B may be used in place of those shown in FIGS. 4A and 4B. When a pattern shown in FIG. 25 is used in the image of printed document 22 in place of the pattern of FIG. 11, the dot arrangement in the image corresponding to the pattern is detected so that it can be determined that position representing dot D1 is placed at the element in the center of the detected pattern. Therefore, it can be determined if the data embedded as the detected pattern is data 0 or data 1 in a manner similar to FIG. 11.

Figure 26A:
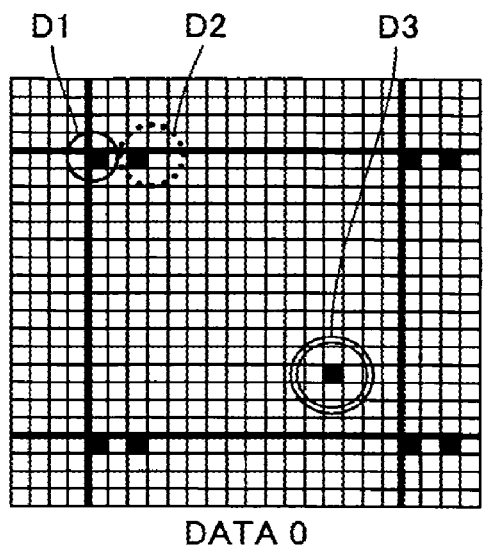
FIGS. 26A and 26B each shows still another example of the embedding pattern.
Figure 26B:
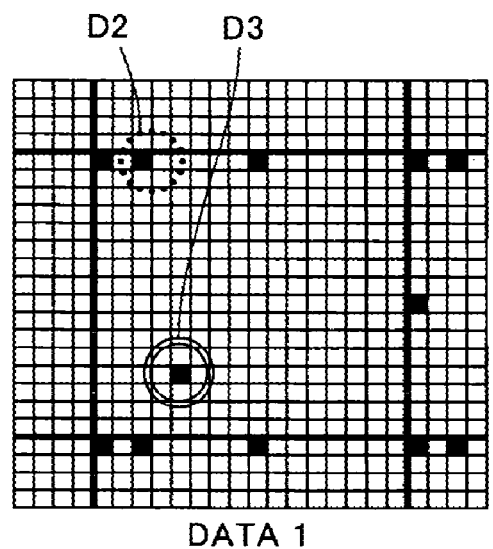
Figure 27:
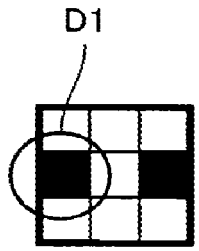
FIG. 27 shows another example of the detecting pattern of the position representing dot.

Further, one position representation assisting dot D2 as shown in FIGS. 26A and 26B may be used in place of two position representation assisting dots D2 shown in FIGS. 4A and 4B. When a pattern shown in FIG. 27 is used in place of the pattern of FIG. 11, the dot arrangement in the image corresponding to the pattern is detected so that it can be determined that position representing dot D1 is placed at a left-side element in the detected pattern. Therefore, it can be determined if the data embedded as the detected pattern is data 0 or data 1 in a manner similar to FIG. 11.

As described, the position representation assisting dot is not limitedly placed at a specific position in the present invention.

Preferred Embodiment 6

In a preferred embodiment 6 of the present invention, a plurality of embedding patterns 14A (dot patterns) for representing embedding information 12 and additional information 13 are prepared and used for different purposes so that the information is embedded.

Figure 28:
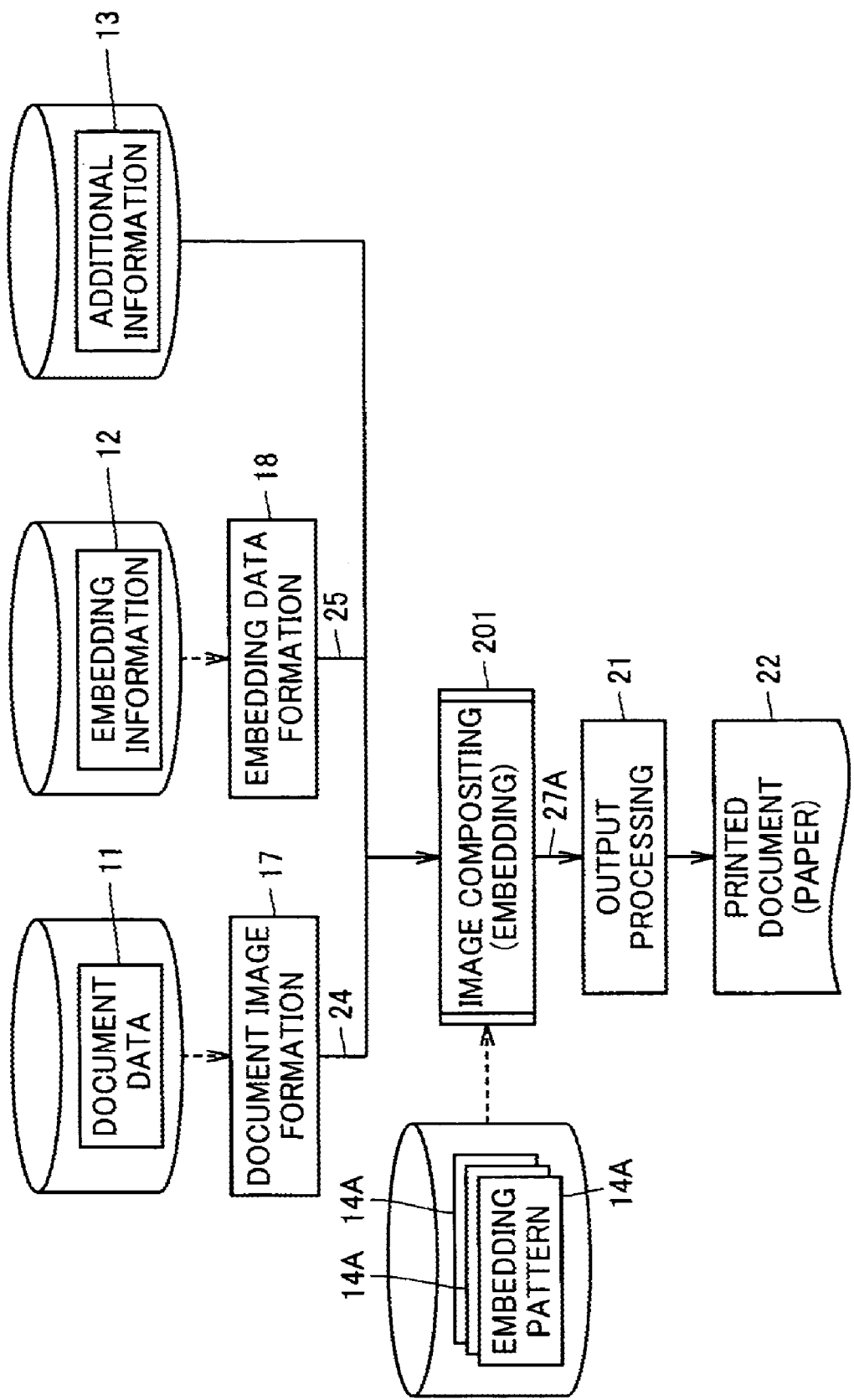
FIG. 28 shows another example of the functional components of the information embedding apparatus.
Figure 29A:
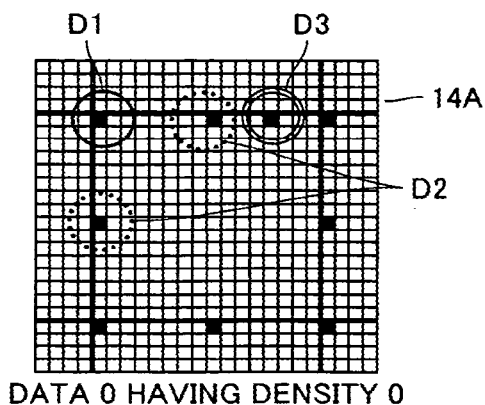
FIGS. 29A-29H each shows still another example of the additional pattern.
Figure 29B:
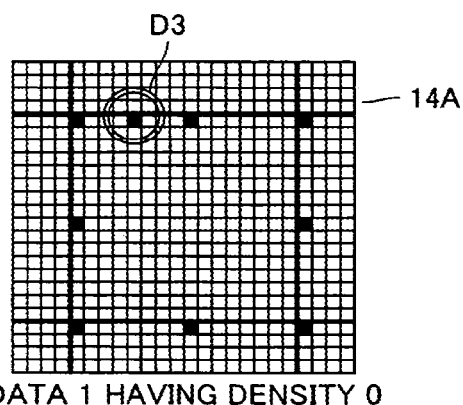
Figure 29C:
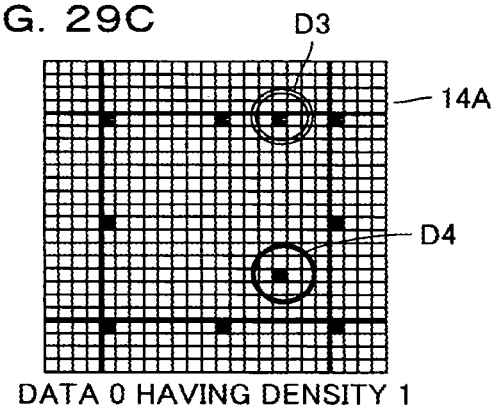
Figure 29D:
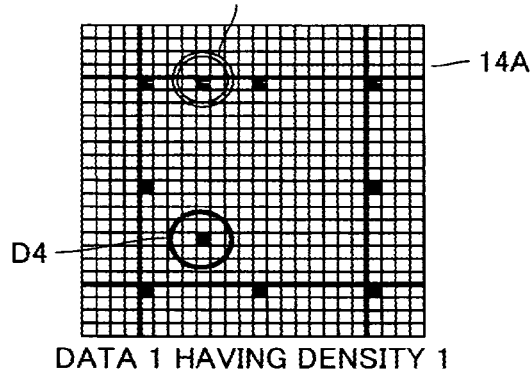
Figure 29E:
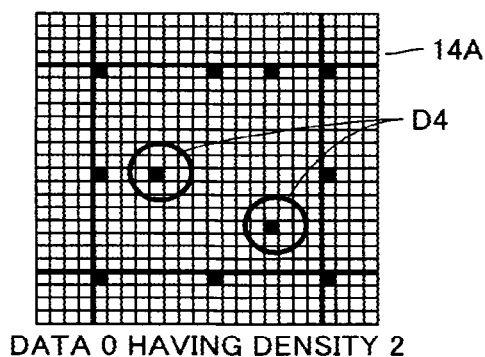
Figure 29F:
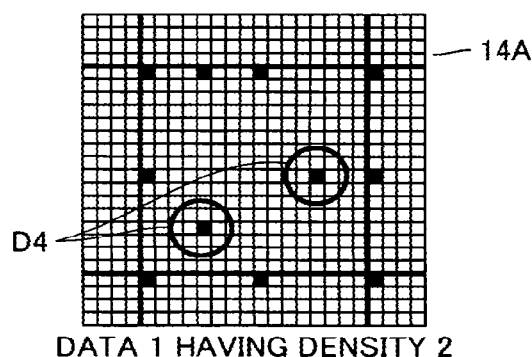
Figure 29G:
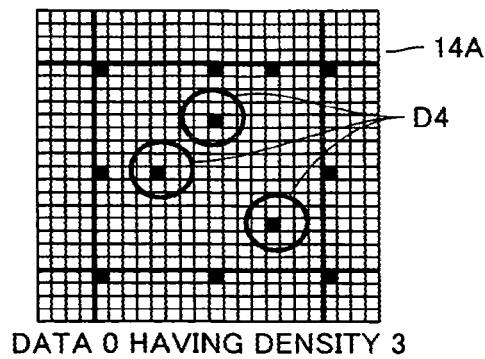
Figure 29H:
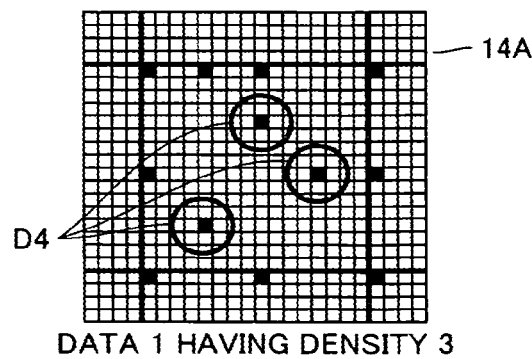
Figure 30:
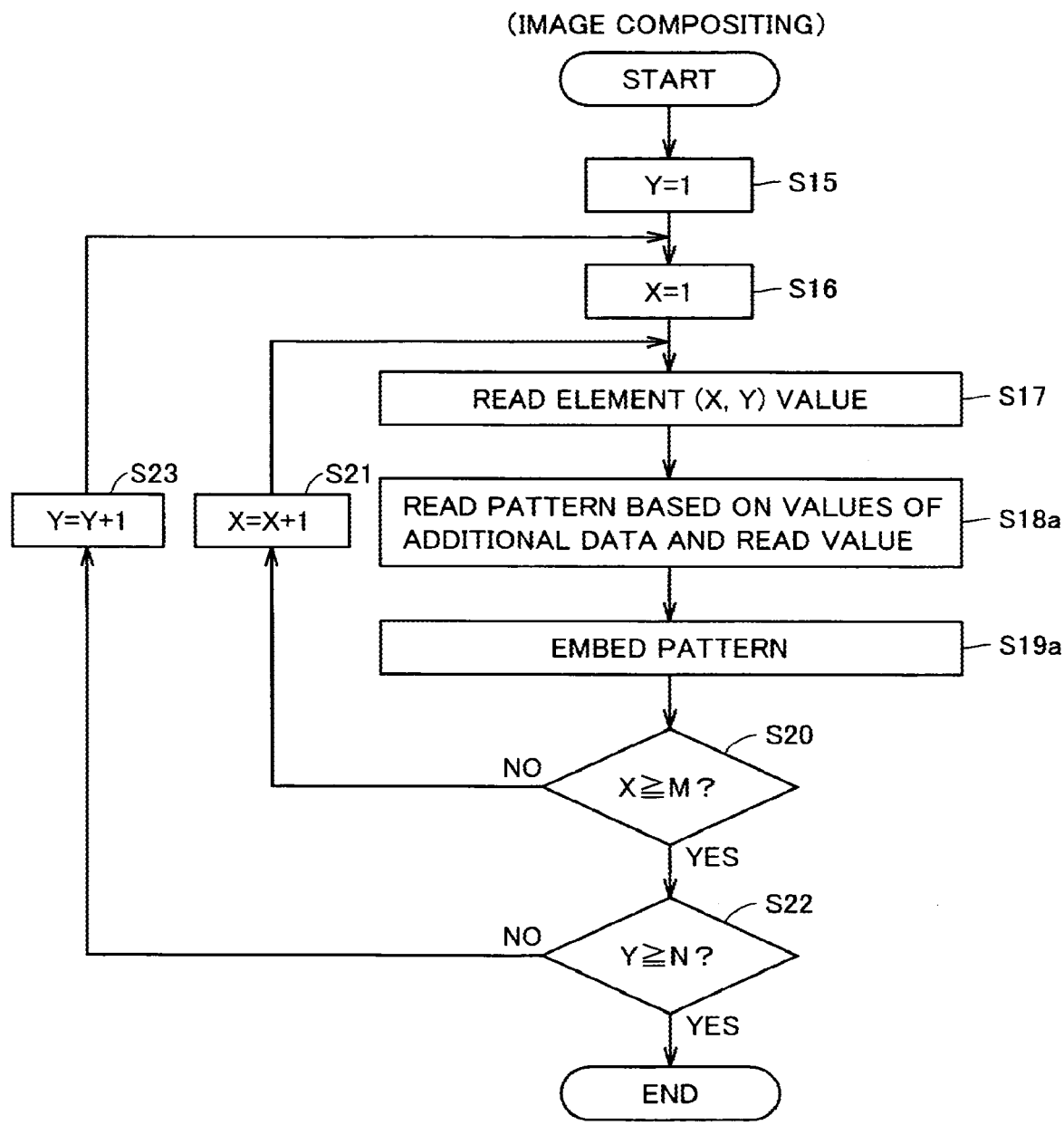
FIG. 30 is a flow chart of another example of the processing steps by the image compositing portion.

In the preferred embodiment 6, the process for embedding the information in the image of document image data 24 has only one step by an image compositing portion 201 as shown in FIG. 28. Image compositing portion 201 inputs embedding data 25 and read additional information 13 (image data) to the background of the image of inputted document image data 24. When embedding patterns 14A are embedded in accordance with the data sequence (see FIG. 12), a composite image data 27A similar to the data shown in FIG. 13 can be obtained. FIGS. 29A-29H show embedding patterns 14A according to the preferred embodiment 6. The embedding pattern 14A includes data representing dot D3 and an additional dot D4 for representing the density of the background image. FIG. 30 shows processing steps of image compositing portion 201. The processing steps are different from those shown in FIG. 17 in that S18 and S19 in FIG. 17 are replaced with S18a and S19a with any other step remaining the same as in FIG. 17.

In S18a, embedding data forming portion 18 converts embedding information 12 into a two-value code and outputs converted embedding data 25 to image compositing portion 201. Image compositing portion 201 further reads additional information 13. Image compositing portion 201 reads any of embedding patterns 14A determined based on combinations of the value of each bit of the bit sequence (0 or 1) and the density value of each element (any of 0, 1, 2 and 3) of the image data, that are embedding patterns 14A of eight different types shown in FIGS. 29A-29H, based on inputted embedding data 25 of the bit sequence and the image data shown by read additional information 13. In S19a, read embedding patterns 14A are sequentially embedded in the images of the plural partial regions of the background image of document image data 24 while the values of variables X and Y are incremented by 1 (S21 and S23). The embedding patterns 14 are embedded, for example, in the order of the region denoted by the value of variable i in FIG. 15 (1, 2, 3 and 4).

Figures 31, 32:
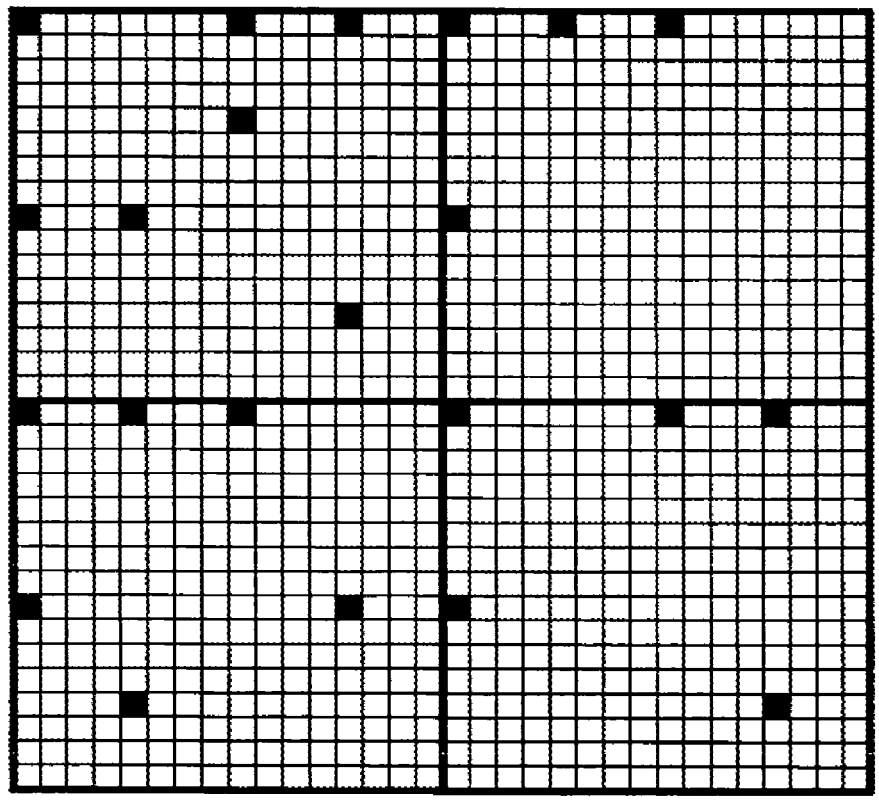
FIG. 31 shows an exemplified pattern arrangement based on an embedding information and the additional information with respect to the document image.
FIG. 32 shows a state where the information is embedded in accordance with FIG. 31.

In the case of embedding the data and the density information as shown in FIG. 31, the dots are embedded in the image as shown in FIG. 32 according to image compositing portion 201. In the embedding, the dot pattern of the data value can be defined for each density value, and the position of additional dot D4 can be thereby changed based on embedding information 12. Therefore, it is advantageous in that the printed image of printed document 22 can have a pattern where the dots are appropriately dispersed because additional dots D4 can be embedded not intensively but dispersedly.

Preferred Embodiment 7

Next, an apparatus for extracting position representing dot D1 and data representing dot D3 from the image of outputted printed document 22 (paper) according to the preferred embodiments 1 and 2 by means of the filtering processing and detecting embedding information 12 based on a result of the extraction is described. It is assumed that the information detecting apparatus is previously supplied with information relating to details of embedding pattern 14 applied at the time of embedding the information.

Figure 33:
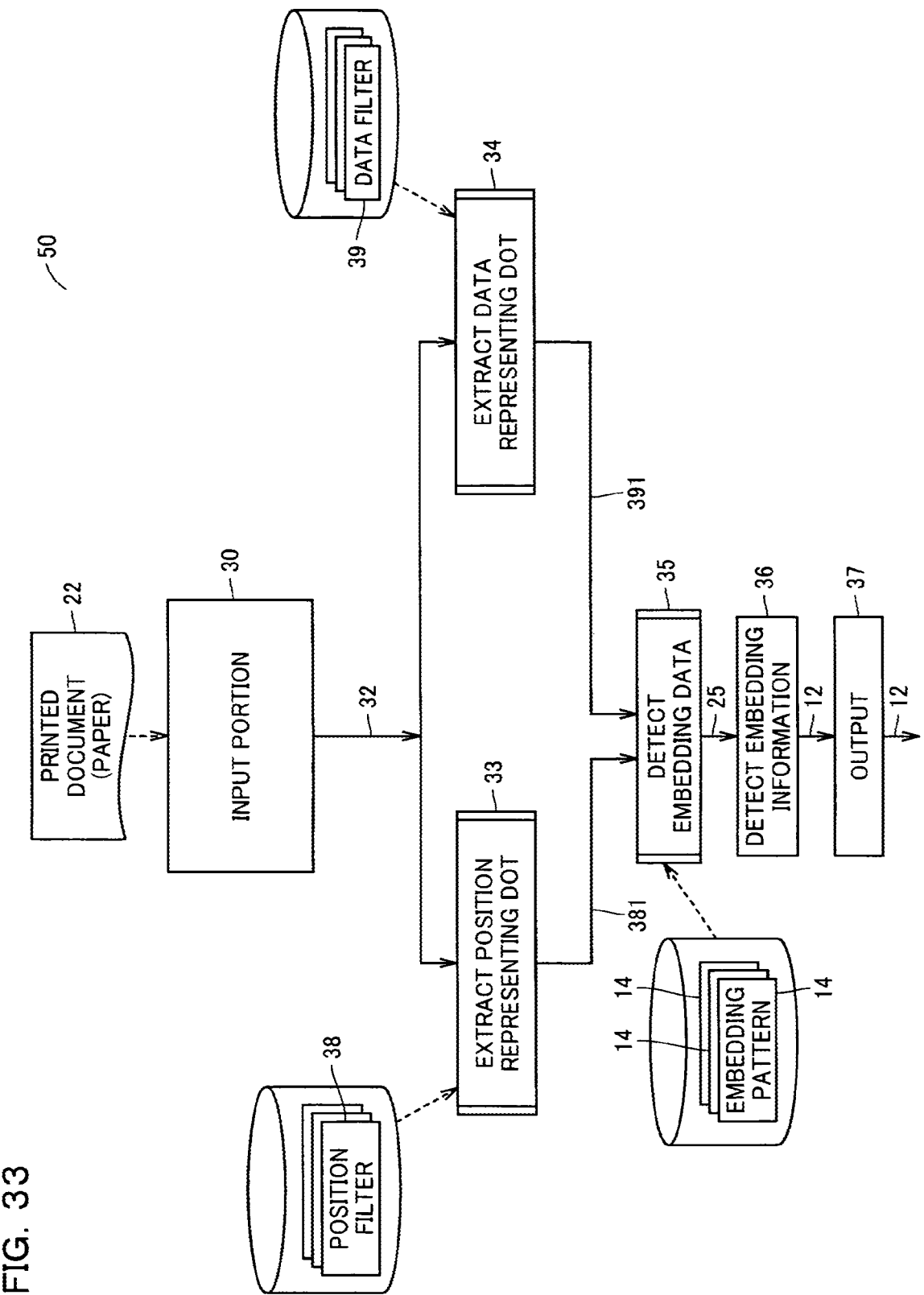
FIG. 33 shows an example of functional components of an information detecting apparatus.

FIG. 33 shows functional components for detecting embedding information 12. Referring to FIG. 33, an embedding information detecting apparatus 50 reads printed document 22 as a printing result of the image in which embedding information 12 is embedded from an input portion 30 and outputs an image data 32. Input portion 30 outputs a multi-value image data 32 through a reading operation. Multi-value image data 32 is shown as a grey image of 256 gradation degrees. Multi-value image data 32 is supplied to a position representing dot extracting portion 33 and a data representing dot extracting portion 34.

Position representing dot extracting portion 33 processes multi-value image data 32 using a position filter 38 previously prepared, extracts position representing dot D1 in embedding pattern 14, and supplies a position representing information 381 showing a result of the extraction to an embedding data detecting portion 35. Data representing dot extracting portion 34 processes multi-value image data 32 using a data filter 39 previously prepared, extracts data representing dot D3, and supplies a data representing information 391 showing a result of the extraction to embedding data detecting portion 35.

Position filter 38 functions to extract position representing dot D1, and data filter 39 functions to extract data representing dot D3.

Embedding data detecting portion 35 detects embedding data 25 using supplied position representing information 381 and data representing information 391, and supplies detected embedding data 25 to an embedding information detecting portion 36.

Embedding information detecting portion 36 forms embedding information 12 based on supplied embedding data 25, and supplies formed embedding information 12 to an output portion 37. Output portion 37 outputs supplied embedding information 12 outside (to an external apparatus not shown via display portion 71 or communication I/F 74 and communication lines 75). These portions are previously stored as programs in memory 62, HDD 63, FD 65, DVD 67 and the like and read and executed by MPU 61 so that the functions of the respective portions are realized. Further, position filter 38 and data filter 39 are previously stored in memory 62, HDD 63, FD 65, DVD 67 and the like.

Figure 34:
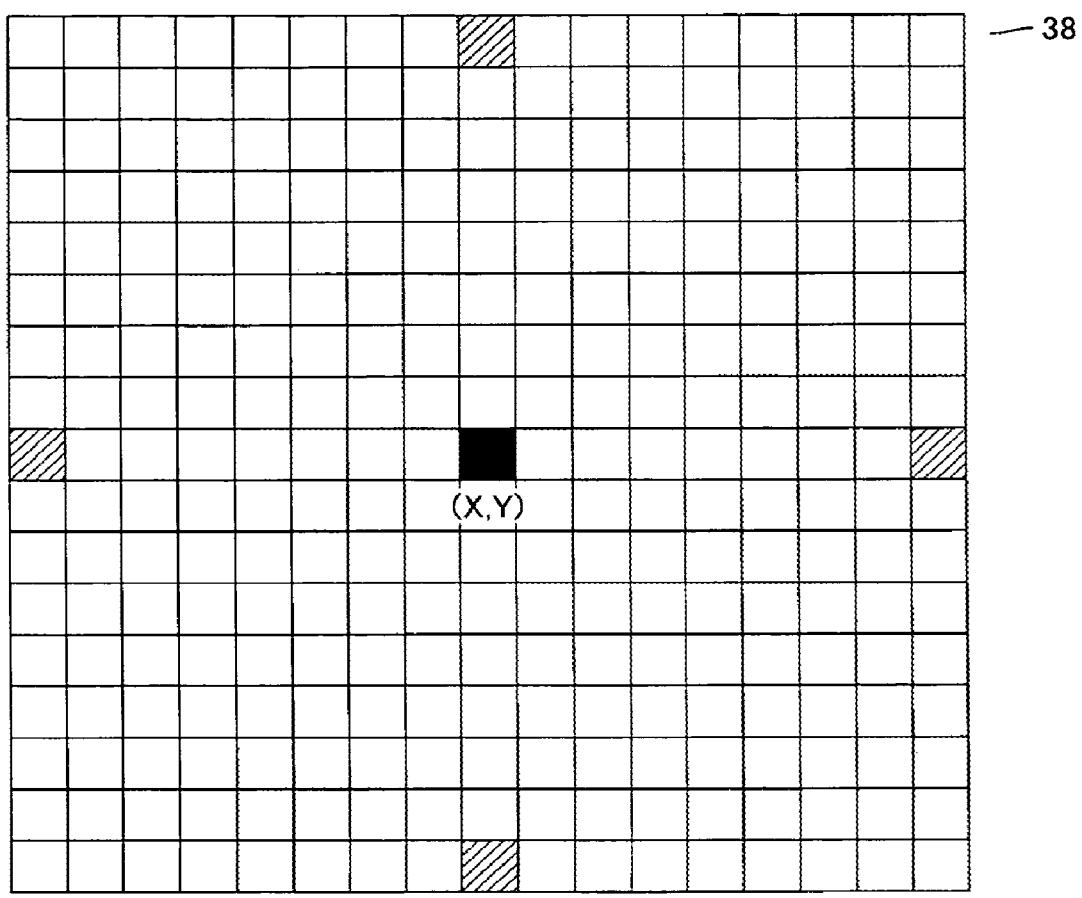
FIG. 34 shows an example of a position filter.
Figure 35:
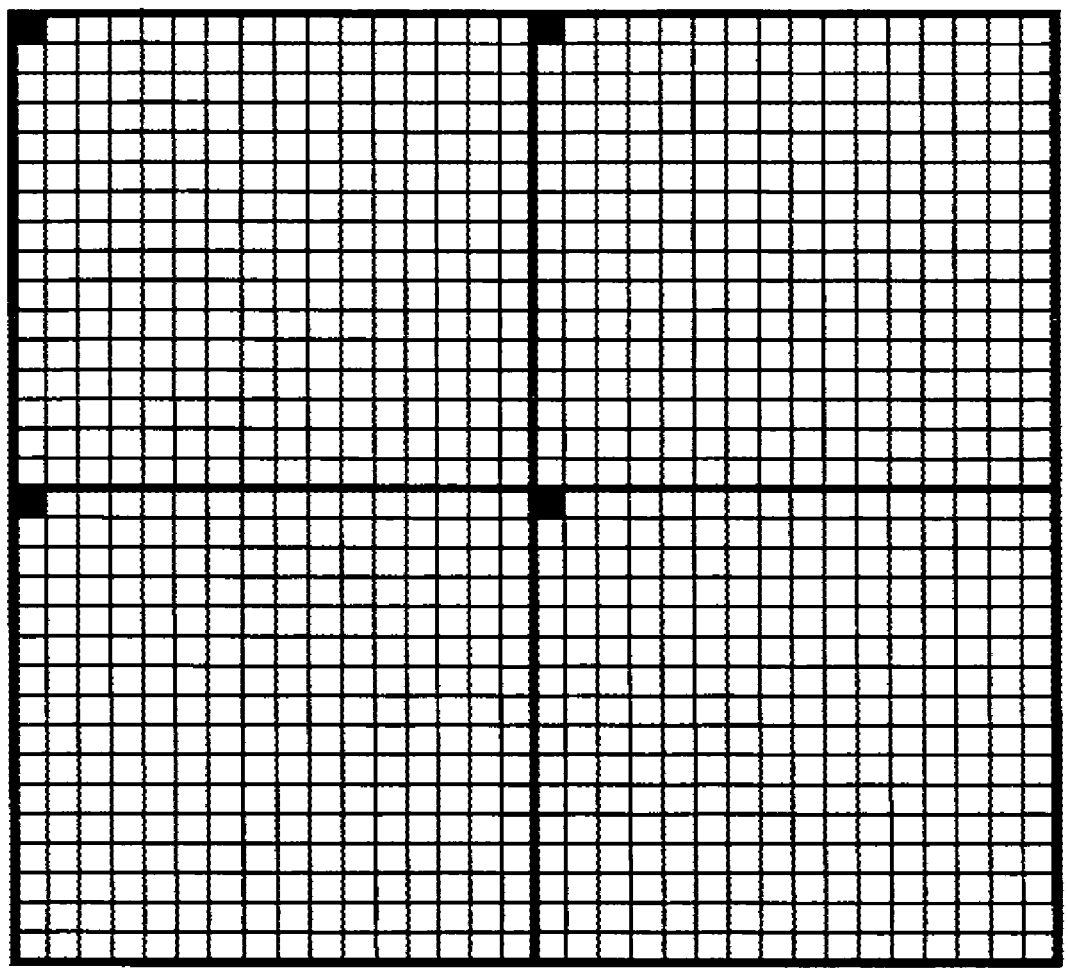
FIG. 35 shows an example of a filtering processing result obtained by the position filter.

Below is given a detailed description. First, it is assumed that input portion 30 controls scanner 70 to thereby read printed document 22 on paper, and outputs multi-value image data 32 as shown in FIG. 16. It is assumed that white elements indicate the value of 255, and black elements indicate the value of 0. When all of the elements of multi-level image data 32 are subjected to such a filtering processing that an element value of multi-value image data 32 corresponding to a black element in FIG. 34 is replaced with a maximum value of five element values of position filter 38 having five elements of black or grey (shadowed areas) (others are white elements) in FIG. 34, a result shown in FIG. 35 is obtained.

Position Representing Dot Extracting Portion

Figure 36:
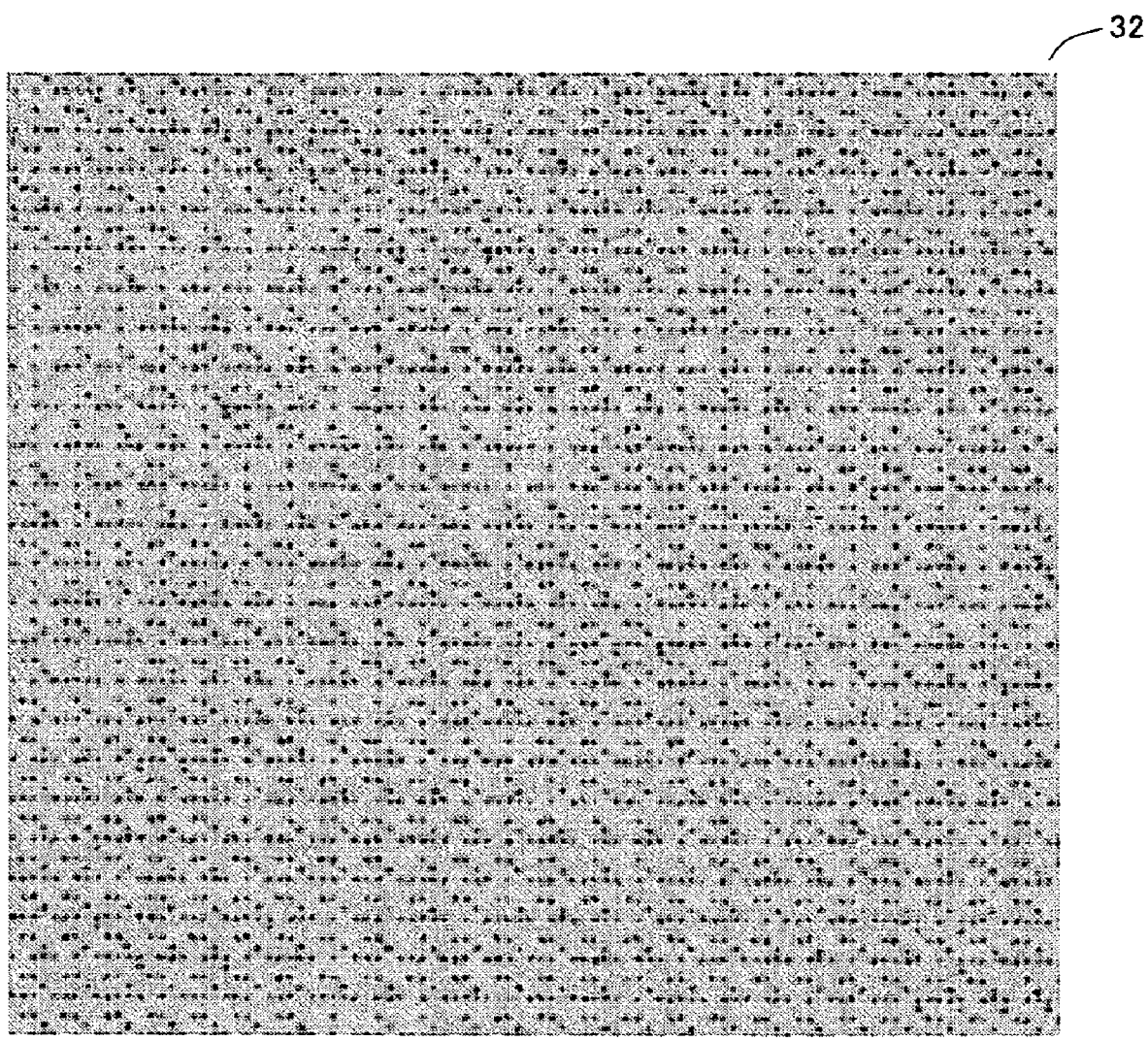
FIG. 36 shows an example of a multi-value image data as a scanning result.

Actual multi-value image data 32 is as shown in FIG. 36. When position representing dot extracting portion 33 executes the filtering processing using position filter 38 shown in FIG. 34, a result shown in FIG. 37 (position representing information 381) is obtained. The filtering processing serves as such a pattern matching process that the value of the element (X, Y) corresponding to the black element having the dot arrangement shown in FIG. 34 is extracted as a blackish value in multi-value image data 32.

As the conventional pattern matching process, a so-called simple similarity processing, for example, is adopted. As a determining method based on the simple similarity is available a method in which such a determination is made that as an angle made by two vectors, which are a reference pattern c=(c1, c2, . . . , c289) and an input pattern x=(x1, x2, . . . , x289), is smaller, the both patterns are more similar to each other. Position filter 38 shown in FIG. 34 corresponds to the reference pattern c. In the determining method, c·x/(|c|×|x|) is to be obtained. · denotes an inner product of the vector, and | | denotes a size of the vector. Then, cos θ is calculated regarding an angle θ made by the two vectors shown in the foregoing expression, and it is determined that the both vectors are similar to each other as a value of the cos θ is closer to 1.

Figure 37:
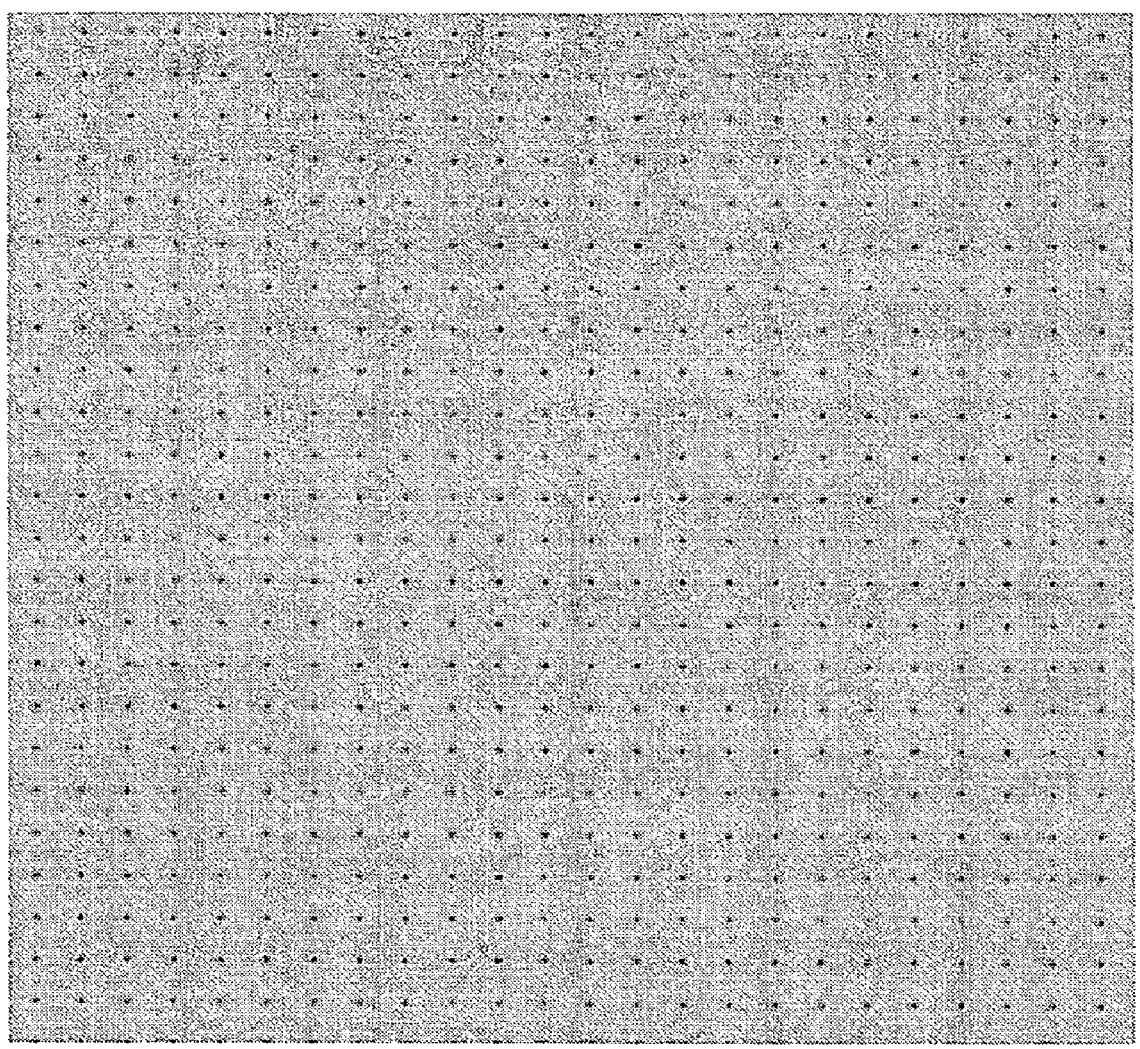
FIG. 37 shows an example of a filtering processing result of the image shown in FIG. 36.

In comparison to the determining method, a method according to the preferred embodiment 7 can attain a very high processing speed because the number of the elements used for the matching is such a small number as five as shown in FIG. 34. On the contrary, 289 elements are used, in other words, all of the elements are used for the comparison, in the simple similarity processing, which fails to achieve a high speed. Further, the simple similarity is reduced in the case of including additional dot D4 added for representing the density and noise component such as smear in printing, while the method according to the present preferred embodiment is only slightly affected by the foregoing factors as shown in FIG. 37.

Data Representing Dot Extracting Portion

Next, the processing for extracting data representing dot D3 by data representing dot extracting portion 34 is recited below. When a filtering processing for replacing the value of the black element (X, Y) of the image shown in FIG. 16 corresponding to a black element in FIG. 38 with a maximum value of five elements values of data filter 39 having black or grey (shadowed parts) five elements (others are white elements) shown in FIG. 38, is executed to all of the elements of the image of FIG. 16, a result shown in FIG. 39 (data position information 391) is obtained.

Figure 38:
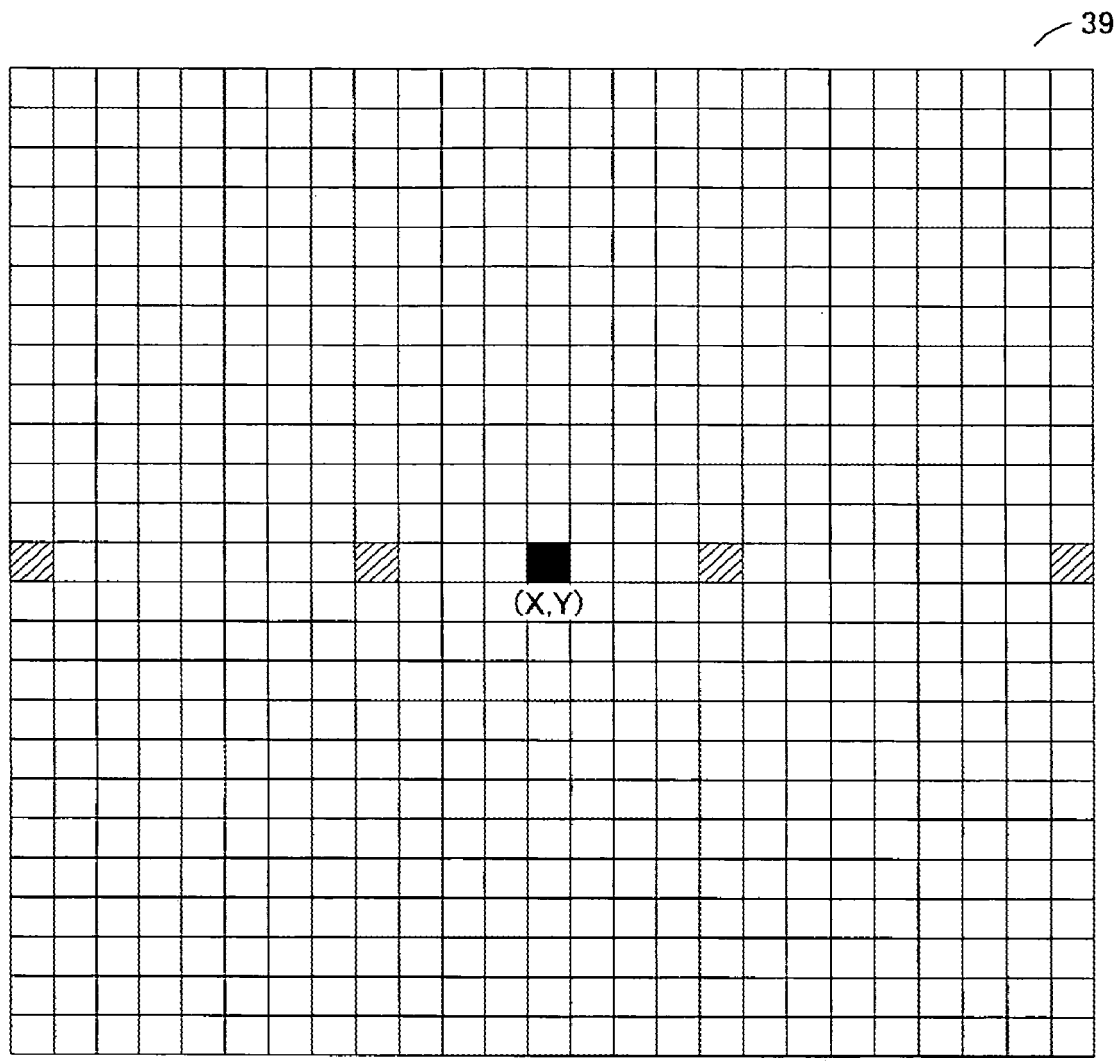
FIG. 38 shows an example of a data filter.
Figure 39:
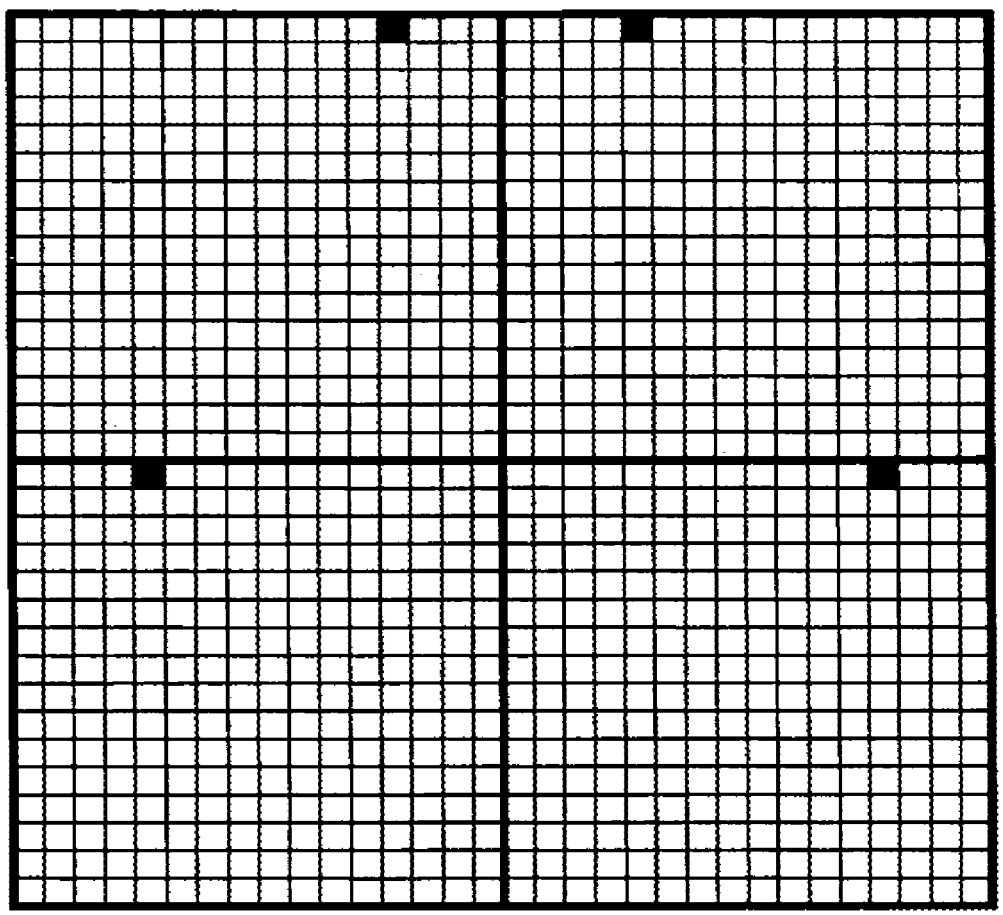
FIG. 39 shows an example of a filtering processing result obtained by the data filter.
Figure 40:
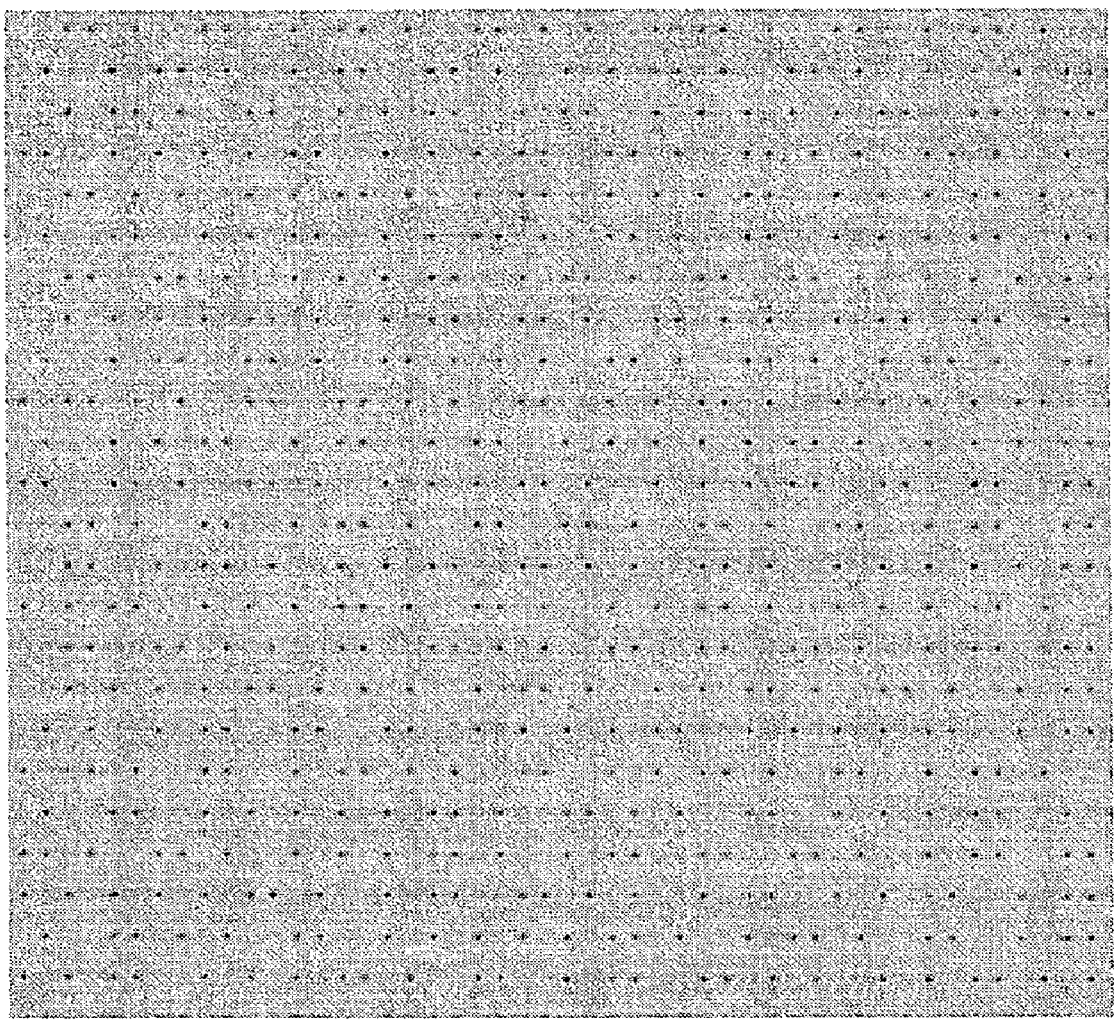
FIG. 40 shows an exemplified image resulting from the filtering processing.

Because the image of multi-value data 32 is as shown in FIG. 36, a result shown in FIG. 40 is outputted when data filter 39 of FIG. 38 is used to execute the filtering processing. The filtering processing refers to such a processing as a pattern matching processing for extracting the dots arranged as shown in data filter 39 of FIG. 38 in the blackish color.

Of a plurality of position filters 38 and data filters 39 which are prepared, a filter capable of extracting position representing dot D1 and data representing dot D3 of embedding pattern 14 applied to printed document 22 is designated for the reading operation. The filter is designated based on the user's operation via keyboard 68.

Embedding Data Detecting Portion

Embedding data detecting portion 35 processes the results of the two different filtering processes (position representing information 381 and data position information 391) referring to embedding pattern 14 to thereby extract the data embedded in the image of printed document 22. More specifically, any (blackish) element at most a certain threshold value in FIG. 37 (position representing information 381) is determined as position representing dot D1 when the data is embedded. When it is determined that the element at a position advanced to right by 12 elements from the element thus determined referring to embedding pattern 14 indicates the (blackish) element at most the certain threshold value in FIG. 40 (data position information 391) (because the dots are embedded as shown in FIGS. 4A and 4B), it is detected that data 0 is embedded. Alternatively, when it is determined that an element at a position advanced to right by four elements referring to embedding pattern 14 indicates the (blackish) element at most the certain threshold value in FIG. 40 (because the dots are embedded as shown in FIGS. 4A and 4B), it is detected that data 1 (refer to embedding pattern 14 in FIG. 4A) is embedded. When the foregoing processing is continuously executed, the embedded data can be extracted.

In the data detecting processing, the original image shown in FIG. 36 can be used in place of FIG. 40, which increases the processing speed. However, a noise resistance is low in comparison to the use of data filter 39 in FIG. 40 because a number of unnecessary dots are placed in FIG. 36. As a result, the detecting accuracy is not satisfactory.

Figure 41:
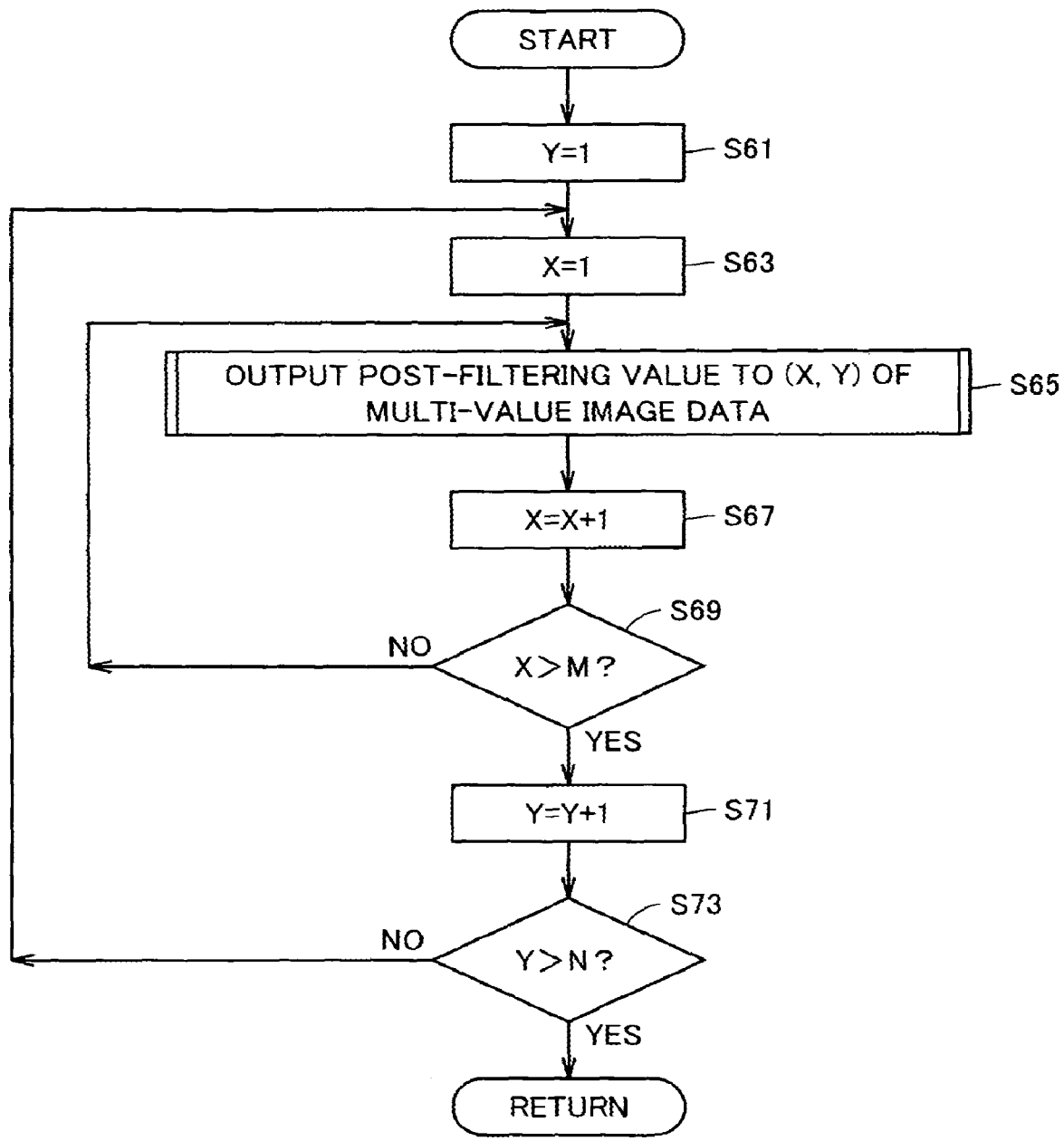
FIG. 41 is a flow chart of entire processing steps of the filtering processing.
Figure 42:
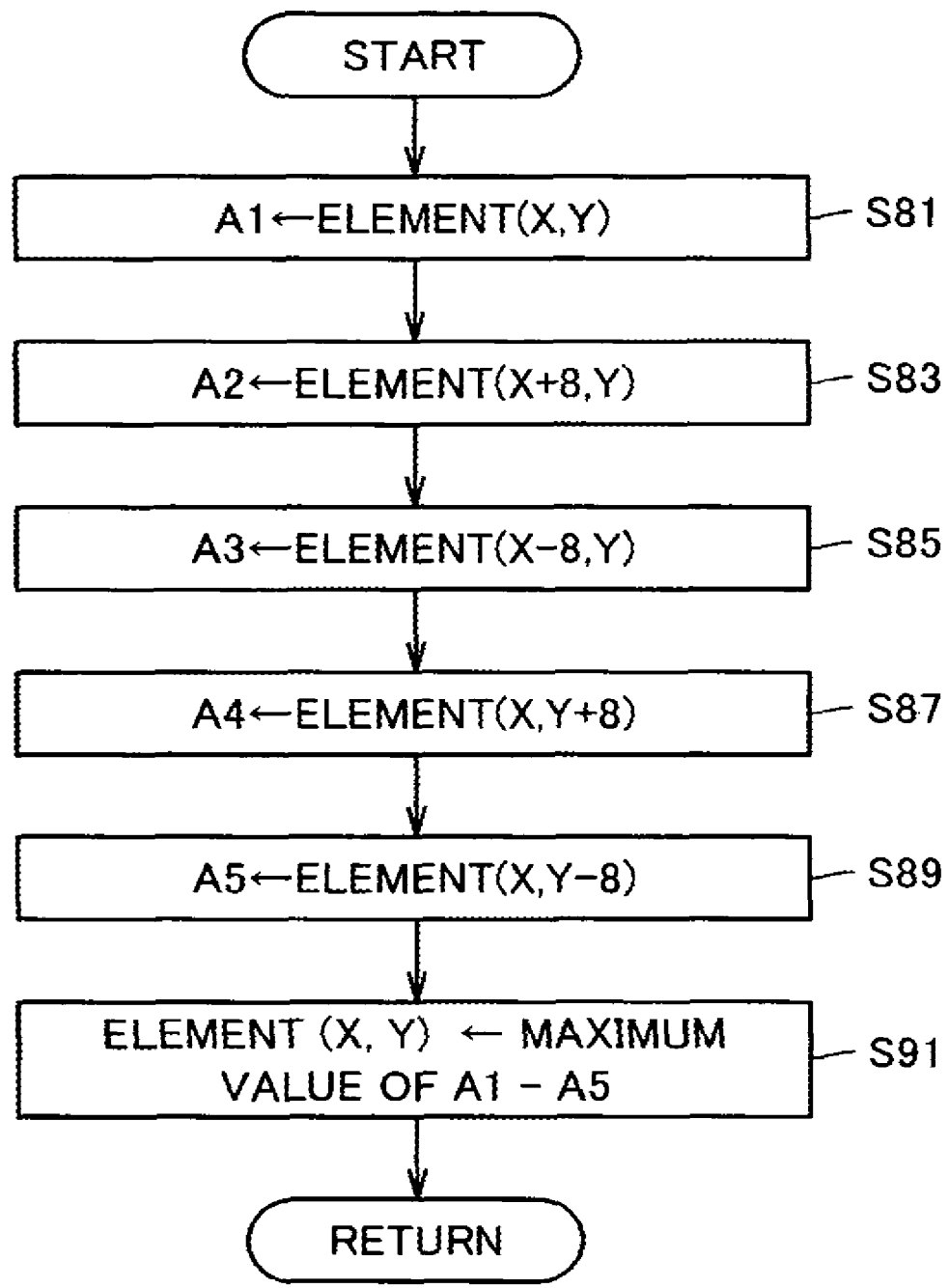
FIG. 42 is a flow chart of processing steps by a position representing dot extracting portion.
Figure 43:
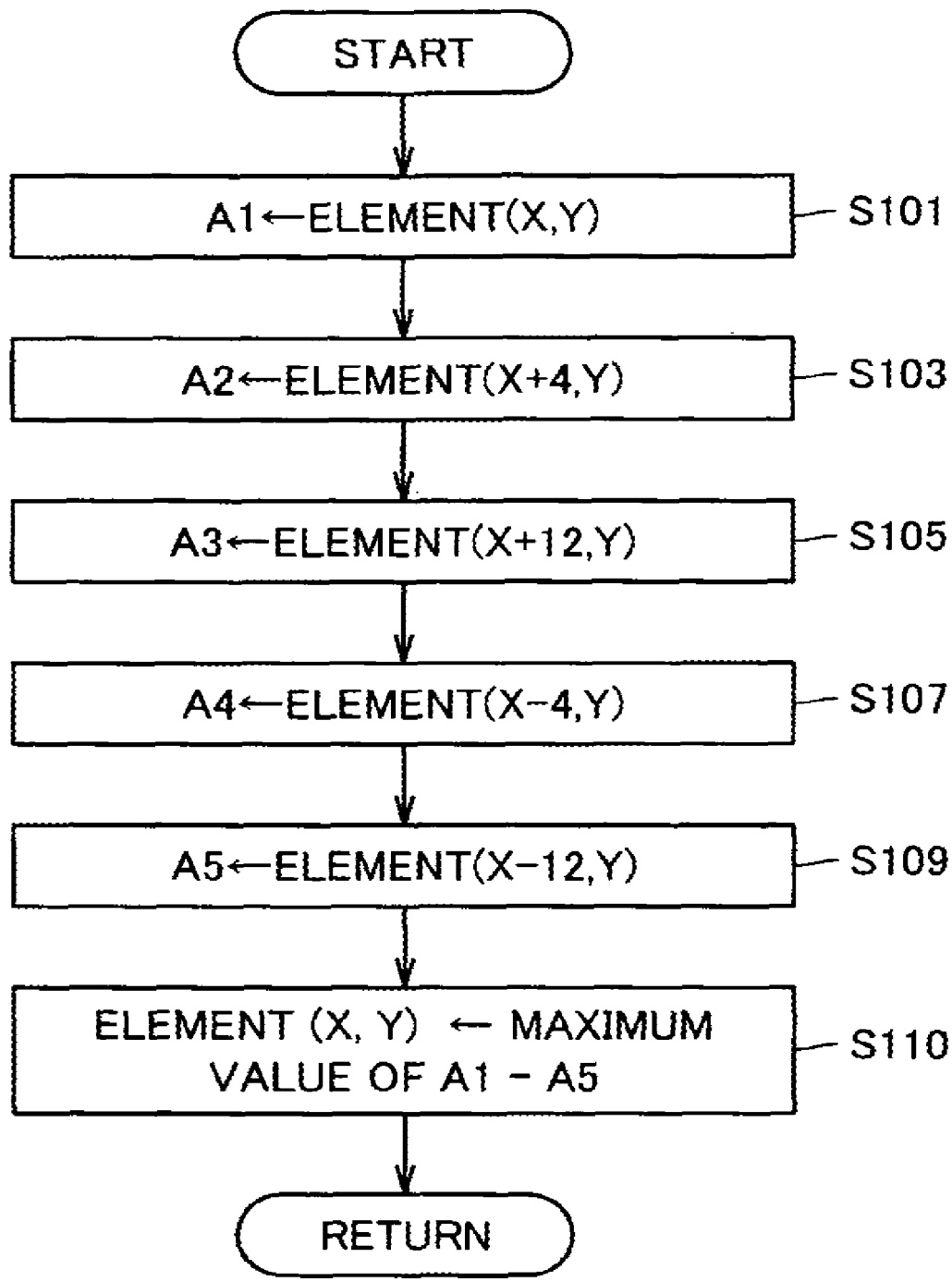
FIG. 43 is a flow chart of processing steps by a data representing dot extracting portion.

Referring to FIGS. 41-43, processing steps of the extractions of the position representing dot and data representing dot are described. The processing steps shown in FIG. 41 are applied to both of the extractions of the position representing dot and data representing dot.

First, positions of variables X and Y for identifying each element of the image of multi-value image data 32 are set and the variables are initialized (S61 and S63). Variable X for counting the number of the elements in the X (horizontal) direction in the two-dimensional region of the image of multi-value image data 32 and variable Y for counting the number of the elements in the Y (vertical) direction in the same manner are used.

Thereafter, the post-filtering value is outputted to the element (X, Y) of the image of multi-value image data 32 (S65). This processing will be described later.

Variable X is incremented by 1 (S67). Then, it is determined whether or not the value of variable X exceeds a predetermined value M as a result of the increment (S69). More specifically, it is determined in the determining process whether or not the processing of S65 was executed to all of the elements in the X direction in the two-dimensional image of multi-level image data 32. When it is determined that the processing was not executed to all of the elements (NO in S69), the processing returns to S65 so that the same processing is executed to the next element. When it is determined that the value of variable X exceeds the predetermined value M, (YES in S69), the value of variable Y is incremented by 1 (S71), and the same processing is repeatedly executed to the elements in the next sequence. Thereafter, it is determined whether or not the value of incremented variable Y exceeds the value of variable N, that is, whether or not the processing (S65) was executed to all of the elements in sequence in the vertical direction of the image of multi-value image data 32. When it is determined that the processing was executed to all of the elements (YES in S73), the successive processing is terminated. When it is determined that the processing was not executed to all of the elements (NO in S73), the processing returns to S63, in which variable X is initialized to 1 so that the processing (S65) is executed. Then, the same processing is repeatedly executed to the elements in the next sequence likewise.

Thus, the filtering processing (S65) is executed to all of the elements of the image of multi-value image data 32 while variables X and Y are thus incremented by 1. This processing includes the processing of position representing dot extracting portion 33 and the processing of data representing dot extracting portion 34.

Next, processing steps of position representing dot extracting portion 33 in the replacement (S65) of the value of the element (X, Y) of multi-value image data 32 are described referring to FIG. 42.

In accordance with the dot arrangement of position filter 38, an element (X, Y) value is assigned to a variable A1, an element (X+8, Y) value is assigned to a variable A2, an element (X−8, Y) value is assigned to a variable A3, an element (X, Y+8) value is assigned to a variable A4, and the value of element (X, Y−8) is assigned to a variable A5 (S81-S89). As a result, a maximum value of variables A1-A5 is outputted as a post-processing value with respect to the element (X, Y) (S91). When there is no element at a relevant position in S81-S89, 0 is set as the variables.

Next, processing steps of data representing dot extracting portion 34 are described referring to FIG. 43. In accordance with the dot arrangement of data filter 39, the element (X, Y) value is assigned to variable A1, an element (X+4, Y) value is assigned to variable A2, an element (X+12, Y) value is assigned to variable A3, an element (X−4, Y) value is assigned to variable A4, and an element (X−12, Y) value is assigned to variable A5 (S101-S109). As a result, a maximum value of variables A1-A5 is outputted as a post-processing value with respect to the element (X, Y) (S110). When there is no element at a relevant position in S101-S109, 0 is set as the variables.

Thus, the filter which reacts with the embedded dot is used for the filtering processing based on the embedded dot pattern (embedding pattern 14) in information detecting apparatus 50, the detection of the noise (unnecessary dot unintentionally printed and dot resulting from the screening process) by mistake can be prevented with a higher possibility. Further, only the information to be extracted (information of embedding pattern 14) can be detected even after any unnecessary dot (dot in accordance with additional data 15) is placed. As a result, a degree of freedom in designing of the background can increased while the detecting accuracy is maintained.

Preferred Embodiment 8

Figure 44:
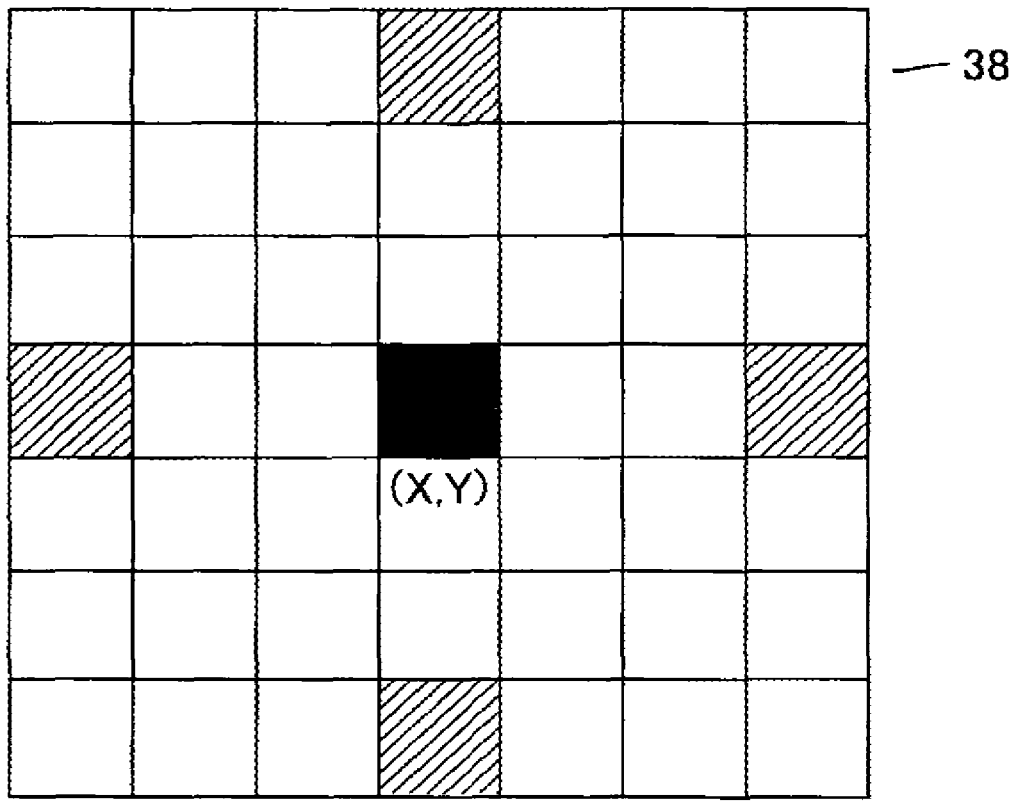
FIG. 44 shows another example of the position filter.

According to a preferred embodiment 8 of the present invention, another example of the filtering processing is recited. In the case where position representing dot D1 and position representation assisting dot D2 are placed as shown in FIGS. 24 (A) and (B) and printed, and position representing dot D1 is extracted from the image of multi-value image data 32 obtained by scanning the printed image, a filtering process for outputting a maximum value of five elements of black and grey (shadowed parts) of a filter shown in FIG. 44 as a value with respect to the black element for each element of the image of multi-value image data 32 is executed. Thus, position representing dot D1 can be extracted in a manner similar to the preferred embodiment 7.

Figure 45:
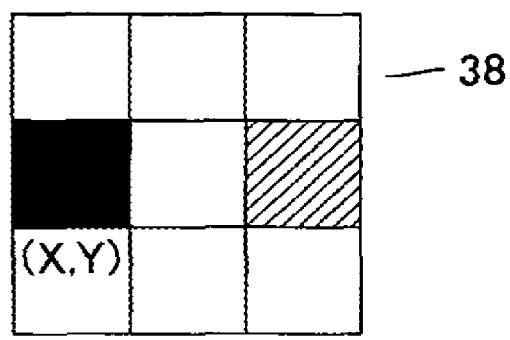
FIG. 45 shows still another example of the position filter.
Figure 46:
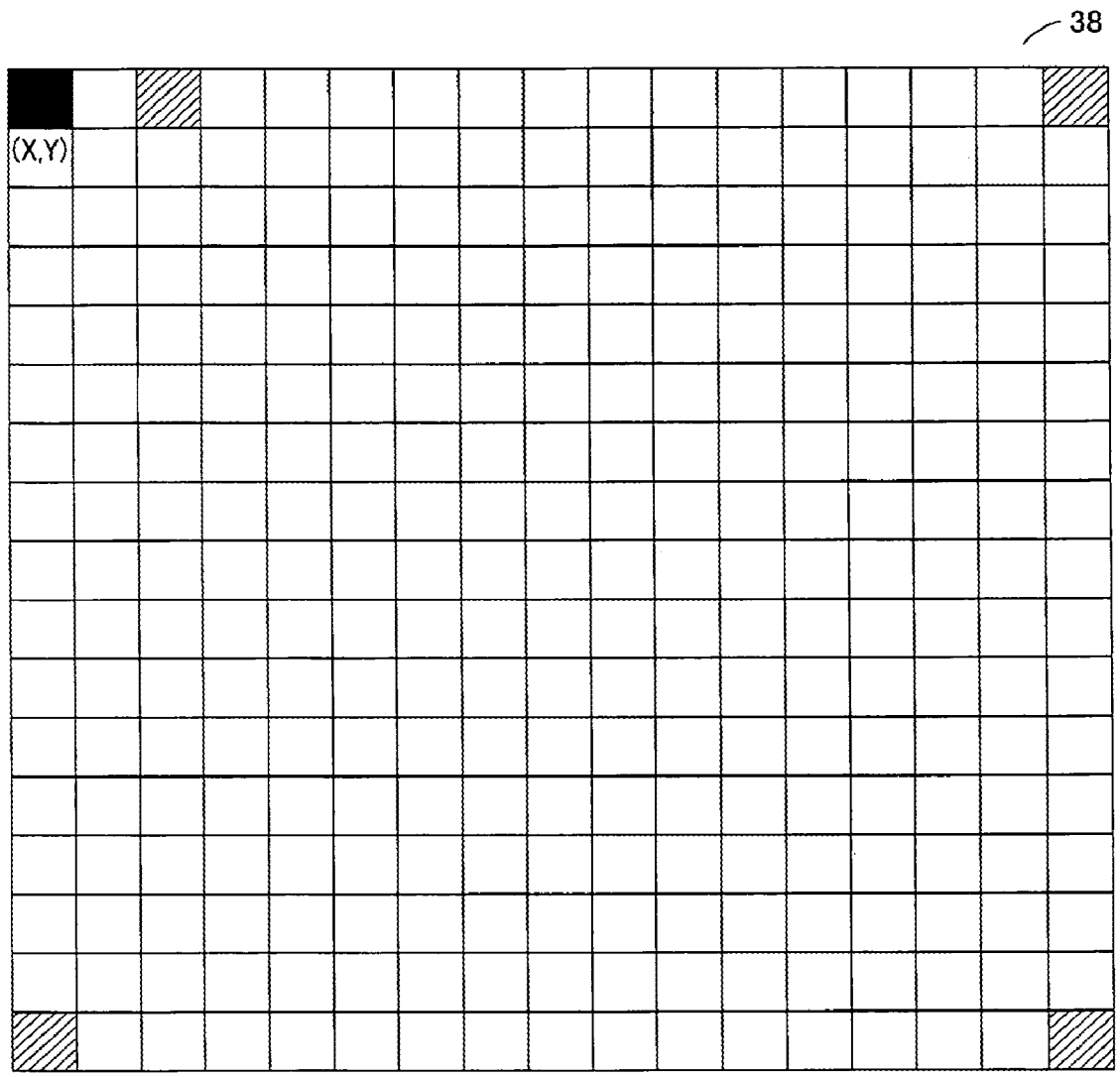
FIG. 46 shows still another example of the position filter.

In the case where position representing dot D1 and position representation assisting dot D2 are placed as shown in FIGS. 26 A and B and printed, and position representing dot D1 is extracted from the image of multi-value image data 32 obtained by scanning the printed image, a filtering process for outputting a maximum value of two elements of black and grey (shadowed parts) of a filter shown in FIG. 45 is outputted as a value with respect to the black element is executed. Alternatively, a filtering process for outputting a maximum value of five elements of black and grey (shadowed parts) of a filter shown in FIG. 46 is outputted as a value with respect to the black element may be executed.

Figure 47:
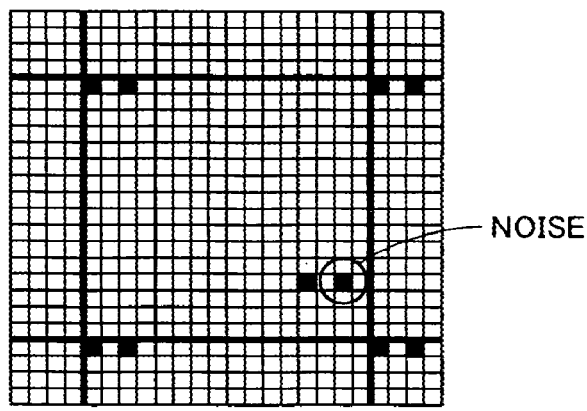
FIG. 47 shows an image having a noise resulting from the scan.
Figure 48:
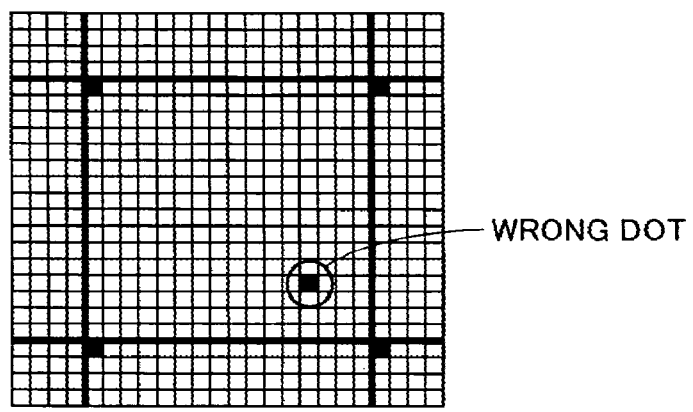
FIG. 48 shows an example of a filtering processing result including a wrong dot.
Figure 49:
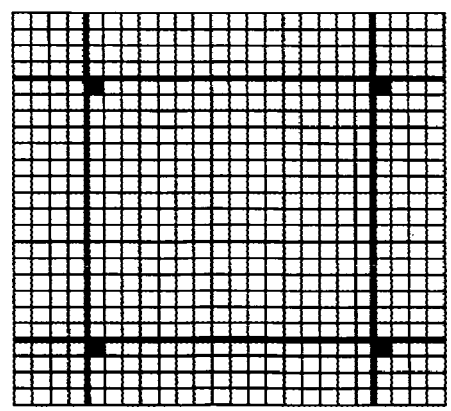
FIG. 49 shows an example of a filtering processing result not including the wrong dot.

In the case of extracting the element via the different filters applied for the extraction, results thereby obtained are different as follows. Below is given an example where an unnecessary dot is printed at such an element position as the noise in the image of printed document 22 as shown in FIG. 47 provided that the dots other than the noise element are repeatedly printed horizontally and vertically. When the filter of FIG. 45 is applied to the image of multi-value image data 32, an element at a wrong position by one element is extracted due to the noise element as shown in FIG. 48. When the filter of FIG. 46 applied, the element can be extracted without any wrong element as shown in FIG. 49 irrespective of the noise.

More specifically, in the filtering process, the dots at the position of the element desirably extracted and at the same repeated positions (repeated positions for every 16 elements) are utilized to output the element desirably extracted. It can be learnt that the filtering processing is enhanced against the noise when the number of the elements used in the filtering processing is increased to a certain degree.

Figure 50:
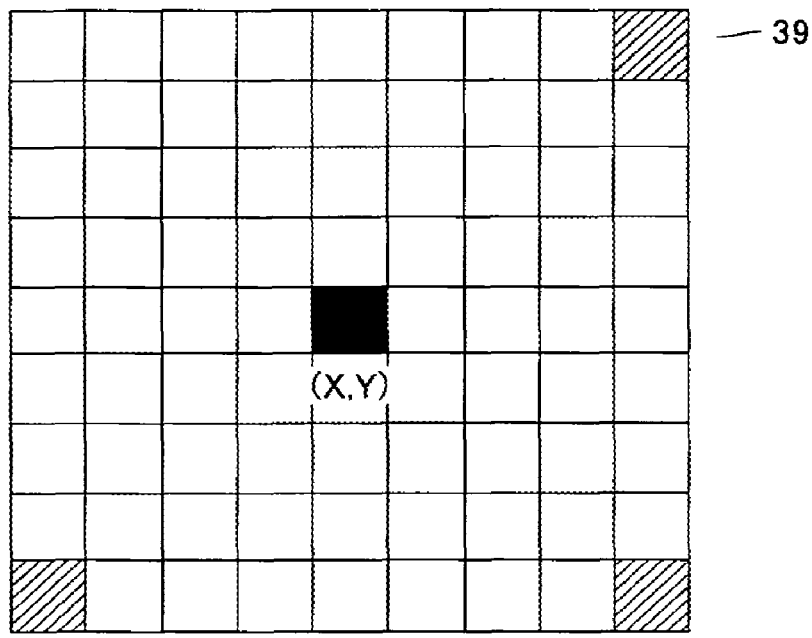
FIG. 50 shows an example of a data filter for a data 0.
Figure 51:
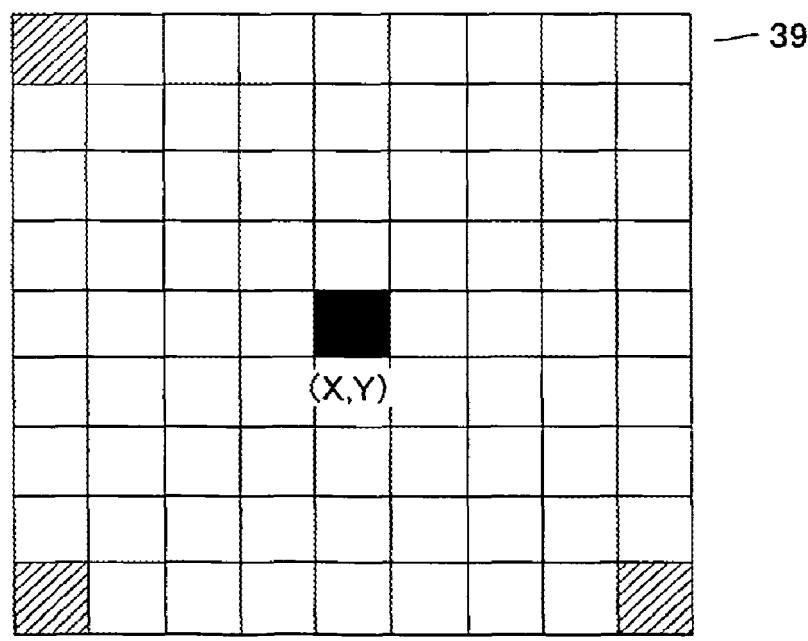
FIG. 51 shows an example of a data filter for a data 1.

Further, in the case of extracting data representing dot D3 from the image of multi-value image data 32 obtained by scanning printed document 22 in which data representing dot D3 is placed as shown in FIGS. 22 A and B, a filter including the elements of black and grey (shadowed parts) shown in FIG. 50 is applied to extract data 0, and a filter of FIG. 51 is applied to extract data 1. Then, the respective data representing dots D3 can be extracted.

Preferred Embodiment 9

Figure 52:
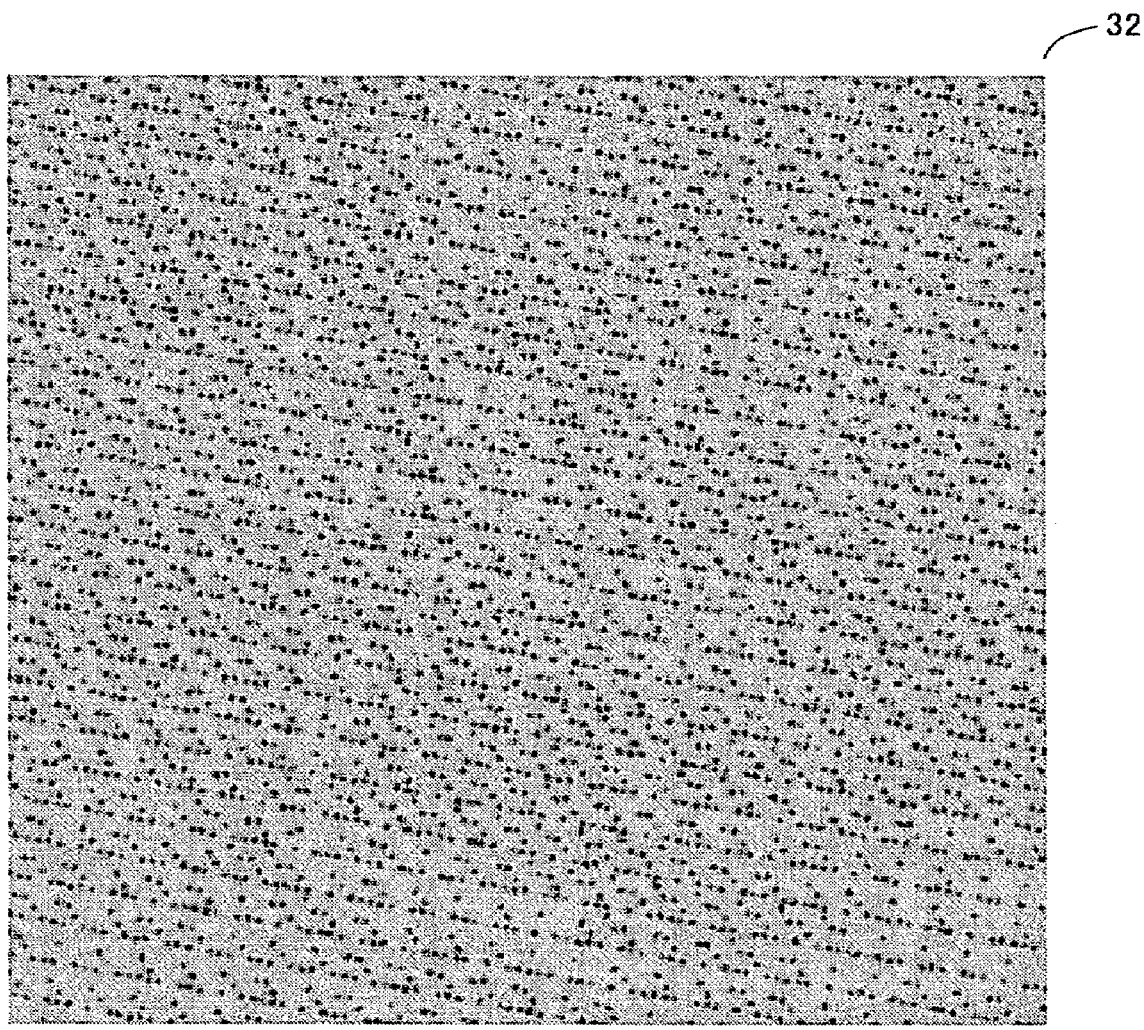
FIG. 52 shows a tilted multi-value image data resulting from the scan.
Figure 53:
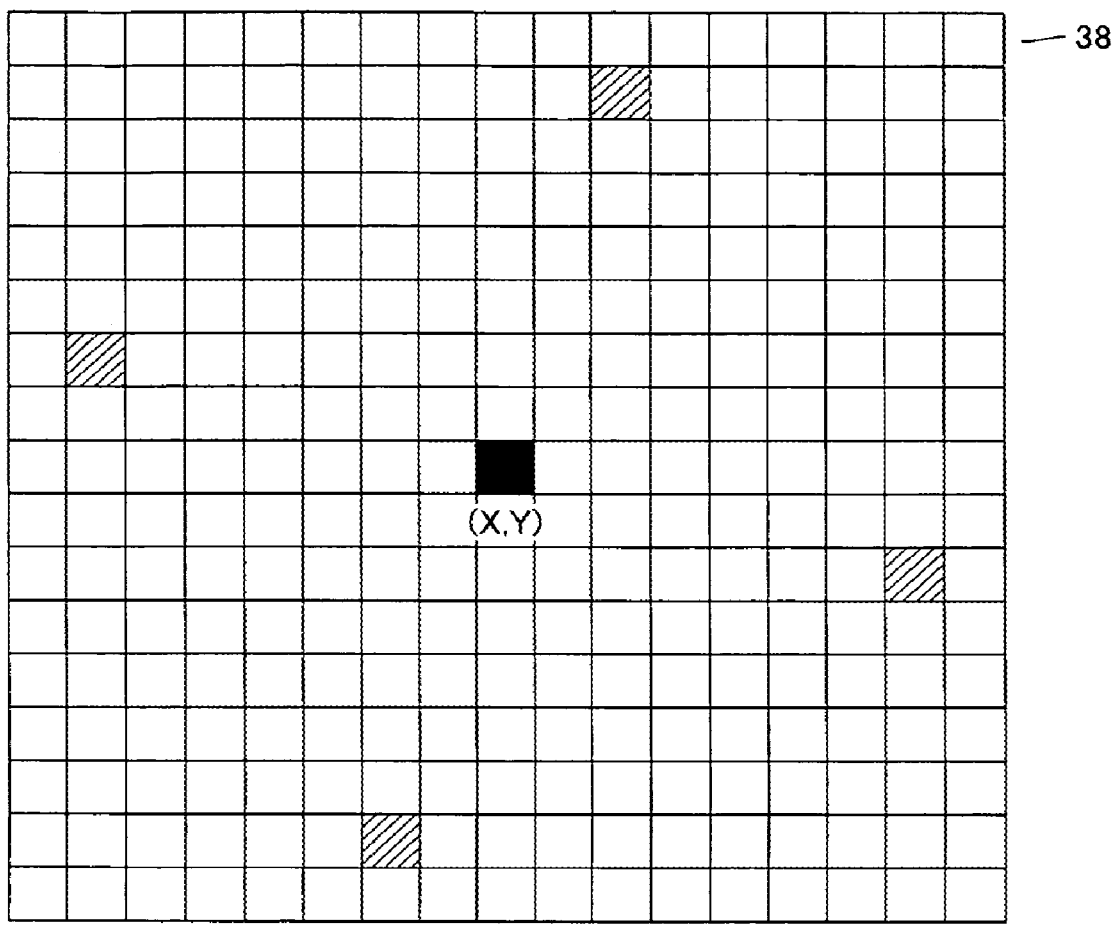
FIG. 53 shows still another example of the position filter.
Figure 54:
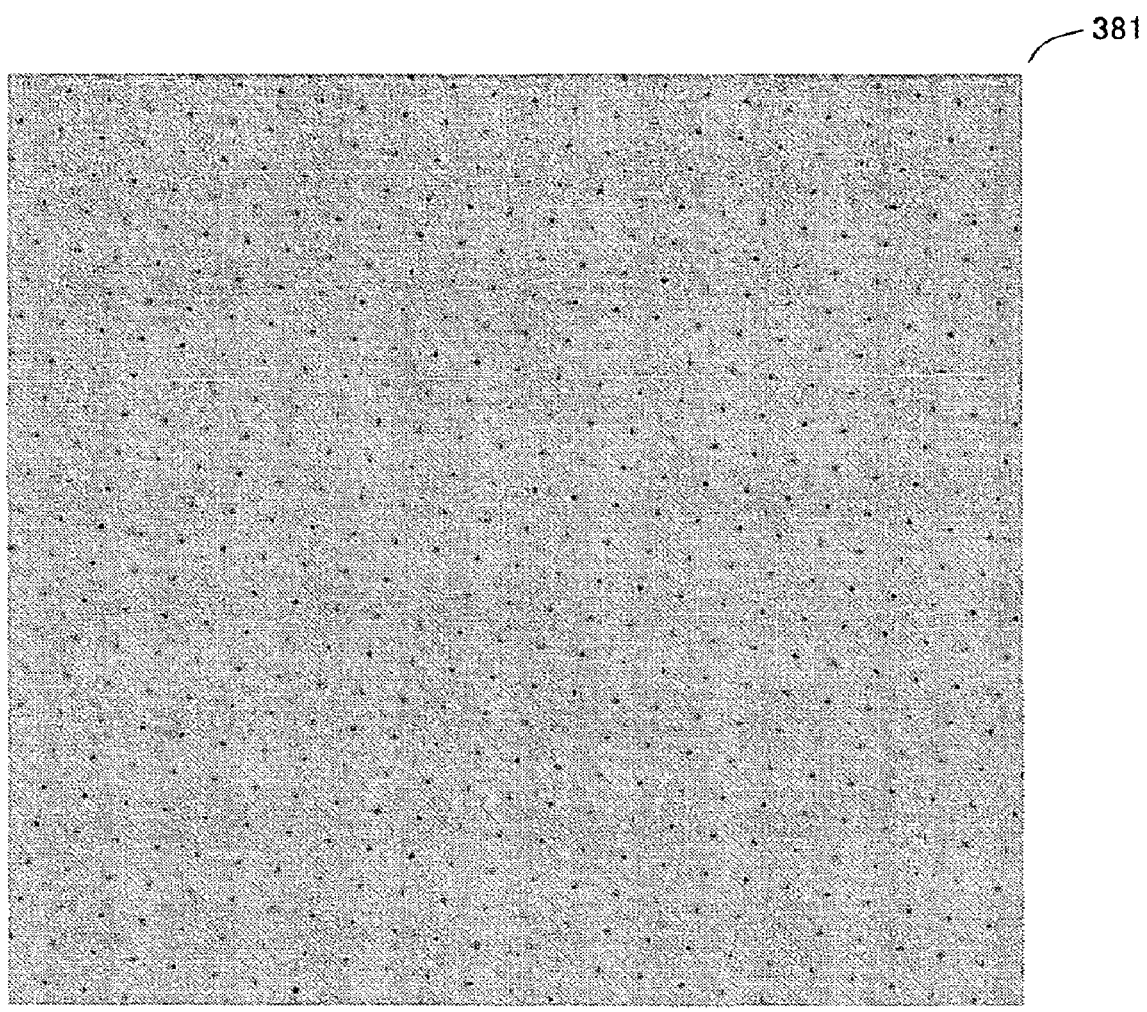
FIG. 54 shows a filtering result of the tilted multi-value image data resulting from the scan.

A preferred embodiment 9 of the present invention recites a filtering processing in the case where the image of multi-value image data 32 obtained by reading the image of printed document 22 by scanner 70 is titled. Assuming that scanned multi-value image data 32 is tilted as shown in FIG. 52, a tilting angle indicating a tilting degree in the case where two large dots (dots apparently larger than the dots embedded in the background of the document image) are printed and a straight line connecting the two dots is compared to a reference straight line (straight line connecting two dots in multi-value image data 32 which is not tilted) can be detected as in a conventional method. Therefore, a position filter 38 tilted in accordance with the detected tilting angle shown in FIG. 53 can be applied in place of position filter 38 shown in FIG. 34. As a result of the application of the filter, the image (position representing information 381) shown in FIG. 54 can be obtained by position representing dot extracting portion 33.

Preferred Embodiment 10

A preferred embodiment 10 of the present invention recites still another example of the filtering processing for the two-value image. It is assumed that in the present preferred embodiment, in the case of extracting data representing dot D3 from the image of multi-value image data 32 obtained by scanning printed document 22 in which data representing dot D3 is placed as shown in FIG. 22B using scanner 70, it is determined whether or not the value of each element of the image of multi-value image data 32 exceeds a particular threshold value, and the value is binarized so that value 1 denoting the presence of the dot is shown when the value exceeds the threshold value and value 0 denoting the absence of the dot is shown when the value does not exceed the threshold value.

The filter of FIG. 50 is applied for extracting data 0, while the filter of FIG. 51 is applied for extracting data 1, in which case the element value is larger as the density of the element is higher (darker). Therefore, a minimum value is outputted in place of the output of the maximum value as the value of the element (X, Y) as in the preferred embodiments described so far.

Further, the processing for outputting the minimum value itself may be adapted to output an AND value of the values (0 or 1) of the four elements (dots) shown in FIGS. 50 and 51. The same result is thereby obtained, and the processing speed can be increased because only one AND calculation is adopted in place of search of the minimum value.

Preferred Embodiment 11

Figures 55, 56:
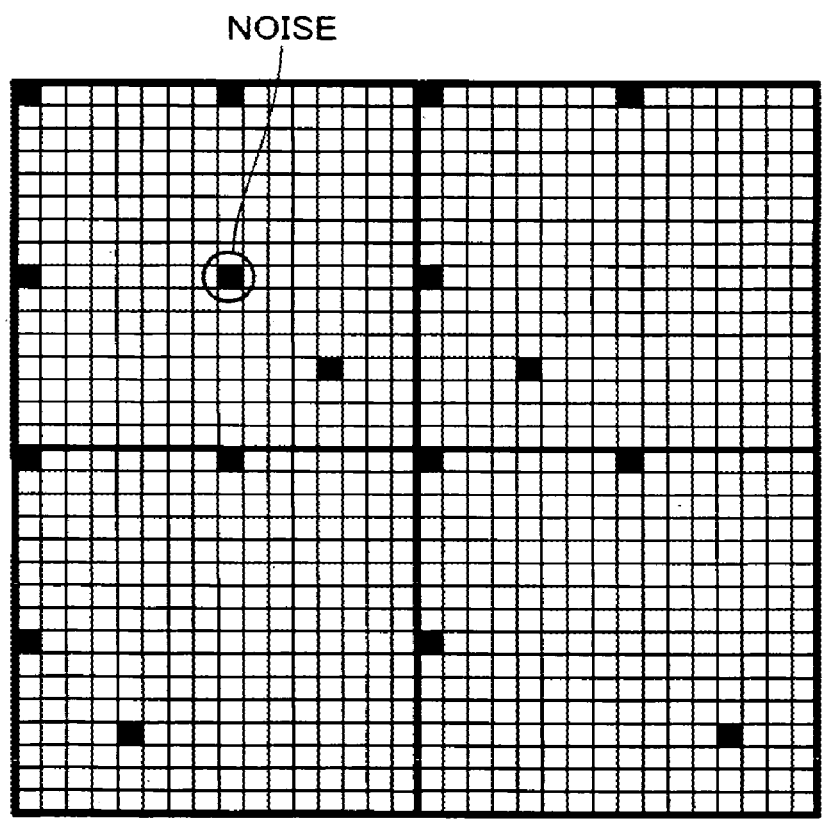
FIG. 55 shows an exemplified arrangement of the embedding information and the additional information.
FIG. 56 shows a state where the informations are embedded in accordance with the arrangement shown in FIG. 55.
Figure 57:
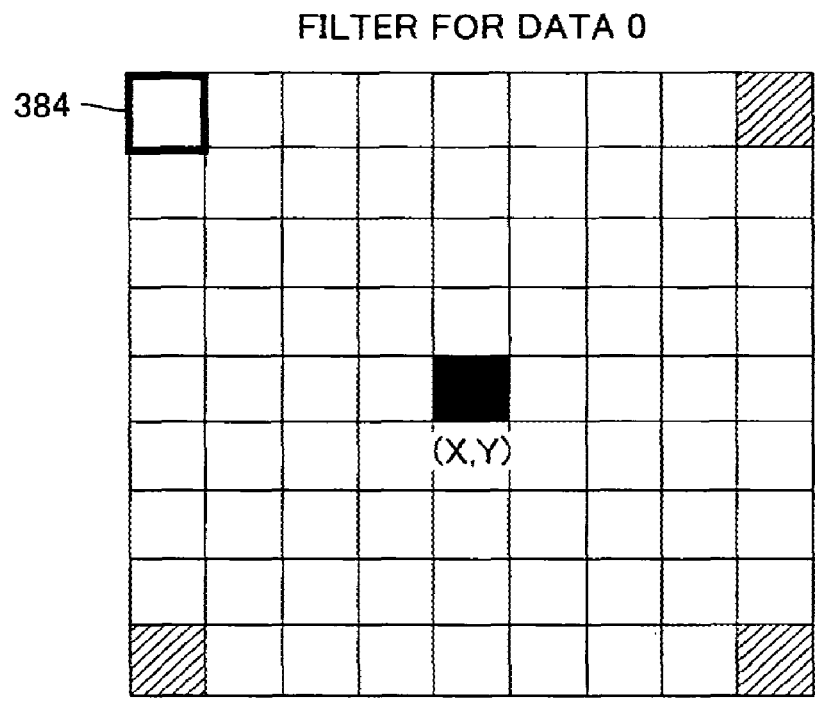
FIG. 57 shows another example of the data filter for the data 0.
Figure 58:
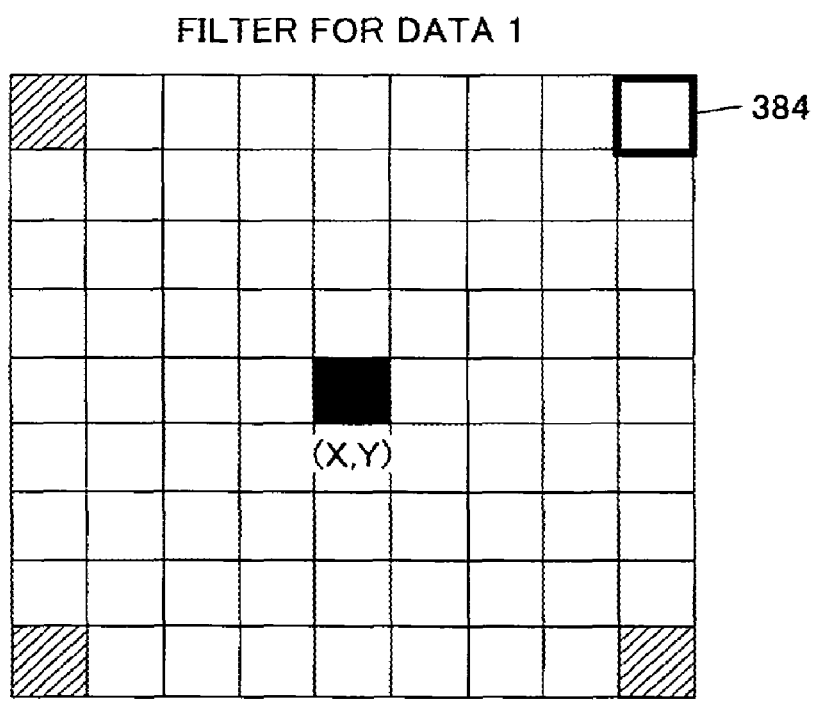
FIG. 58 shows another example of the data filter for the data 1.

A preferred embodiment 11 of the present invention recites still another example of the filtering processing for the two-value image. It is assumed that FIG. 56 shows the image of multi-value image data 32 obtained by scanning and binarizing printed document 22 in which the data is embedded according to the data representation shown in FIGS. 22A and 22B as shown in FIG. 55. In the present preferred embodiment, filters shown in FIGS. 57 and 58 are applied in place of the filters of FIGS. 50 and 51 recited in the preferred embodiment 10. these filters calculate an inversion value of a bit value (1 or 0) of an element 384 at a predetermined position surrounded by a thick square and an AND value using bit values (1 or 0) of other five elements of grey or black (shadowed parts) and output the calculated values to the element (X, Y). The inversion of the bit value of element 384 means that such a condition that there is no dot in the element at the predetermined position indicated by element 384 is added to the filtering processing.

Figure 59:
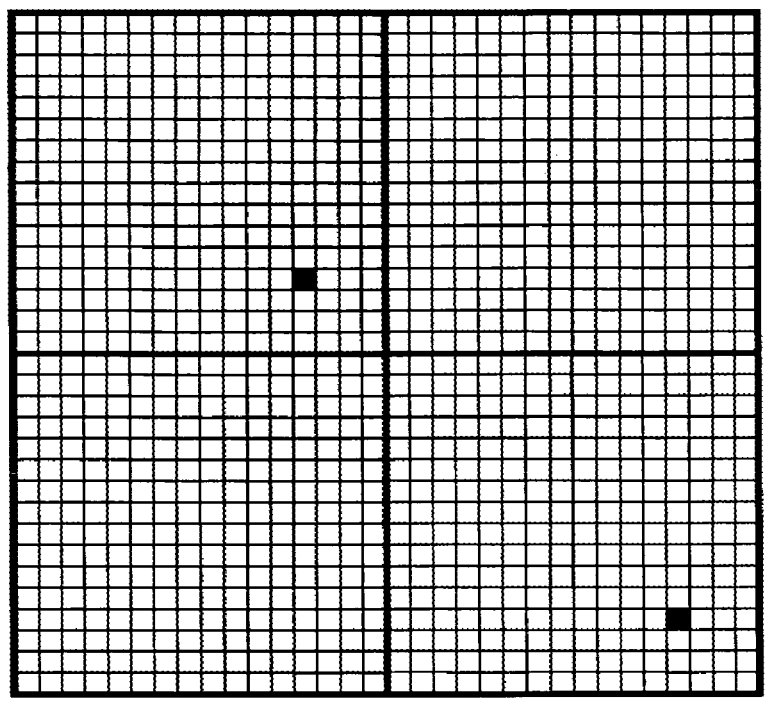
FIG. 59 shows an example of extraction of the data 0 resulting from the filtering processing.
Figure 60:
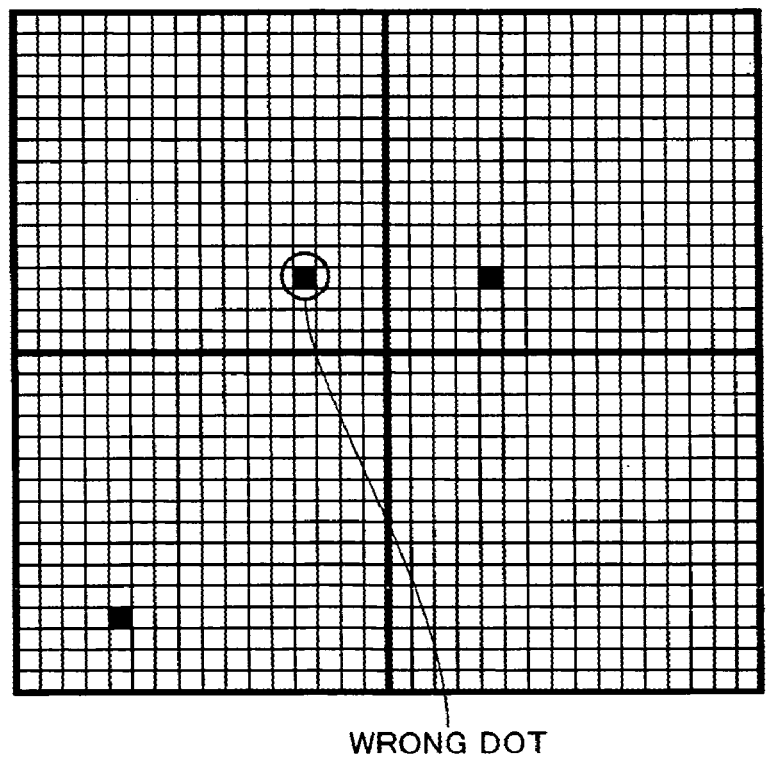
FIG. 60 shows an example of extraction of the data 1 including the wrong dot resulting from the filtering processing.
Figure 61:
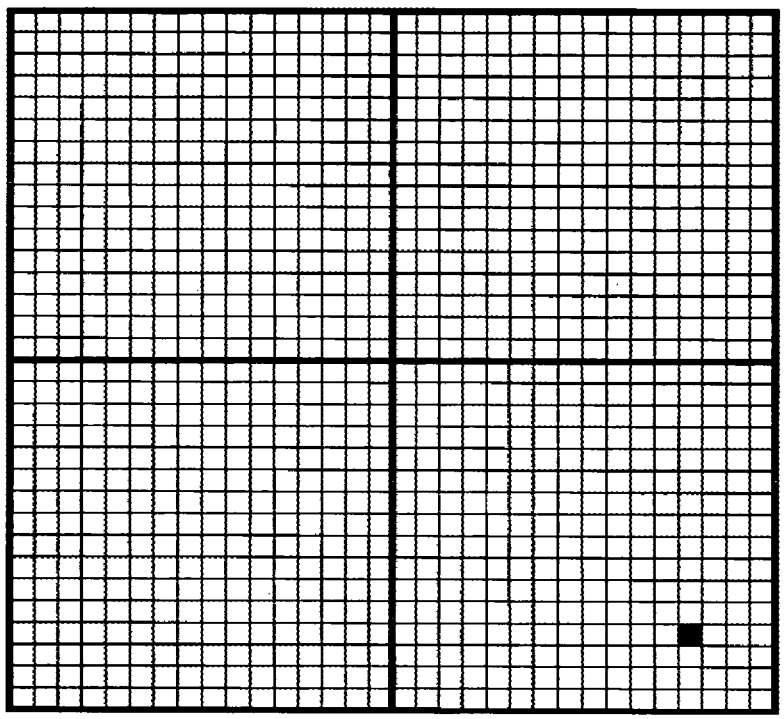
FIG. 61 shows another example of the extraction of the data 0 resulting from the filtering processing.
Figure 62:
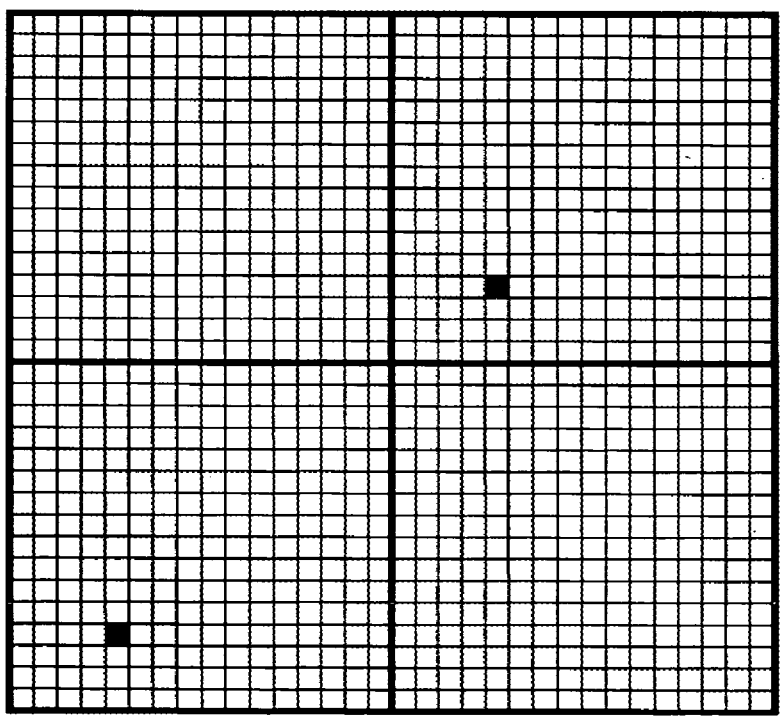
FIG. 62 shows another example of the extraction of the data 1 resulting from the filtering processing.

An effect obtained by applying the filters of FIGS. 57 and 58 is described in comparison to the preferred embodiment 10. In the case where one element is added as the noise as shown in FIG. 56, the filtering processing according to the preferred embodiment 10 results in FIGS. 59 and 60, and a wrong dot is extracted in FIG. 60. On the other hand, when the filters according to the preferred embodiment 11 shown in FIGS. 57 and 58 are applied, there is no wrong dot extracted as shown in FIGS. 61 and 62, which shows that the obtained noise resistance is preferably improved. More specifically, when multi-value image data 32 as the two-value image is processed, the filtering processing including the absence of the dot as the additional condition is executed so that the noise resistance preferably improved can be obtained by the filtering processing.

Preferred Embodiment 12

Figure 63:
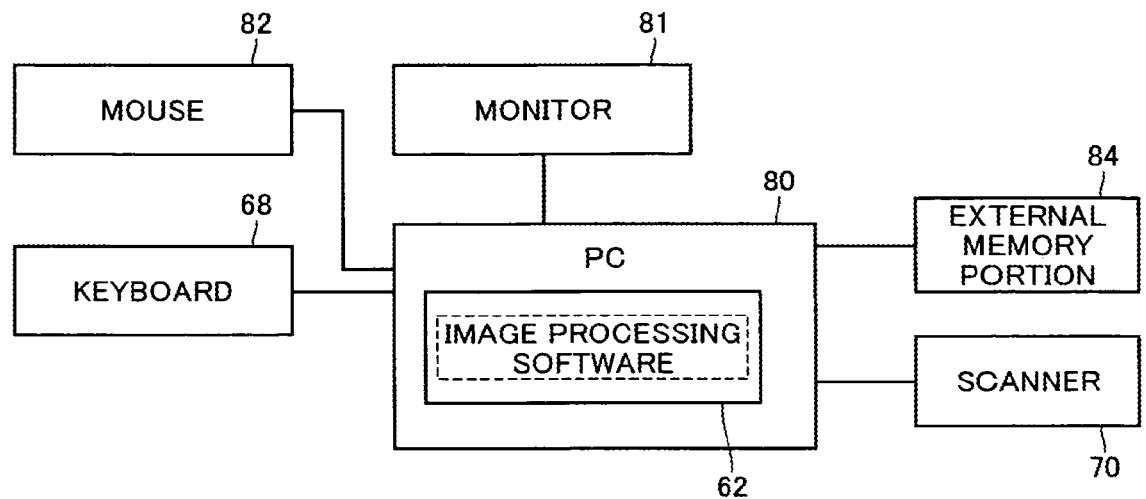
FIG. 63 shows a configuration of a personal computer in which the information embedding apparatuses and the information detecting apparatuses according to the preferred embodiments are installed.

FIG. 63 shows a schematic configuration of a personal computer (PC) in which the information embedding apparatuses and the information detecting apparatuses according to the preferred embodiments described so far are installed. A monitor 81 corresponding to display portion 71, a mouse 82, keyboard 68, HOD 63, an external memory portion 84 corresponding to FD 65 and DVD 67, and scanner 70 are connected to a PC 80. An image processing software as a program for instructing the processing steps according to the preferred embodiments for embedding or detecting the information is stored in memory 62 in PC 80. The software is read and executed by a CPU (Central Processing Unit) not shown or MPU 61 in PC 80.

Figure 64:
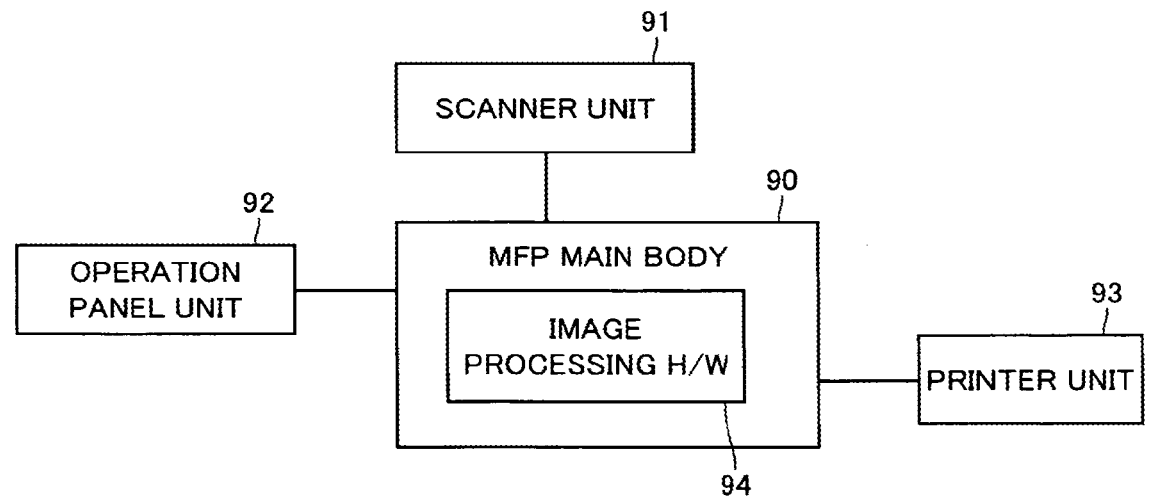
FIG. 64 shows a configuration of an MFP in which the information embedding apparatuses and the information detecting apparatuses according to the preferred embodiments are installed.

FIG. 64 shows a schematic configuration of the MFP in which the information embedding apparatuses and the information detecting apparatuses according to the preferred embodiments are installed. A scanner unit 91 including scanner 70, an operation panel unit 92 including keyboard 68 and a printer unit 93 including printer 73 are connected to a MFP main body 90. The MFP main body 90 includes an image processing H/W 94 for realizing hardware-wise (H/W) the processing steps for embedding the information or the processing steps for detecting the information according to the preferred embodiments. Image processing H/W 94 includes an ASIC (Application Specific Integrated Circuit).

Figure 65:
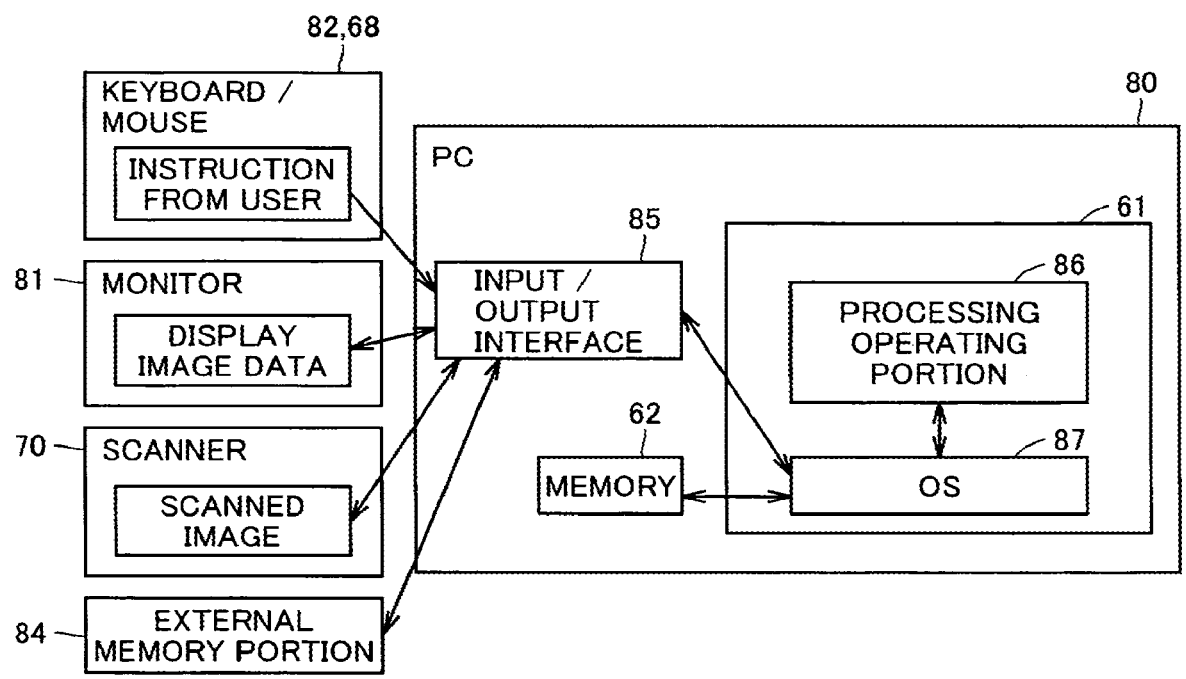
FIG. 65 shows the configuration of the personal computer in which the information embedding apparatuses and the information detecting apparatuses according to the preferred embodiments are installed together with input and output data.

FIG. 65 shows a data input/output relationship regarding PC 80 shown in FIG. 63. PC 80 includes an input/output interface 85 for controlling input/output between MPU 61 and outside (keyboard 68, mouse 82, monitor 81, scanner 70 and external memory portion 84). The user operates keyboard 68 and mouse 82 to thereby input his/her instruction thereto. Monitor 81 displays the various informations such as the supplied image data. Scanner 70 scans printed document 22 based on the instruction and outputs the scanned image data corresponding to multi-value image data 32. MPU 61 includes an OS (Operating System) 87 and a processing operating portion 86 controlled by OS 87. The program is read from memory 62 while the data is inputted/outputted with outside via input/output interface 85 and executed in processing operating portion 86. An execution state of the program is controlled and monitored by OS 87.

Although the present invention has been described and illustrated in detail, it is clearly understood that the same is by way of illustration and example only and is not to be taken by way of limitation, the spirit and scope of the present invention being limited only by the terms of the appended claims.

What claimed is:

1. An information detecting apparatus for detecting a predetermined information in accordance with a predetermined dot pattern printed on a predetermined region of a sheet of paper comprising:
 a particular element dot detecting portion for scanning said predetermined region using an element matrix for detecting an element corresponding to an identifying dot used for identifying said predetermined information of said predetermined dot pattern and detecting a dot of the element in said predetermined region relevant to a particular element corresponding to said identifying dot of said element matrix; and an information detecting portion for detecting said predetermined information based on a result of the detection by said particular element dot detecting portion and said predetermined dot pattern;

wherein said predetermined dot pattern includes a data dot placed at a position in accordance with said predetermined information, a position dot placed at a position for instructing a reference position used for identifying the position of said data dot, and an assisting dot placed at a position for assisting the instruction of the reference position by said identifying dot, and said identifying dot indicates a dot for detecting the position of the data dot.

2. The information detecting apparatus according to claim 1, wherein said identifying dot indicates said data dot.

3. The information detecting apparatus according to claim 1, wherein said identifying dot indicates said position dot.

4. The information detecting apparatus according to claim 1, wherein said particular element dot detecting portion detects the dot of said element in said predetermined region corresponding to the element of the element matrix relevant to a position where the dot is not placed in said predetermined dot pattern, and detects the dot of the element in said predetermined region corresponding to said particular element in said element matrix based on a result of the detection.

5. The information detecting apparatus according to claim 1, wherein said predetermined dot pattern indicates a unit pattern having a plurality of predetermined elements two-dimensionally arranged, and said predetermined dot patterns are printed adjacent to each other on said predetermined region of the sheet of paper.

6. An information detecting method for detecting a predetermined information in accordance with a predetermined dot pattern printed on a predetermined region of a sheet of paper using a computer comprising the steps of:

scanning said predetermined region using an element matrix read from a memory for detecting an element corresponding to an identifying dot used for identifying said predetermined information of said predetermined dot pattern and detecting a dot of an element in said predetermined region relevant to a particular element corresponding to said identifying dot of said element matrix; and detecting said predetermined information based on a result of the detection obtained in the particular element dot detecting step and said predetermined dot pattern;

wherein said predetermined dot pattern includes a data dot placed at a position in accordance with said predetermined information, a position dot placed at a position for instructing a reference position used for identifying the position of said data dot, and an assisting dot placed at a position for assisting the instruction of said reference position by said position dot, and said identifying dot indicates a dot for detecting the position of said data dot.

7. The information detecting method according to claim 6, wherein said predetermined dot pattern indicates a unit pattern having a plurality of predetermined elements two-dimensionally arranged, and said predetermined dot patterns are printed adjacent to each other on said predetermined region of the sheet of paper.

* * * * *

UNITED STATES PATENT AND TRADEMARK OFFICE
CERTIFICATE OF CORRECTION

| | | |
|---|---|---|
| PATENT NO. | : 7,840,029 B2 | |
| APPLICATION NO. | : 12/764643 | |
| DATED | : November 23, 2010 | |
| INVENTOR(S) | : Motohiro Asano | |

It is certified that error appears in the above-identified patent and that said Letters Patent is hereby corrected as shown below:

<u>Title Page, (73), Assignee:</u>
Delete "Konica Minolta Technologies, Inc." and
insert -- Konica Minolta Business Technologies, Inc. --.

Signed and Sealed this
Eighth Day of November, 2011

David J. Kappos
*Director of the United States Patent and Trademark Office*